US008733634B1

(12) United States Patent
Eastman et al.

(10) Patent No.: US 8,733,634 B1
(45) Date of Patent: May 27, 2014

(54) BANKING SYSTEM CONTROLLED RESPONSIVE TO DATA BEARING RECORDS

(75) Inventors: Jeffrey M. Eastman, North Canton, OH (US); Pedro Tula, North Canton, OH (US); Nam Le, Chandler, AZ (US); David Nikkel, Wooster, OH (US); David Vidmar, Wadsworth, OH (US); Jhansi Arikatla, North Canton, OH (US); Eric S. VanKeulen, North Canton, OH (US); Wayne Wellbaum, Canton, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 198 days.

(21) Appl. No.: 13/461,258

(22) Filed: May 1, 2012

Related U.S. Application Data

(63) Continuation-in-part of application No. 12/459,185, filed on Jun. 26, 2009, now Pat. No. 8,251,281.

(60) Provisional application No. 61/518,292, filed on May 3, 2011, provisional application No. 61/192,282, filed on Sep. 17, 2008, provisional application No. 61/133,477, filed on Jun. 30, 2008, provisional application No. 61/133,346, filed on Jun. 27, 2008.

(51) Int. Cl.
*G06Q 40/00* (2012.01)
*G06F 17/00* (2006.01)
*G06K 5/00* (2006.01)

(52) U.S. Cl.
USPC ............ 235/379; 235/375; 235/380; 705/43; 902/8; 902/9; 271/3.01; 271/3.14

(58) Field of Classification Search
CPC ..... G07F 19/00; G07F 19/20; G07D 11/0021; B65H 7/00
USPC ............ 235/375, 379, 380; 705/43; 902/8–9; 271/3.01, 314
See application file for complete search history.

(56) References Cited

U.S. PATENT DOCUMENTS

| 2003/0127509 | A1* | 7/2003 | Nomiyama et al. ......... 235/379 |
| 2006/0017211 | A1* | 1/2006 | Yanagida ...................... 271/3.14 |
| 2007/0034683 | A1* | 2/2007 | Eastman et al. .............. 235/379 |

* cited by examiner

*Primary Examiner* — Michael G Lee
*Assistant Examiner* — Laura Gudorf
(74) *Attorney, Agent, or Firm* — Black, McCuskey, Souers & Arbaugh, LPA

(57) ABSTRACT

An automated banking machine is operative to cause financial transfers responsive at least in part to data read from data bearing records. The automated banking machine includes a card reader that is operative to read card data from user cards corresponding to financial accounts. The automated banking machine is operative to cause a determination to be made that read card data corresponds to stored data for an account authorized to carry out transactions that transfer and/or allocate funds between accounts. The automated banking machine is further operative to provide users with a receipt for transactions conducted. The automated banking machine is operative to cause the value of cash dispensed or received to be assessed or credited to the financial accounts corresponding to card data.

21 Claims, 69 Drawing Sheets

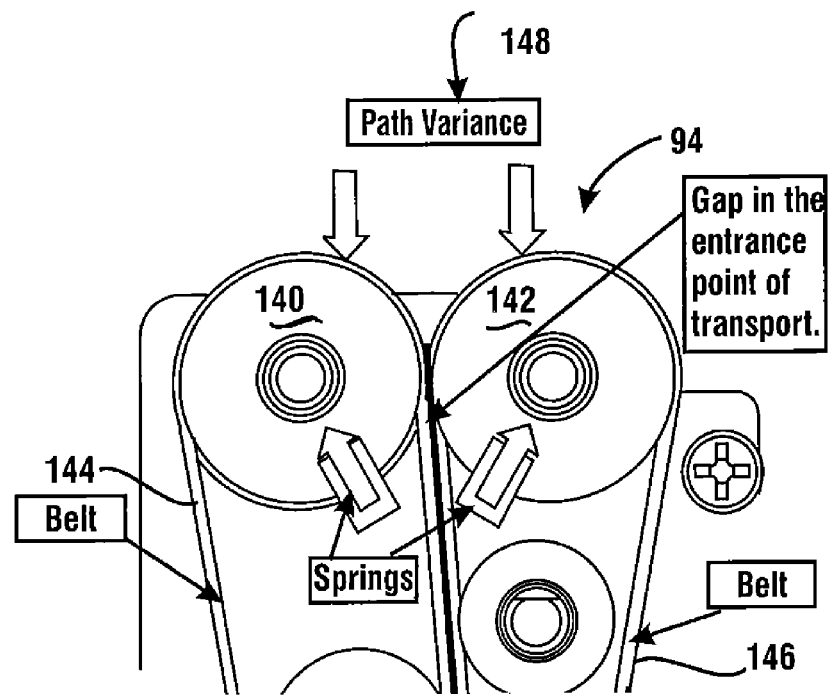
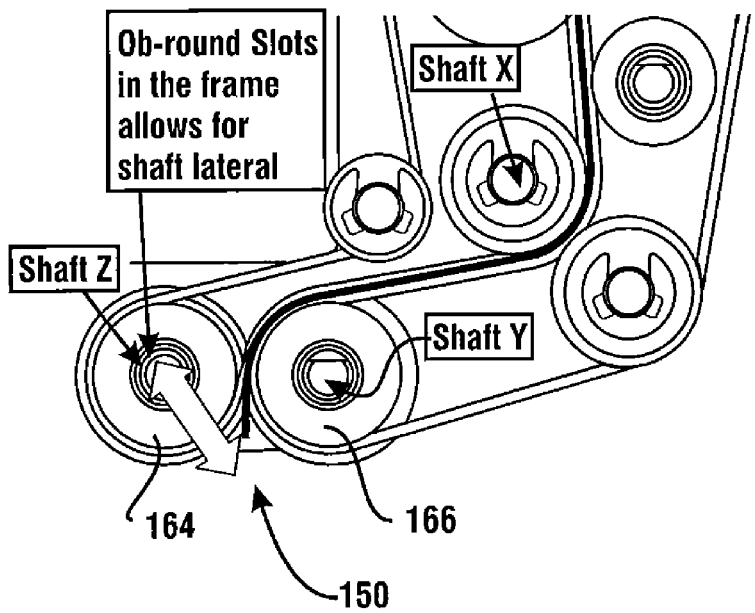
Fig. 25

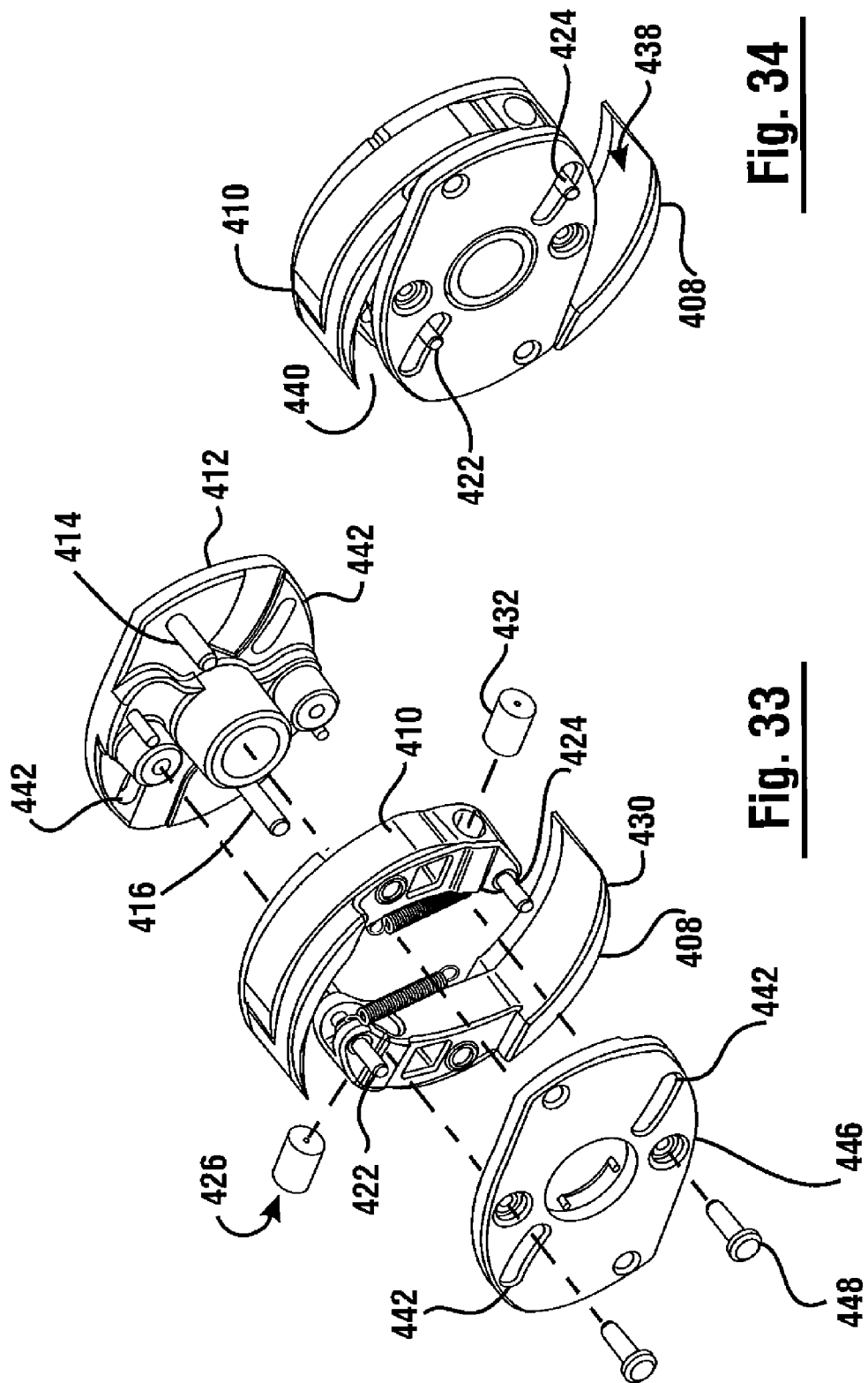

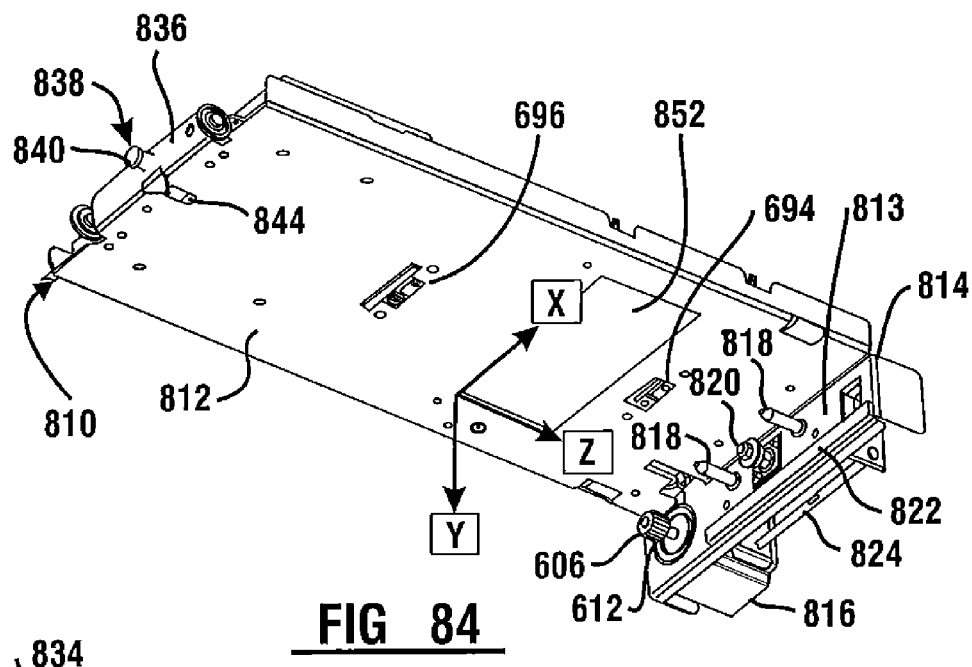
FIG 84
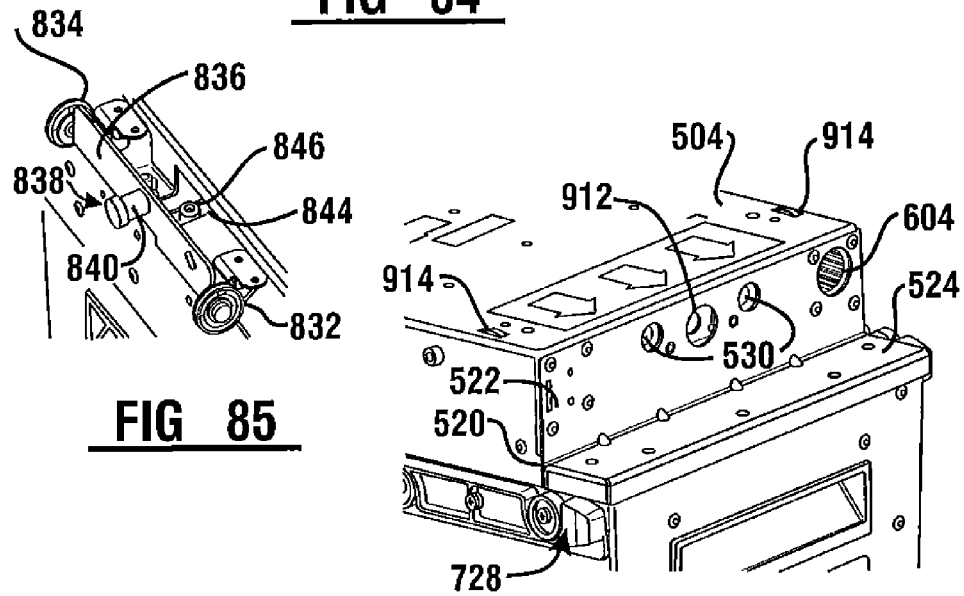
FIG 85
FIG 86

BANKING SYSTEM CONTROLLED RESPONSIVE TO DATA BEARING RECORDS

CROSS REFERENCE TO RELATED APPLICATIONS

This application claims benefit pursuant to 35 U.S.C. §119(e) of Provisional Application 61/518,292 filed May 3, 2011, the disclosure of which is incorporated herein by reference in its entirety.

This application is also a continuation-in-part of U.S. application Ser. No. 12/459,185 filed Jun. 26, 2009 which claims benefit pursuant to 35 U.S.C. §119(e) of Provisional Applications 61/192,282 filed Sep. 17, 2008; 61/133,477 filed Jun. 30, 2008; and 61/133,346 filed Jun. 27, 2008, the disclosures of each of these Applications are also incorporated herein by reference in their entirety.

TECHNICAL FIELD

This invention relates to banking systems controlled by data bearing records that may be classified in U.S. Class 235, Subclass 379.

BACKGROUND ART

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user or authorized financial account, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine or an automated teller machine (ATM) shall be deemed to include any machine that may be used to automatically carry out transactions involving transfers of value.

Automated banking machines may benefit from improvements.

OBJECTS OF EXEMPLARY EMBODIMENTS

It is an object of some exemplary embodiments to provide an improved automated banking machine.

It is a further object of some exemplary embodiments to provide an automated banking machine that accepts and stores sheets such as financial instruments.

It is a further object of some exemplary embodiments to provide an automated banking machine that accepts currency bills.

It is a further object of some exemplary embodiments to provide an automated banking machine that accepts checks.

It is a further object of some exemplary embodiments to provide an automated banking machine that stores received sheets in uniformly stacked relation.

It is a further object of some exemplary embodiments to provide an automated banking machine that operates to store received sheets in uniformly stacked relation in removable cassettes.

It is a further object of some exemplary embodiments to provide methods of operation of an automated banking machine.

It is a further object of some exemplary embodiments to provide a method for servicing an automated banking machine.

It is a further object of some exemplary embodiments to provide an automated banking machine that optimizes the capacity to store bills in a free fall cassette.

It is a further object of some exemplary embodiments to provide a free fall cassette in the chest of an automatic banking machine that can be easily removed and installed for servicing.

Further objects of some exemplary embodiments will be made apparent in the following Detailed Description of Exemplary Embodiments and the appended claims.

The foregoing objects are accomplished in one exemplary embodiment by an automated banking machine system that operates responsive to data bearing records. The exemplary machine is operative to read data included on user cards as well as manually input data. The machine operates to cause a determination to be made whether the input data corresponds to a user and/or an account that is authorized to conduct transactions at the machine. Authorized users are enabled to conduct transactions such as receiving cash which results in funds being debited to a financial account corresponding to the data included on the user card.

Other transactions carried out in some exemplary embodiments include the deposit of financial instrument sheets such as currency bills and/or checks. The exemplary machine operates to receive a stack of such sheets from a user who has been determined to be authorized to operate the machine. The sheets are unstacked and after being aligned, are transported past a plurality of sensors. The sensors in exemplary embodiments may operate to image the sheets. Such sensors may also sense magnetic, ultraviolet and/or infrared properties or other detectable properties associated with the sheets. The data gathered through reading the sheets is used to determine data on the sheets and/or whether such sheets are valid financial instruments such as bills or checks.

Sheets may be stored on a temporary basis. Sheets that are determined to be invalid may be transported to a compartment so that they are segregated from other sheets. Sheets that are requested to be returned to the user may be transported back into the area of the original stack so that they may be taken by a user from the machine.

In some exemplary embodiments sheets that are determined to be valid are transported into a secure chest. Depending on the nature of the sheet, sheets are routed selectively to compartments in sheet holding containers.

In some exemplary embodiments the sheets in the container are maintained in an aligned stack. Sheets entering the container are engaged and held by at least one rotating gripper member that grips the sheet, moves the sheet through rotation of the member and releases the sheet in alignment with the stack. In an exemplary embodiment a plurality of belts and rollers are used to urge movement of the sheet into the sheet holding compartment. Within each container the stack is supported on a moveable plate. The machine operates to move the plate so that the proper spaced relationship is maintained between the rotating gripping member and the stack as sheets are added.

In some exemplary embodiments the removable containers include internal elements which are contactlessly sensed by the machine through sensors positioned outside the containers. In exemplary embodiments the elements include magnetic elements, but in other embodiments other types of elements may be used. This feature of an exemplary embodiment provides for accurate control of the rotating member, rollers and belts and positioning of the stack support plate without the need for electrical contacts or connectors between the removable container and the rest of the machine. Of course this approach is exemplary.

In the exemplary embodiment during transactions the containers are positioned within a secure chest of the machine. The chest may be opened and the containers removed. The exemplary containers include lockable doors which enable authorized persons to gain access to the sheets within the containers once they have been removed from the machine. Thus for example, containers that have become close to filled may be removed by authorized persons and replaced with empty containers.

In other embodiments devices for both receiving and dispensing financial instrument sheets may be provided. This may include recycling mechanisms that operate to receive, store and dispense currency bills or other valuable items. Of course these approaches are exemplary and in other embodiments other approaches may be used.

BRIEF DESCRIPTION OF DRAWINGS

FIG. 25 is an expanded view of the intermodule sheet transport.

FIG. 33 is an exploded view of the components of the exemplary rotating member shown in FIGS. 30 and 31.

FIG. 34 is an isometric view of the exemplary rotating member with the components in FIG. 33 in an assembled condition and showing the cam followers extending from the rotating member.

FIG. 84 is a bottom and left side isometric view of the sensor plate assembly of the embodiment of FIG. 56.

FIG. 85 is a rear and top isometric view of a portion of the embodiment of FIG. 56 illustrating the docking slot of the sensor plate assembly capturing the shoulder screw of the cassette.

FIG. 86 is a rear and left side isometric view of a portion of the cassette of the embodiment of FIG. 56.

DETAILED DESCRIPTION OF EXEMPLARY EMBODIMENTS

Figure 1:
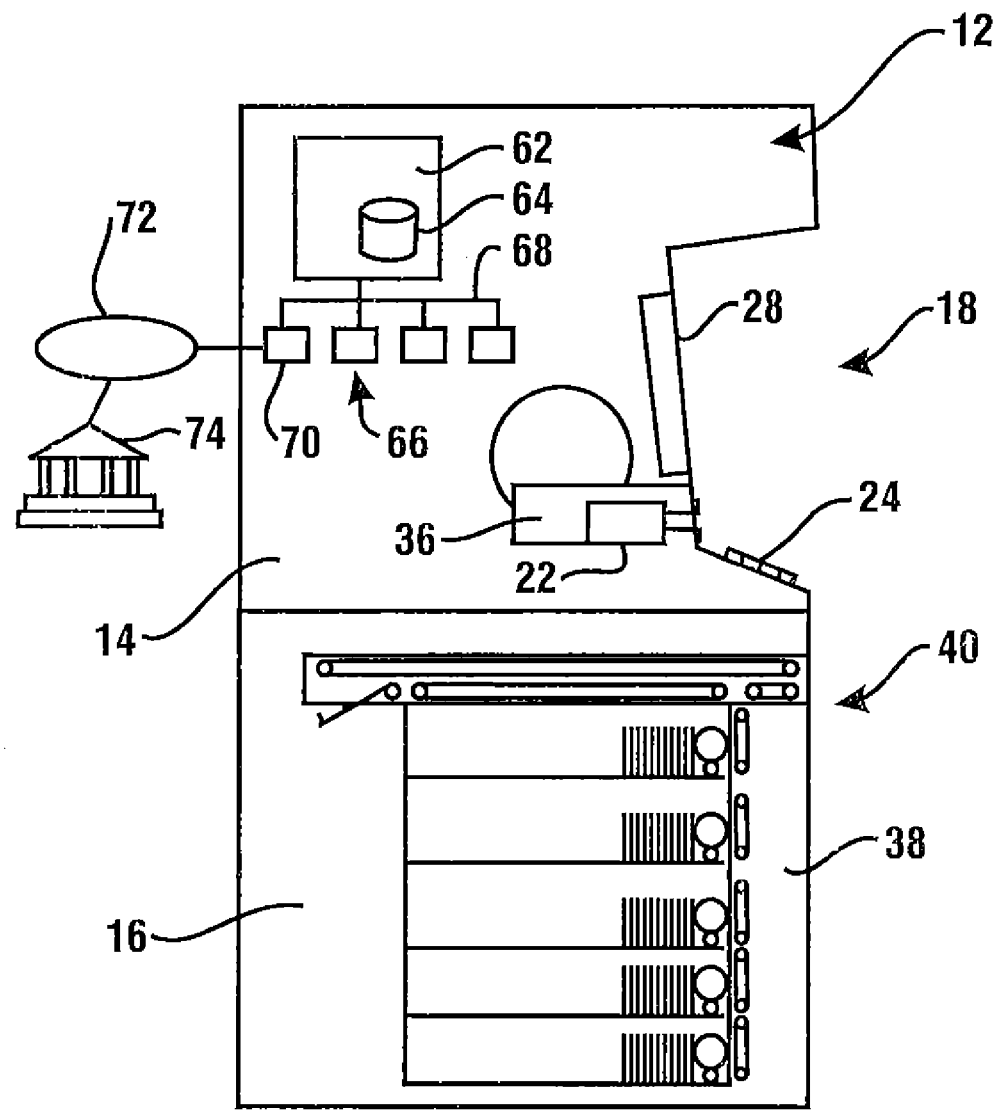
FIG. 1 is a schematic view of an automated banking machine that operates responsive to data included on user cards.

Referring now to the drawings and particularly to FIG. 1, there is shown therein an exemplary embodiment of an automated banking machine generally indicated 10. The exemplary machine includes a housing 12. The exemplary housing 12 includes an upper housing portion 14 and a secure chest portion 16. In this exemplary embodiment the automated banking machine is a through-the-wall type machine. However, in other embodiments other types of machines including standalone machines or machines integrated within other devices may be used. Exemplary housing structures for automated banking machines which may be used in some embodiments are shown in U.S. Pat. Nos. 7,156,296; 7,156,297; 7,165,767; and 7,000,830 the disclosures of which are incorporated by reference in their entirety.

Figure 2:
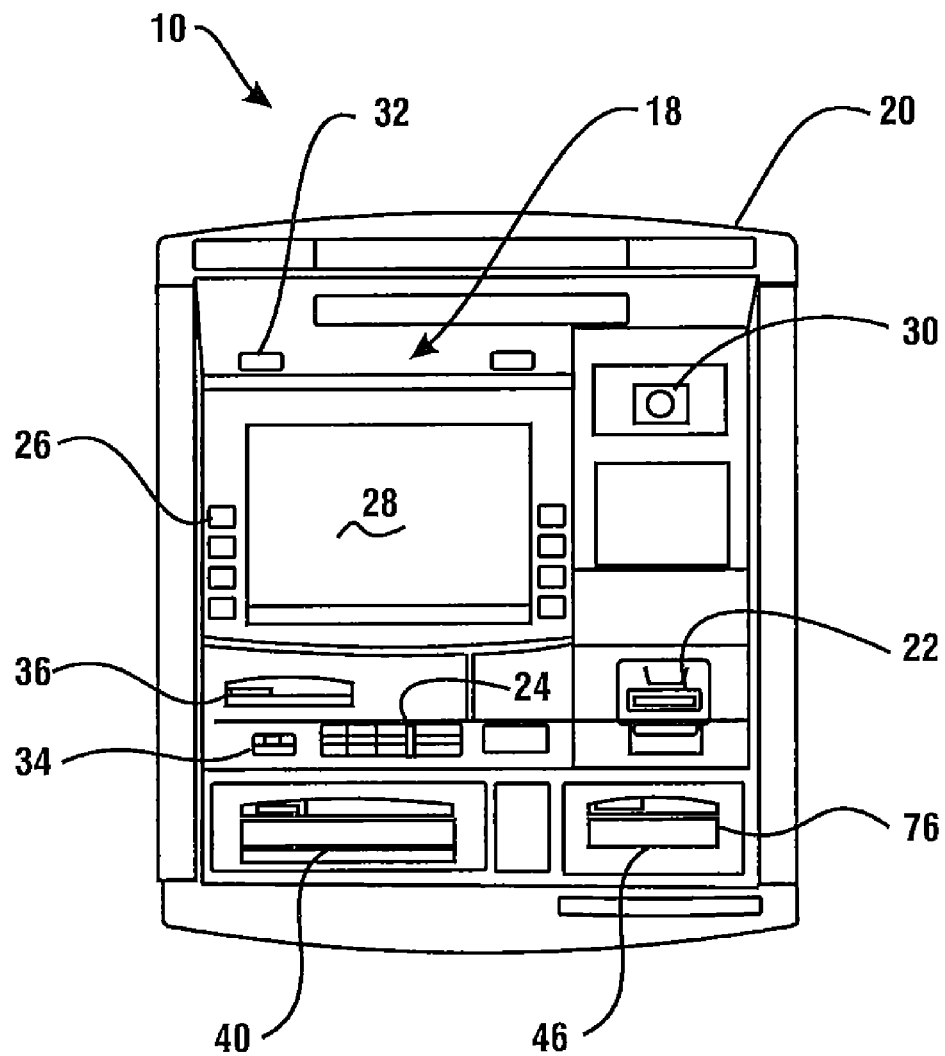
FIG. 2 is a front view of an exemplary fascia of an automated banking machine.

The exemplary embodiment of the automated banking machine includes a user interface generally indicated 18 (see also FIG. 2). The user interface components are surrounded by a fascia 20. In the exemplary embodiment the user interface components include input devices and output devices. The input devices include a card reader 22. The card reader 22 of the exemplary embodiment is operative to read data from user cards that are input to the machine through an opening on the fascia. Other user input devices of the exemplary embodiment include a keypad 24. Keypad 24 is operative to receive manual inputs by depressing alphanumeric keys.

Other input devices of the exemplary embodiment include function keys 26. Function keys 26 are manually actuated keys through which inputs can be provided in response to indicia output through a display 28 which serves as an output device. It should be understood that these input devices are exemplary and in other embodiments other types of input devices may be used. These include for example biometric reading devices which are operative to read biometric features of users. Such biometric features may include fingerprint scans, iris scans, retina scans or other distinguishing features. In some embodiments a camera such as camera 30 shown in FIG. 2 may serve as a biometric input device. Other input devices which may be used in exemplary embodiments include contactless readers such as radio frequency identification (RFID) readers which may operate to read bearer records or other identifying data from RFID tags. In other embodiments input devices may include voice recognition devices which are operative to identify a user by voice. Of course these features are exemplary and in other embodiments other features may be used.

In the exemplary embodiment the automated banking machine also includes a plurality of output devices. Such output devices may include a display 28 as previously discussed. It should be understood that in some embodiments the display may include a touchscreen display at which inputs may be provided by a user touching areas of the display.

Other output devices in the exemplary embodiment include speakers 32. Speakers 32 may be operative to provide audible instructions to machine users. Another output device provided in an exemplary embodiment includes a headphone jack 34. The headphone jack 34 may be used in the exemplary embodiment by persons who are blind and who may operate the machine responsive to instructions which are audibly output through a headphone or similar device that is operatively connected to the headphone jack.

Another output device included in an exemplary embodiment is a receipt printer 36. The receipt printer 36 of the exemplary embodiment is operative to print receipts for users of the machine. The receipts include details of banking transactions that are conducted through operation of the machine. The receipt printer 36 delivers receipts through a slot included on the fascia.

It should be understood that the output devices of the exemplary embodiment are but examples of output devices that may be used in connection with automated banking machines. In other embodiments other devices may be used.

The exemplary embodiment of the automated banking machine includes a cash dispenser 38. The cash dispenser of the exemplary embodiment operates to cause cash which is stored within the secure chest to be delivered to a machine user outside the machine through a presenter opening 40. The exemplary cash dispenser is operative to pick currency bills from supplies of bills stored in containers in the chest and accumulate such bills into a stack. Currency bills are alternatively referred to herein as notes. The stack is thereafter delivered to the machine user. Exemplary cash dispensers are operative to deliver various types of currency bills as well as other financial instrument sheets. Various cash dispensers may also operate to deliver other types of sheet material as well. Examples of cash dispensers which may be used in exemplary embodiments are shown in U.S. Pat. Nos. 7,344,132; 7,322,481; 7,121,461; 7,131,576; 7,140,537; 7,144,006; 7,140,607; 7,004,383; 7,000,832; 6,874,682; and 6,634,636 the disclosures of each of which are incorporated herein by reference in their entirety.

Although not specifically discussed in connection with this exemplary embodiment, embodiments of automated banking machines may also include depository devices. Such depository devices are operative to receive various deposited items from users. Examples of depository devices are shown in U.S. Pat. Nos. 7,156,295; 7,137,551; 7,150,394; and 7,021,529 the disclosures of each of which are incorporated herein by reference in their entirety.

The exemplary embodiment of the automated banking machine further includes a currency accepting device generally indicated 42. The currency accepting device includes a currency evaluation module 44. The currency evaluation module of the exemplary embodiment operates in a manner hereinafter described. The currency evaluation module is operative to receive a stack of sheets such as currency bills and to evaluate such bills for properties of genuineness or other features. The currency evaluation module of the exemplary embodiment is positioned in the upper housing 14 (see FIG. 4). The currency evaluation module operates to accept and deliver sheets to users through a fascia opening 46.

The exemplary embodiment of the currency accepting device 42 further includes a storage assembly 48. The storage assembly 48 of the exemplary embodiment is generally positioned in the secure chest 16.

Figure 4:
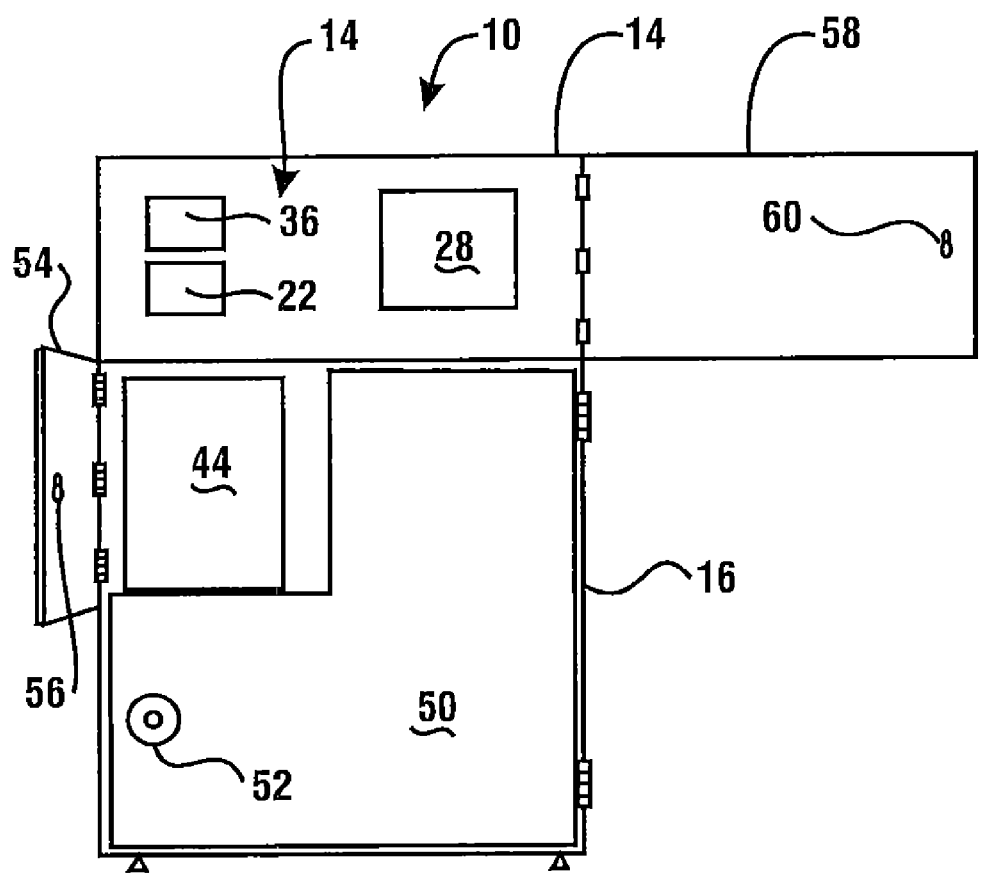
FIG. 4 is a back view of an exemplary machine.

In the exemplary embodiment which is shown from the back in FIG. 4, the secure chest is an L-shaped chest. The chest may include features described in U.S. Pat. No. 7,000,830, the disclosure of which is incorporated herein by reference in its entirety. The L-shaped chest includes a safe door 50. The safe door 50 may be held in a locked position through an associated lock 52. The lock 52 may be operative to control the locked and unlocked condition of a boltwork that is operative to securely hold the safe door in a closed position or to enable the safe door to be opened. As shown in FIG. 4 in the exemplary embodiment the currency evaluation module 44 is positioned outside the chest portion. The currency evaluation module may be accessed through an appropriate access door or similar structure 54. Access door 54 may be held in the closed position through operation of a lock 56. Further in the exemplary embodiment items that are positioned in the upper housing 14 may be secured against access by unauthorized persons through a lock 60. Of course it should be understood that these structures are exemplary and in other embodiments other approaches may be used.

In an exemplary embodiment the automated banking machine includes at least one terminal controller 62 which may be alternatively referred to herein as a computer or a processor. The terminal controller 62 is in operative connection with at least one data store 64. Data store 64 in the exemplary embodiment is comprised of computer readable media which is operative to store computer executable instructions and data which are used by the controller to operate the machine. In exemplary embodiments the computer readable media may include hard drives, flash memory, DVDs, CDs, magnetic media, optical media, solid state memory or other articles suitable for holding computer executable instructions. It should be understood that although in the exemplary embodiment a single controller and data store is schematically shown other embodiments may include numerous processors and data stores. For example some embodiments may include features described in U.S. Pat. Nos. 6,264,101 and/or 6,131,809 the disclosures of which are incorporated herein by reference in their entirety. The at least one terminal processor and at least one associated data store may also be referred to herein as control circuitry.

In the exemplary embodiment the terminal controller is operative to communicate with transaction function devices in the machine which are schematically referred to as 66. Transaction function devices 66 of the exemplary embodiment include devices of the automated banking machine that operate responsive to at least one terminal controller. In the exemplary embodiment the transaction function devices include a card reader, keypad, function keys, receipt printer, cash dispenser, currency accepting device and other devices that are operated in or in connection with the automated banking machine. It should be understood that these devices are merely exemplary and in other embodiments additional, different or lesser numbers of transaction function devices may be used.

In the exemplary embodiment the transaction function devices communicate through an interface bus schematically indicated 68. In the exemplary embodiment the interface bus 68 may include a universal serial bus (USB). The messages which control operation of the various transaction function devices as well as the messages therefrom as well as messages from the terminal controller pass through the interface bus. Of course it should be understood that different types of interface buses and communications and methodologies may be used in embodiments of automated banking machines.

The exemplary embodiment of the automated banking machine further includes a communications device schematically indicated 70. The communications device is suitable for providing communications between the machine and remote computers through one or more networks schematically indicated 72. Communication device 70 may include a suitable network communication card, modem, wireless communication device or other suitable device for communicating messages to and from the machine. Further exemplary embodiments may use proprietary networks, public networks or even the Internet for purposes of communication.

In the exemplary embodiment the automated banking machine 10 communicates with at least one remote computer that operates to carry out financial transfers of funds to, from and/or between accounts. These may be for example, computers located in a banking institution schematically indicated 74. Remote computer 74 may also include for example, remote computers operative to carry out credit transactions or other transactions including transfers of funds.

In some exemplary embodiments the automated banking machine may utilize principles for communication with remote computers and other features shown in U.S. Pat. Nos. 7,159,144; 7,162,449; 7,093,749; 7,039,600; 7,261,626; and/or 7,333,954 the disclosures of each of which are incorporated herein by reference in their entirety. Of course in other embodiments other approaches may be used.

In still other exemplary embodiments the automated banking machine may operate so as to enable users to receive marketing or other messages. This may be done in a manner like that shown in U.S. Pat. No. 7,379,893 the entire disclosure of which is incorporated herein by reference. In addition exemplary embodiments may communicate with systems that enable notification of remote servicers or other entities that help to maintain the automated banking machine in an operative condition. Communications with such entities may be accomplished in the manner shown in U.S. Pat. No. 7,366,646 the disclosure of which is incorporated herein by reference in its entirety.

Exemplary embodiments of the automated banking machine may also have operating in the terminal controller, diagnostic software applications that are suitable for facilitating diagnosis and cure of conditions that may occur at the automated banking machine. This may be done for example in the manner described in U.S. Pat. Nos. 7,104,441; 7,163,144; 7,093,749; and/or 6,953,150 the entire disclosures of each of which are incorporated herein by reference.

In addition the automated banking machine may operate to capture images of users of the machine so as to provide records of functions carried out and/or to identify particular users that may conduct transactions at the machine. This may be done through operation of the terminal controller and/or by communication through the terminal controller or other processor with remote networks. Some embodiments may operate in a manner that employs the principles described in U.S. Pat. No. 7,147,147 the disclosure of which is incorporated herein by reference in its entirety.

Of course it should be understood that the features described are exemplary and in other embodiments other approaches may be used.

In conducting transactions through operation of the exemplary embodiment of the automated banking machine the currency accepting device may operate to receive one or a stack of currency bills through the fascia opening 46. It should be understood that the fascia opening is controlled by a suitable door or gate 76. The gate is operative to prevent access through the opening 46 except at appropriate times when transactions are being conducted by authorized users. Currency bills input through the opening are engaged by a stack handling mechanism 78. The exemplary stack handling mechanism is operative to receive a stack of bills from the user as well as to present bills to a user. In the exemplary embodiment the stack handling mechanism may be of the type shown in U.S. patent application Ser. No. 11/983,410 filed Nov. 8, 2007 the entire disclosure of which is incorporated herein by reference. Alternatively the stack handling mechanisms may be of the type shown in U.S. Pat. Nos. 6,983,880 and/or 6,109,522 the entire disclosures of each of which are incorporated herein by reference. Of course these approaches are exemplary and in other embodiments other approaches may be used.

Stacks of currency sheets input to the exemplary embodiment are separated one by one from the stack through operation of a picker mechanism schematically indicated 80. The exemplary picker mechanism operates using the principles of the incorporated disclosures such that the currency bills are moved and separated one at a time from the stack. Further in exemplary embodiments double bills that may be picked are separated from one another and/or returned to the stack so that efforts can be made to separate each bill individually.

Bills that have been separated from the stack are moved into a document alignment mechanism schematically indicated 82. The document alignment mechanism 82 is operative to orient the currency bills in registration with the sheet path so as to facilitate the analysis thereof. Document alignment mechanism 82 may include features like those shown in U.S. Pat. Nos. 7,213,746 and/or 6,109,522 the entire disclosures of each of which are incorporated herein by reference.

Once documents have been aligned by the document alignment device 82, documents are passed through a sensing module 84. Sensing module 84 of an exemplary embodiment includes a plurality of different types of sensors. These may include for example, sensors that are operative to image a document or portions thereof. They may also include sensors that detect reflectance from and transmission of radiation through various areas on the document. Such sensors may further include magnetic sensors, fluorescence sensors, RFID sensors, ultrasonic sensors or other sensors suitable for detecting characteristics that may be used to determine the genuineness or other properties of currency bills or other sheets that are passed through the sensing module. Exemplary sensing modules may include for example features and principles such as those described in U.S. Pat. Nos. 7,366,250 and/or 6,774,986 the disclosures of each of which are incorporated herein by reference. Of course it should be understood that these approaches are exemplary and in other embodiments other approaches may be used.

Currency bills that have been moved through the sensing module 84 are passed along a transport and selectively directed by one or more gates schematically indicated 86 to desired locations or devices within the machine. For example in some exemplary modes of operation, currency bills that have passed through the sensing module 84 may be directed for storage on a storage device schematically indicated 88. In the exemplary embodiment the storage device may comprise a belt type recycler. The belt type recycler may be operative to store each currency bill in the sequence received, and then to subsequently deliver those currency bills in a last in/first out sequence. Exemplary storage devices may include features like those shown in U.S. Pat. No. 6,227,446 the disclosure of which is incorporated herein by reference. Of course the belt type recycler described is exemplary and other devices and other types of storage and recovery systems may be used.

In other modes of operation gates 86 may be operative to direct currency bills along a transport that causes such bills to be returned to the stack handling mechanism 78. This may be done for example in circumstances where it is determined that the particular sheet is a blank sheet or other sheet that is not of a type that can be accepted by the machine. As a result the sheet may be immediately rejected and returned to the stack handling mechanism 78 which may operate in response to the terminal controller to return the sheet to a user. Of course this approach is exemplary.

In still other embodiments the terminal controller may operate to cause a gate 90 to direct selected sheets to a document segregation compartment 92. Document segregation compartment 92 may be used in some embodiments for storage of sheets that are determined to be counterfeit through operation of the sensing module. Alternatively or in addition in some embodiments the document segregation compartment may be used for storing sheets that are suspect as potentially counterfeit, or other types of sheets that are not acceptable to the machine. Of course this approach is exemplary and in other embodiments other approaches may be used.

In the exemplary embodiment one or more gates 86 may also operate to direct sheets from the currency evaluation module to an intermodule transport 94. The intermodule transport 94 in the exemplary embodiment is operative to accept sheets from the currency evaluation module and deliver them into the storage assembly 48. As can be appreciated, in the exemplary embodiment the intermodule transport 94 is operative to enable sheets to be moved from the currency evaluation module 42 which in the exemplary embodiment is outside the chest, into the interior area of the secure chest.

Documents that move through the intermodule transport are engaged with a sheet directing assembly 96. Exemplary sheet directing assembly 96 is operative to selectively direct sheets responsive to communication with the at least one terminal controller to cause sheets to be directed and stored in selected storage locations. In the exemplary embodiment these selected locations include a sheet holding compartment in a first removable sheet stacking container 98 or within a sheet holding compartment in a second removable sheet stacking container 100. Alternatively in the exemplary embodiment the sheet directing assembly may direct sheets to a middle storage location schematically indicated 102. Of course these structures and configurations are exemplary and in other embodiments other approaches may be used.

In exemplary embodiments operation of the currency accepting device includes receiving a stack of currency bills from a user into the machine. After each sheet has been aligned by the document alignment mechanism and moved past the sensing devices in the sensing module, the sheets are directed to the storage device where they are stored pending analysis of the sheets and/or other transaction steps or determinations made through operation of the terminal controller and/or other connected systems. This includes for example evaluating each sheet for genuineness, determining the denomination of each currency bill, evaluating features of the sheet that may indicate that it is counterfeit or suspect, or other steps. Such determinations may also include receiving inputs from a user confirming the value of sheets included in the transaction, indicating whether the user wishes to deposit the sheets, and other inputs.

In an exemplary mode of operation, sheets stored in the storage device that are to be deposited may be directed through operation of the one or more gates 86 into the storage assembly 48 where they are selectively routed to an appropriate storage container for the particular type of sheet, or to the middle storage compartment. Further in the exemplary mode of operation, counterfeit or suspect counterfeit sheets are directed from the storage device 88 to the document segregation compartment 92. Other sheets that are not routed to other areas may be returned to the user. This may be done for example by returning the sheets to the stack handling mechanism 78 and presenting those sheets to the user through the opening 46.

In addition exemplary embodiments may operate in accordance with features of the incorporated disclosures to allow a user to request a return of all of the currency bills or other sheets that they have placed in the machine. This may be done for example in response to user inputs if the user decides that the type and character of the sheets they have deposited do not correspond with the automated banking machine determination concerning the nature of the sheets. Alternatively and/or in addition the terminal controller may provide a user with outputs that correspond to options including for example the ability to resubmit for further evaluation by the machine, those sheets which the machine was not able to validate as genuine sheets during an initial analysis. Of course numerous approaches may be taken based on the programming of the particular terminal controller.

It should further be understood that although the exemplary embodiments of the currency accepting device 42 is described with reference to handling currency bills, other embodiments may operate using the described features for handling other types of financial instruments or other sheets. These may include for example the handling and analysis of checks such as have been described in the incorporated disclosures. For example some exemplary embodiments may receive, evaluate and store financial checks. Other exemplary embodiments may operate to receive and store both checks and currency bills. Other exemplary embodiments may operate to receive, analyze and store other types of sheets such as money orders, travelers checks, gaming materials, vouchers, script, gift certificates, gift cards, or other sheets associated with transactions. Of course these approaches are exemplary and in other embodiments other approaches may be used.

It should further be understood that exemplary embodiments may also incorporate sheet recycling principles of the types described in the incorporated disclosures. This may include for example receiving financial instrument sheets such as currency bills from a particular user and storing valid bills within the machine. Thereafter other users who may be requesting to receive cash from the automated banking machine are dispensed the currency bills that the machine has previously received from other users and determined to be valid. Of course these approaches are exemplary and in other embodiments other approaches may be used.

Figure 5:
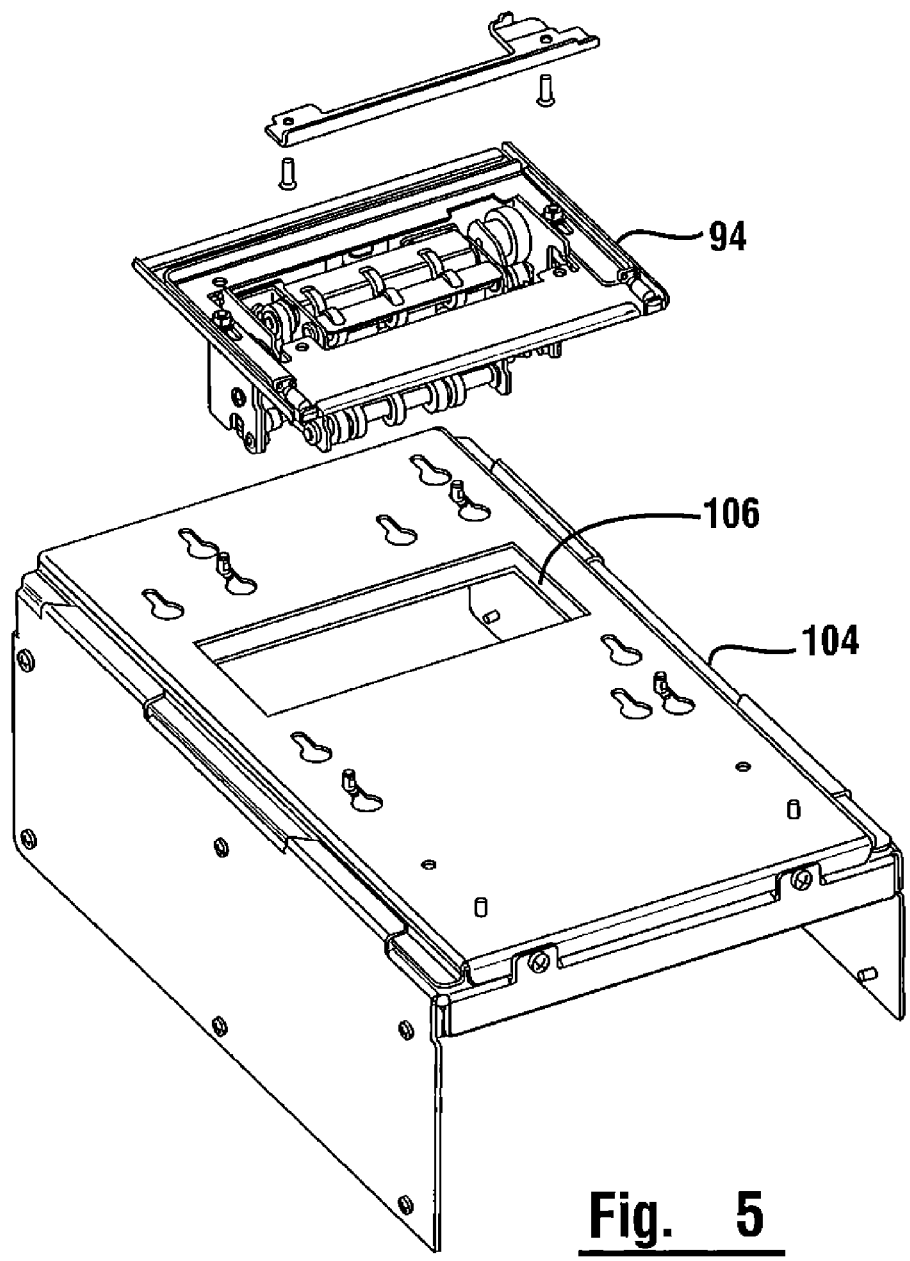
FIG. 5 is an exploded view of a support and sheet transport module that operates to transport sheets between a sheet accepting module and storage modules within a secure chest.
Figure 6:
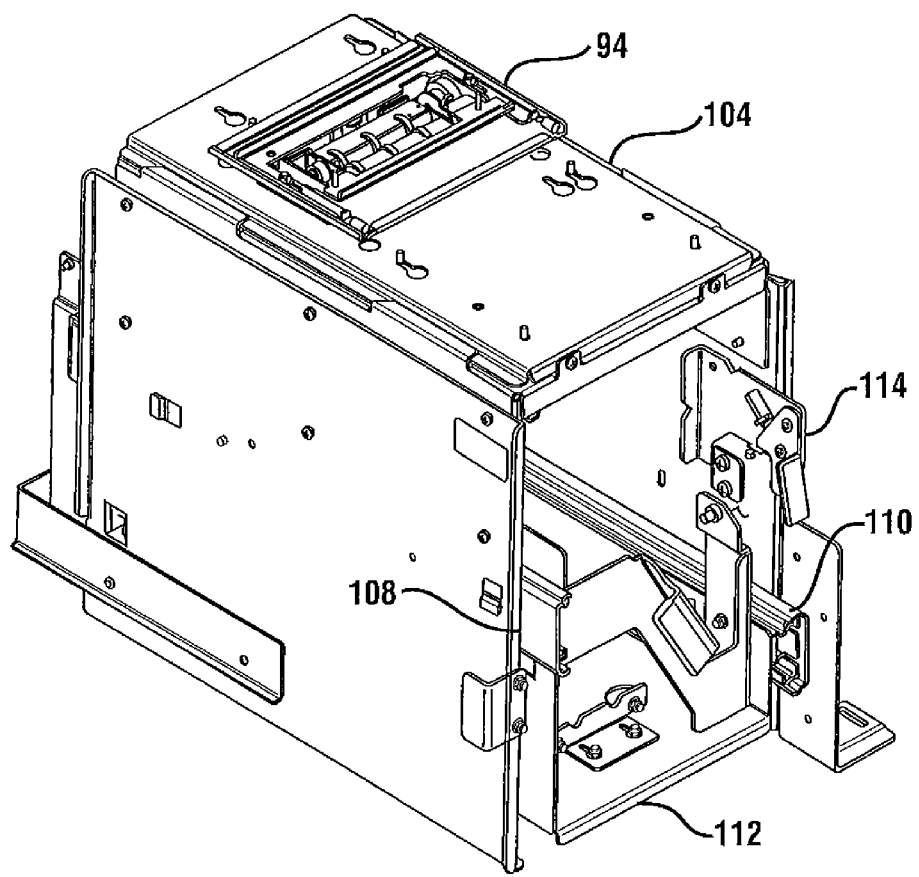
FIG. 6 is an isometric view of a housing structure including a slide-out tray used for holding storage containers within the secure chest.
Figure 8:
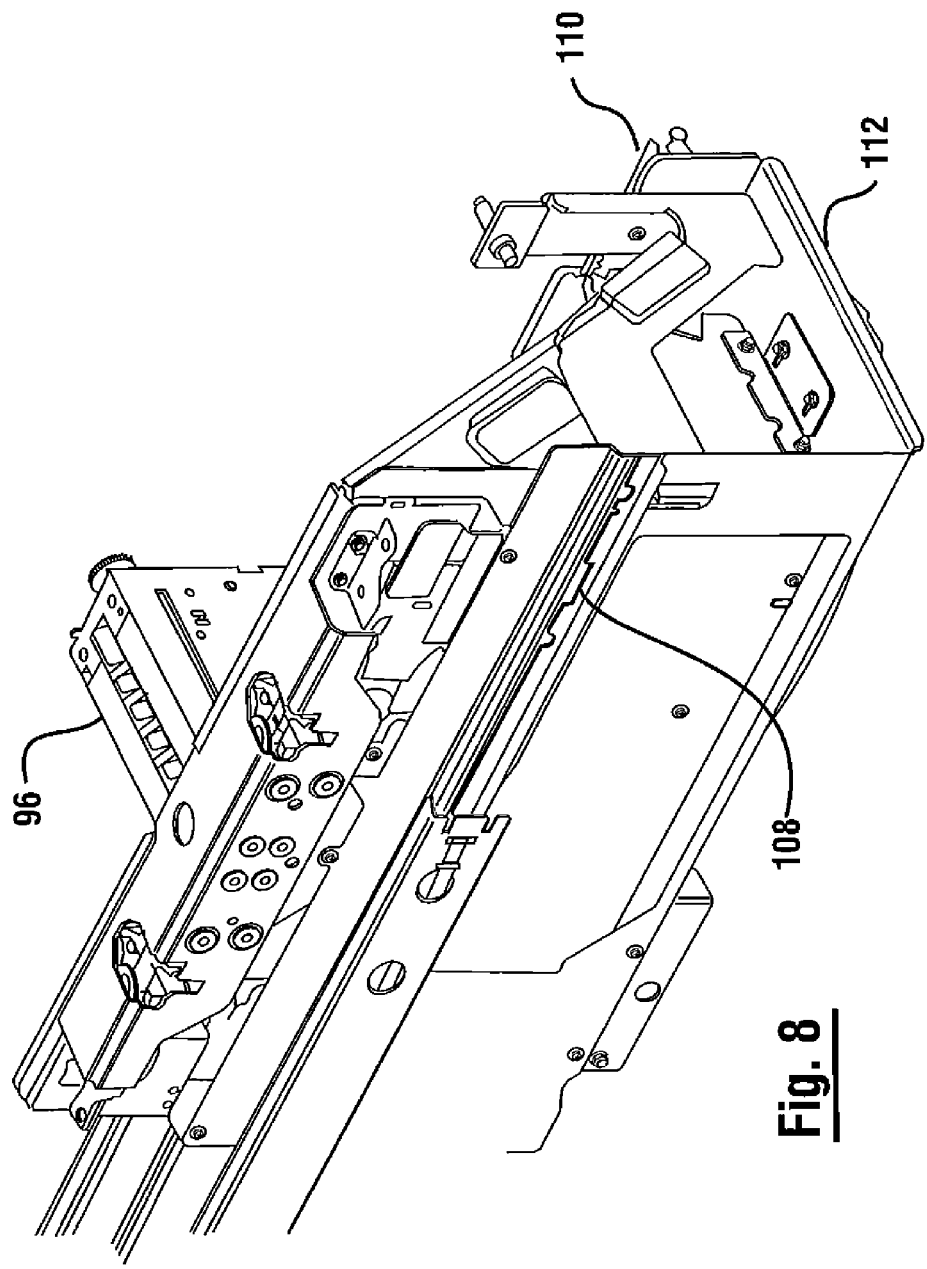
FIG. 8 is a back isometric view showing the tray in the extended position.

FIGS. 5 and 6 show the exemplary intermodule transport 94 which is in supporting connection with a box frame 104. In the operative position box frame 104 in the exemplary embodiment is positioned within the secure chest. The upper portion of the box frame includes an opening 106 through which the intermodule transport extends. As best shown in FIG. 6 box frame 104 includes slides 108, 110. The slides are in movable supporting connection with a tray 112. Tray 112 in the exemplary embodiment operatively supports removable stacking containers 98 and 100 as well as the sheet directing assembly 96. As shown in FIG. 6 a latch 114 is in operative connection with the tray 112. When the tray is in its retracted position within the secure chest, actuation of the latch 114 is operative to release the tray such that the tray can be extended outward when the chest door is open in supporting connection with the slides. This is represented schematically in FIG. 8. Further as can be appreciated in the exemplary embodiment with the tray 112 extended to a position outside the chest, the removable containers 98 and 100 can be removed from engagement with the tray 112. In addition with the containers removed, a door 116 can be opened such that a person servicing the machine can gain access to those sheets which have been moved into the middle compartment 102.

Figure 3:
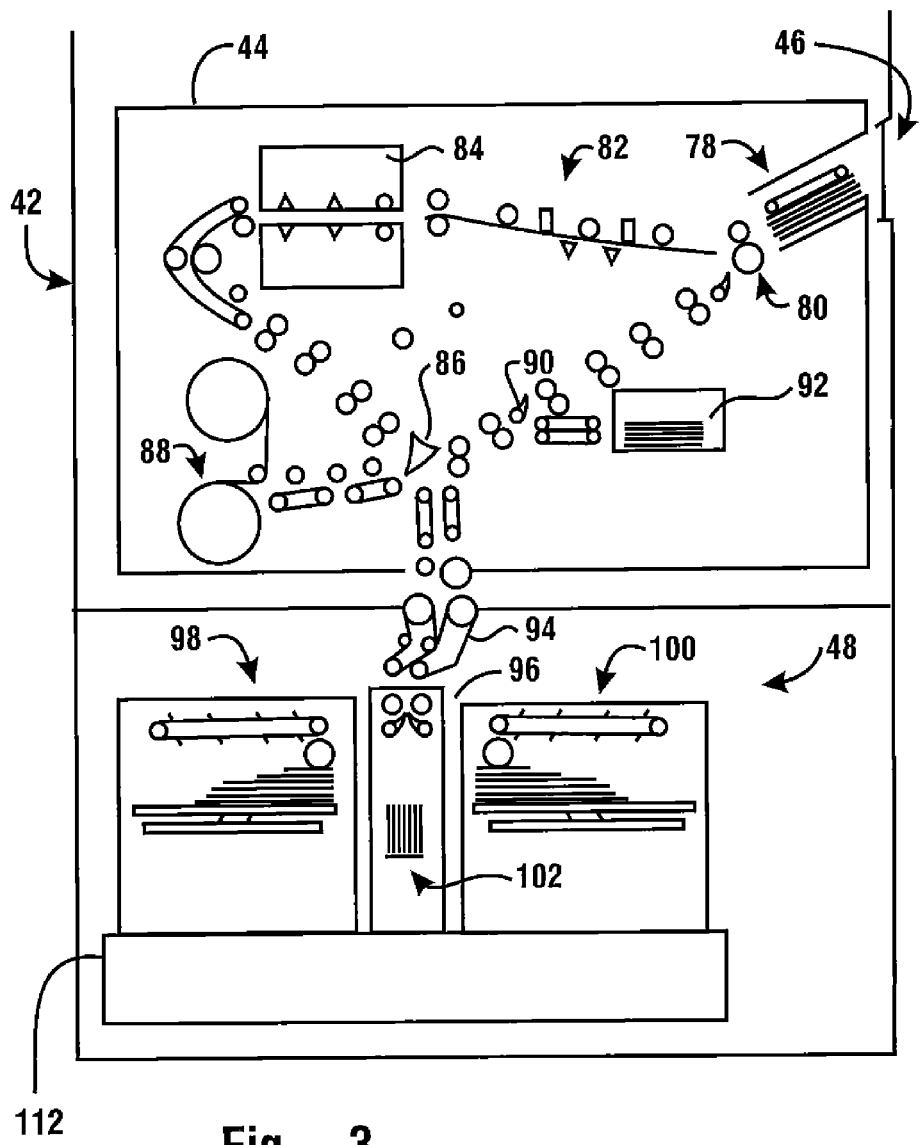
FIG. 3 is a schematic view of an exemplary sheet accepting and storage system within the exemplary machine.
Figure 7:
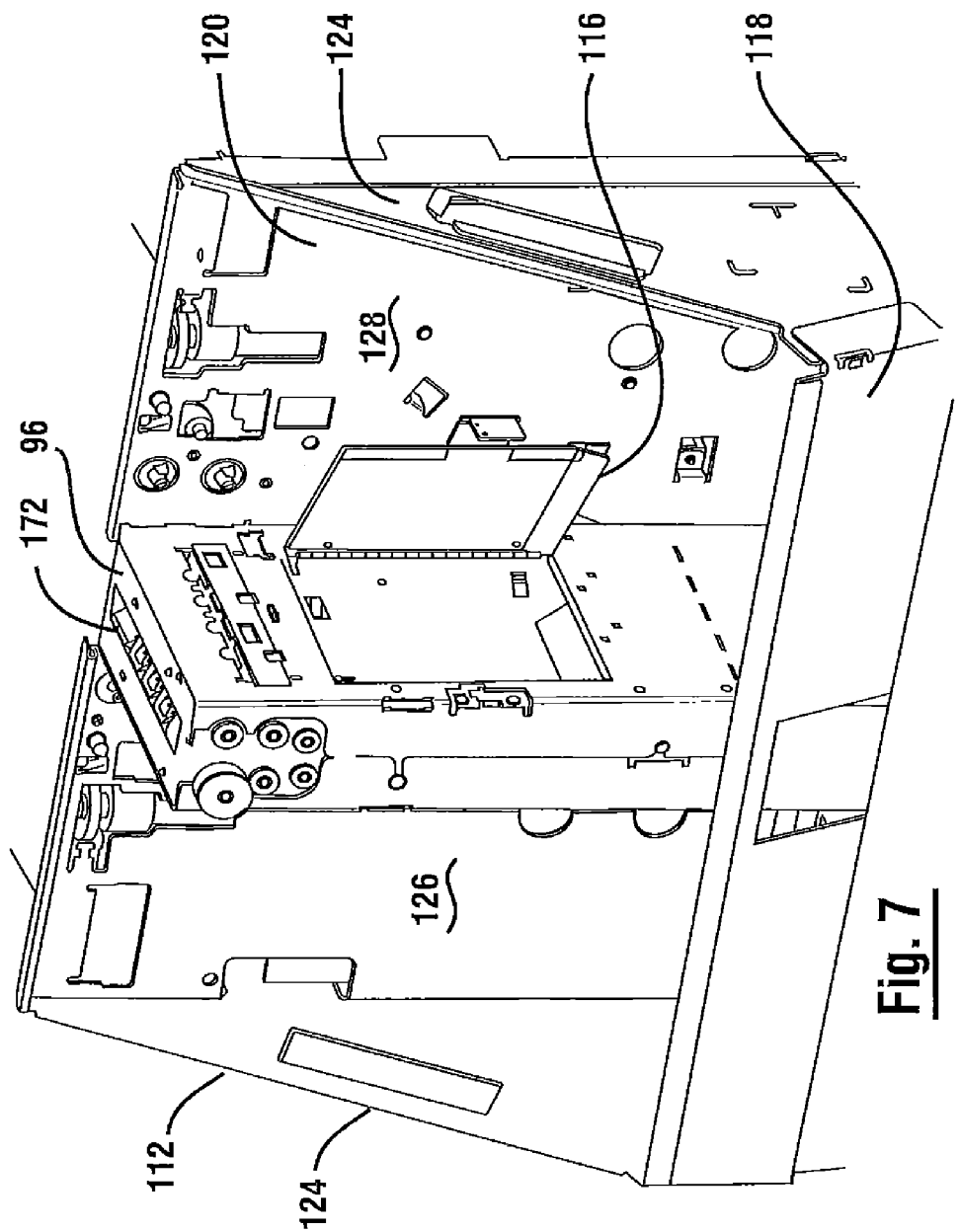
FIG. 7 is an opposite hand isometric view showing the tray for supporting sheet holding containers.
Figure 9:
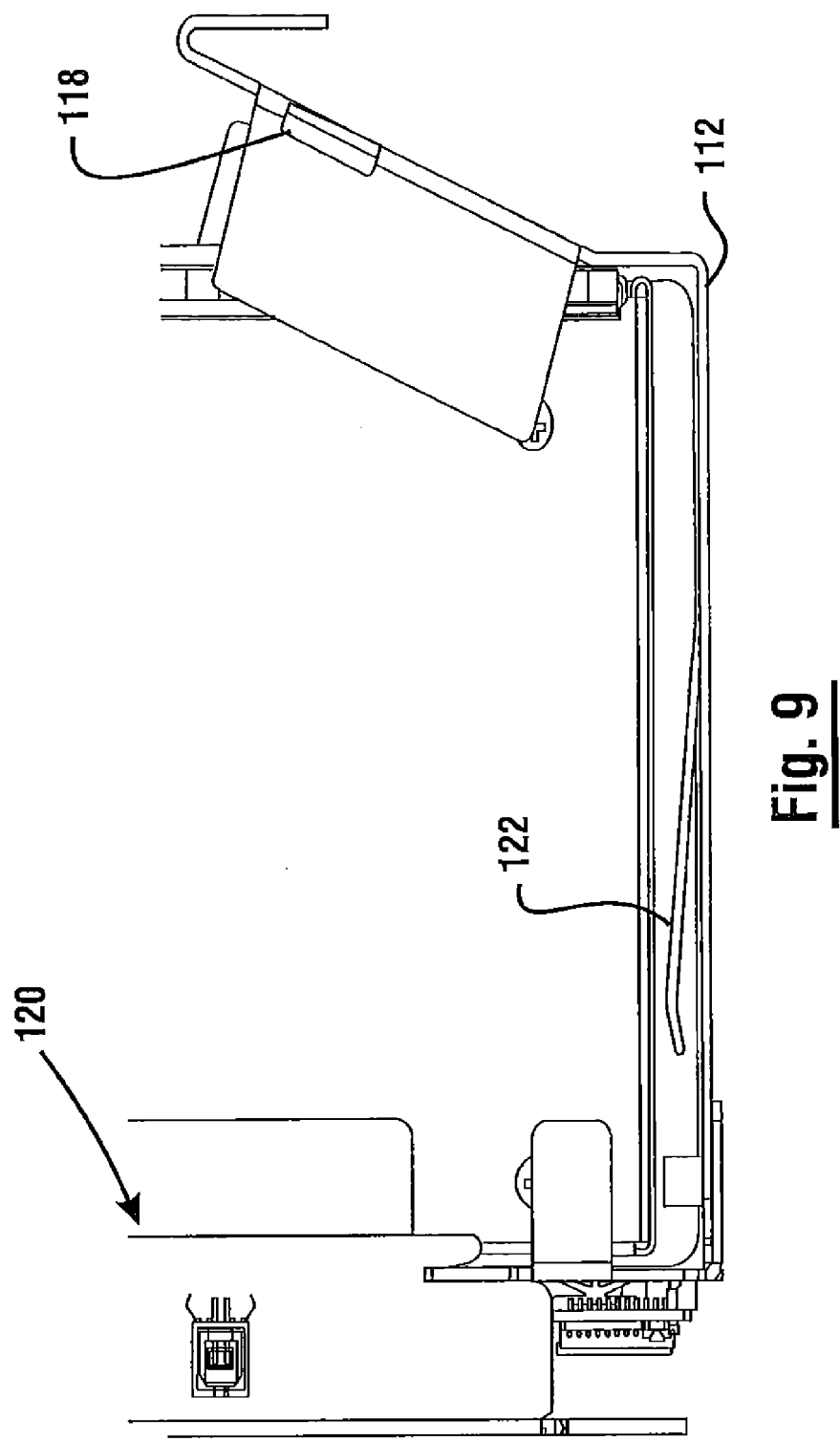
FIG. 9 is a cross-sectional bottom view of the tray including spring structures that facilitate removal of the containers.

As can be seen from FIGS. 3 and 7 exemplary tray 112 includes a low front wall 118 and a relatively higher back wall 120. As best shown in FIG. 9 in the exemplary embodiment front wall 118 is angled generally outward. This construction in the exemplary embodiment facilitates moving the containers 98, 100 angularly away at the top from the back wall 120 to facilitate the removal thereof. Further as shown in FIG. 9 the lower surface of tray 112 of the exemplary embodiment includes integral leaf springs 122. The integral leaf springs 122 are configured so as to facilitate biasing the containers so as to move away from the back wall at the top. Of course this approach is exemplary and in other embodiments other approaches may be used.

As can be seen in FIG. 7 the tray 112 further includes side walls 124. The side walls of the exemplary embodiment along with the front wall 118, back wall 120 and sheet directing assembly 96 are operative to bound an area 126 for releasibly holding container 98. Likewise on an opposed side of the sheet directing assembly the front wall 118, back wall 120 and side wall 124 bound an area 128. Area 128 is configured for releasibly accepting container 100 when door 116 is in the closed position. Of course this configuration is exemplary and in other embodiments other approaches may be used.

Figure 10:
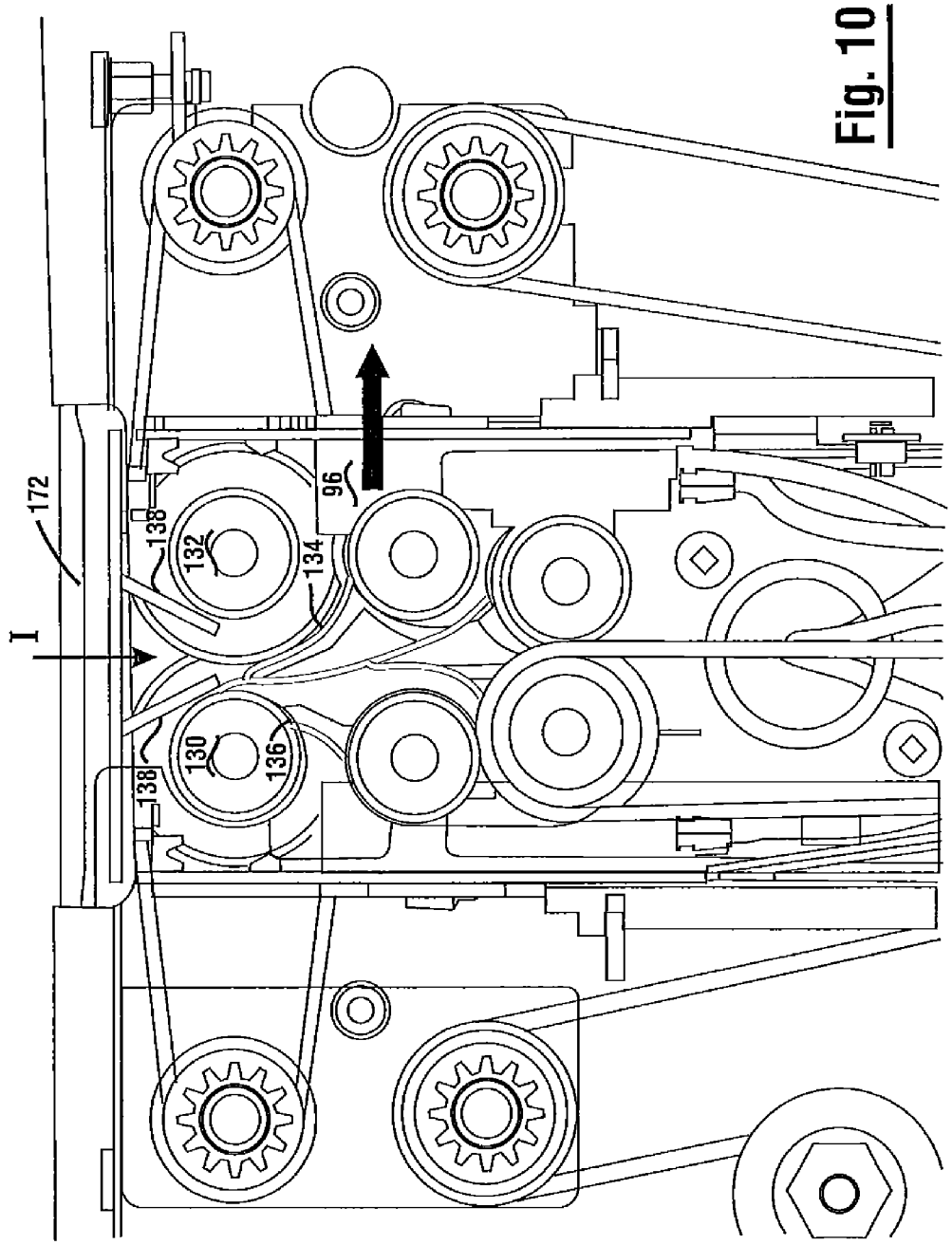
FIG. 10 is an enlarged view of a sheet directing transport which is operative to direct sheets selectively to sheet holding containers.
Figure 11:
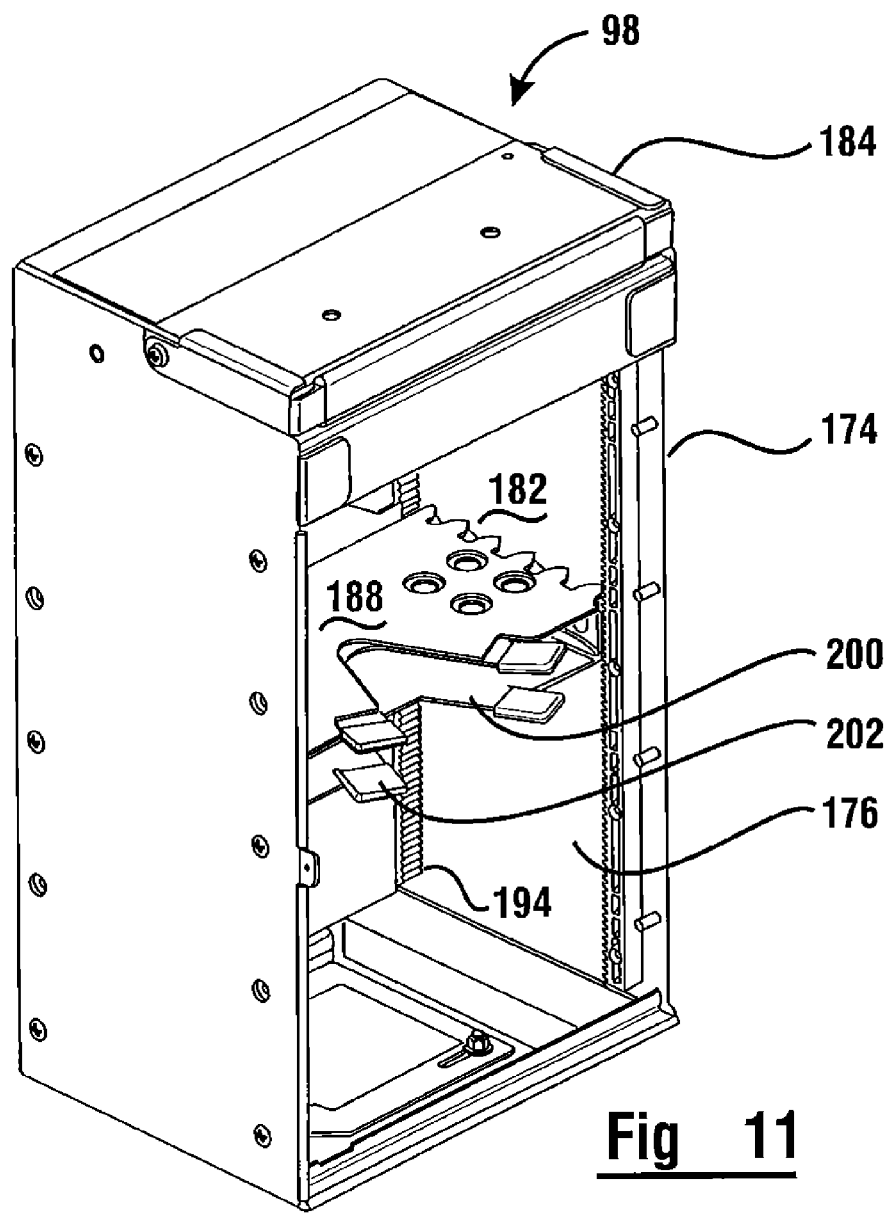
FIG. 11 is an isometric view of an exemplary sheet holding container.

The exemplary sheet directing assembly 96 is shown in greater detail in FIG. 10. Sheets that have passed through the intermodule transport 94 enter the sheet directing assembly 96 through an opening in the top thereof and pass between rolls 130, 132. The entry of sheets between the rolls through the top opening is represented by arrow I. Sheet directing gates 134, 136 are in operative connection with suitable actuators so as to selectively position the gates responsive to signals from the terminal controller. In the condition shown in FIG. 10, gates 134 and 136 are positioned such that sheets entering the sheet directing assembly are caused to move to the right as shown and into sheet holding container 100. Thus in this condition sheets that enter the assembly 96 are so directed until the conditions of gates 134 and 136 are changed.

In response to appropriate signals the positions of the gates may be reversed such that sheets entering assembly 96 may be directed to the left as shown through an outlet opening in the sheet directing assembly and into the container 98. In addition in the exemplary embodiment the gates may be controlled such that sheets entering the sheet directing assembly may pass in a straight through manner into the middle storage compartment 102. Of course these approaches are exemplary and in other embodiments other approaches may be used.

As can be appreciated sheets that pass from the intermodule transport 94 into the sheet directing assembly 96 move downward through a gap in generally unsupported relation. Further as can be appreciated because the intermodule transport and sheet directing assembly are relatively movable, the intermodule transport and sheet directing assembly may not necessarily always be precisely positioned. The movement of sheets into the sheet directing assembly is facilitated through the use of inward directed guides 138. Guides 138 cooperate with the engaging action of rollers 130, 132 to draw sheets into the pinch area between the rollers. This helps to assure that sheets may reliably pass even in conditions with minor misalignment.

The exemplary intermodule transport 94 further facilitates the passage of sheets both from the currency evaluation module 44 outside the chest through an opening in the chest wall and into the sheet directing assembly. The exemplary intermodule transport 94 is shown in greater detail in FIGS. 23 through 27. As represented schematically in FIG. 23 the intermodule transport includes a pair of rolls 140, 142. The rolls 140 and 142 support thereon continuous belts which in the exemplary embodiment comprise ultrahigh molecular weight urethane. In this exemplary embodiment the belts 144 and 146 operate in direct contact with one another to move sheets therebetween. Belts 144 and 146 are operative to move sheets from an inlet nip 148 to an outlet 150. Further in the exemplary embodiment the intermodule transport 94 is operative to provide a generally 90 degree turn for sheets passing therethrough. This configuration reduces the risk that criminals who may gain access to the upper housing portion of the machine can fish out currency notes that are stored within the chest. This is because the opening between the belts is offset from the opening on the top of the sheet directing assembly 96. Further the structure of the sheet holding containers of the exemplary embodiment generally prevent access by criminal tools from the opening in the safe in which the intermodule transport is positioned, to the interior of the cassettes where substantial quantities of sheets are generally held. Further the exemplary structure of the intermodule transport facilitates passing sheets through a relatively thick safe wall at the top of the chest portion.

A further useful aspect of the exemplary embodiment is that the rolls 140 and 142 provide a relatively wide area in which sheets may engage the rolls and be drawn between the belts. In addition the exemplary embodiment includes a slight gap in the area between the rolls to further facilitate drawing in the sheets. As can be seen, as the sheets are moved into the transport from the inlet nip 148, the gap between the belts in the undeformed condition closes so as to facilitate the positive transport of the sheets. As can be appreciated the exemplary embodiment of the currency evaluation module 44 is relatively movable with regard to the supporting surface of the L-shaped chest. In exemplary embodiments the module is made relatively movable by being supporting on slides or other suitable movable guides. Thus, the module through movement may become slightly misaligned relative to the intermodule transport. The exemplary configuration of the intermodule transport compensates for such misalignment.

Figure 26:
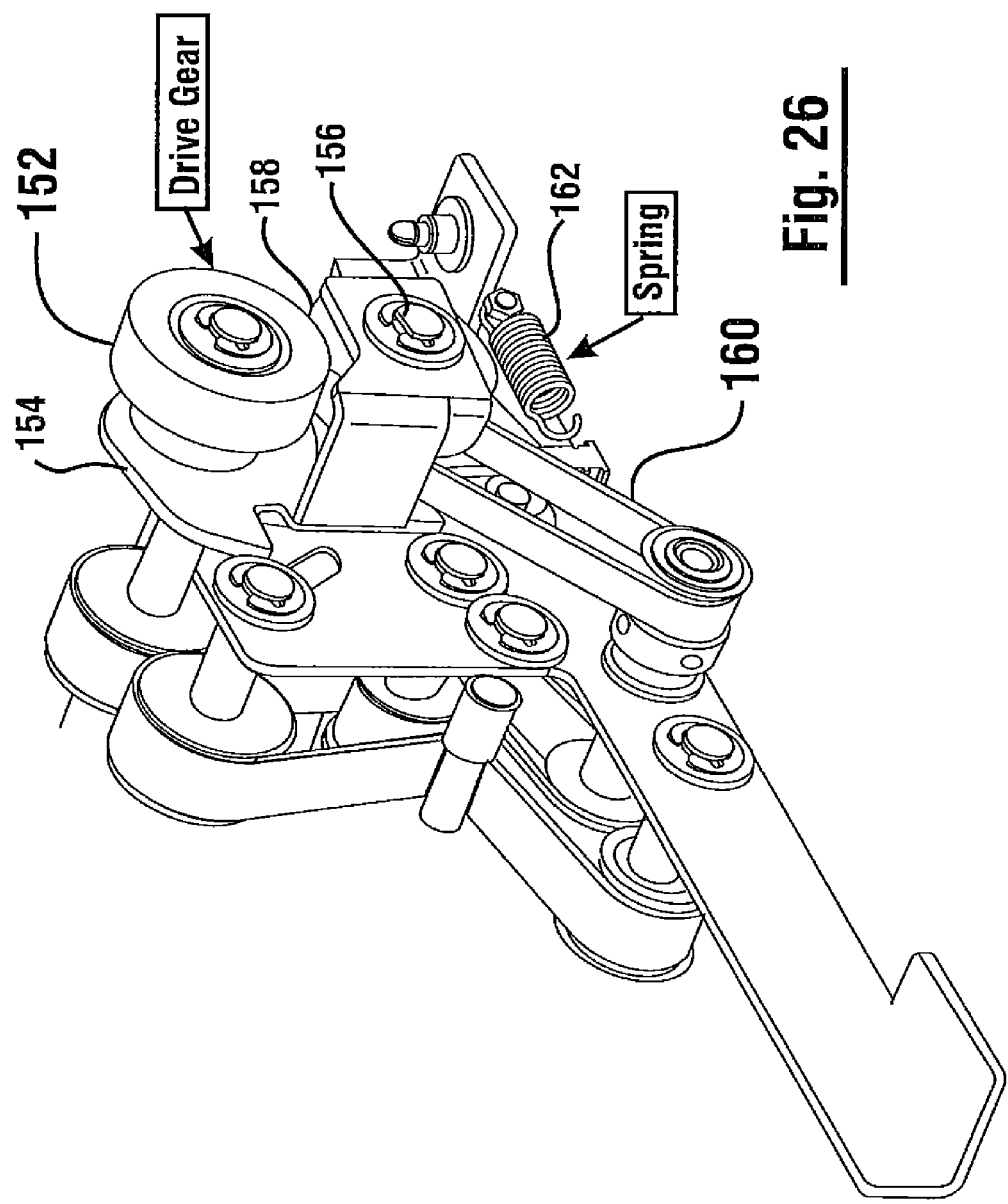
FIG. 26 is an enlarged view of the intermodule sheet transport and drive gear.

Further in the exemplary embodiment the intermodule transport includes a drive gear 152. The drive gear 152 is operative to engage a mating gear on the currency evaluation module 44. The mating gear on the currency evaluation module operates to provide power in the form of rotational movement to the drive gear of the intermodule transport. Thus, the currency evaluation module is able to control the transport of sheets mechanically through the intermodule transport. Due to the potential variance in position of the currency evaluation module, the exemplary drive gear 152 is mounted in supporting connection with a rotatable support 154. The rotatable support 154 is rotatable about a shaft 156 as best shown in FIG. 26. Also supported in rotatable connection with shaft 156 is a driven gear 158. Due to this mounting structure drive gear 152 is rotatable about driven gear 158. The driven gear 158 is in operative connection with a pulley which drives a belt 160 which in turn drives the belts 144, 146 of the intermodule transport.

Figure 23:
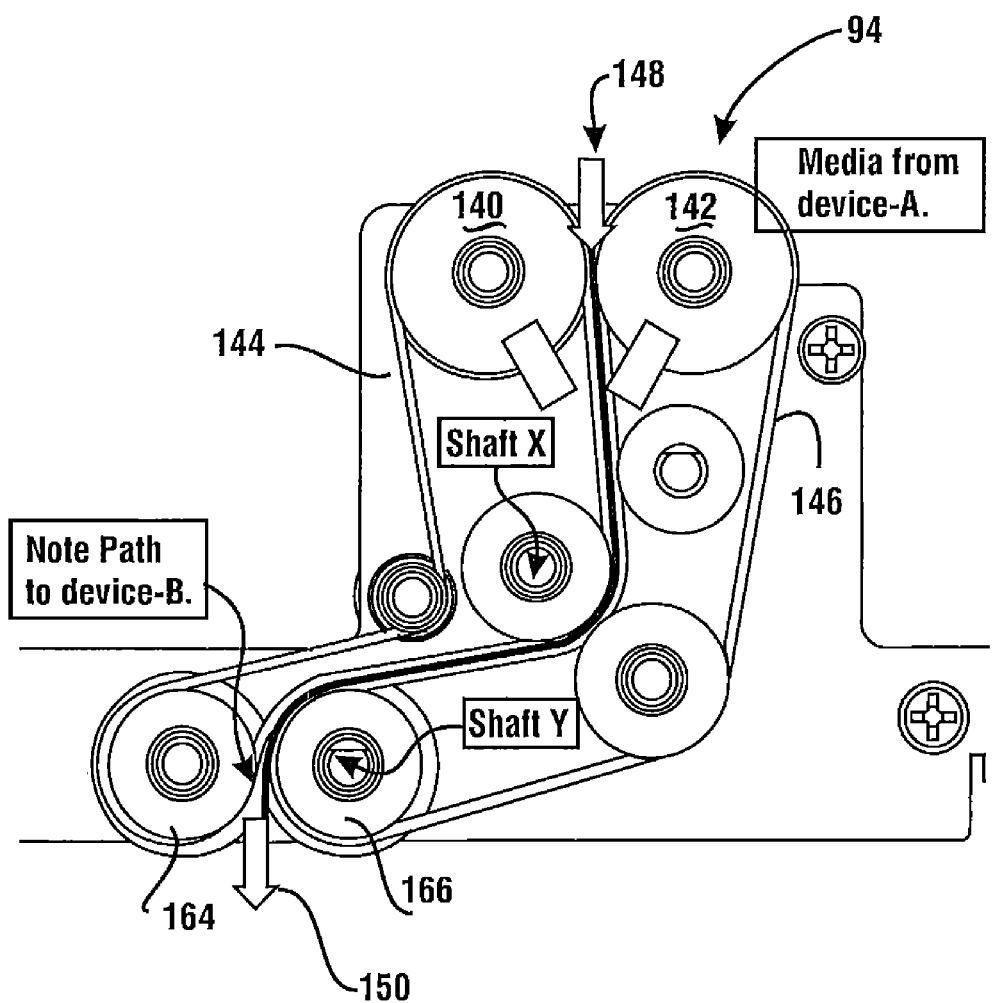
FIG. 23 is a schematic view of an intermodule sheet transport.
Figure 24:
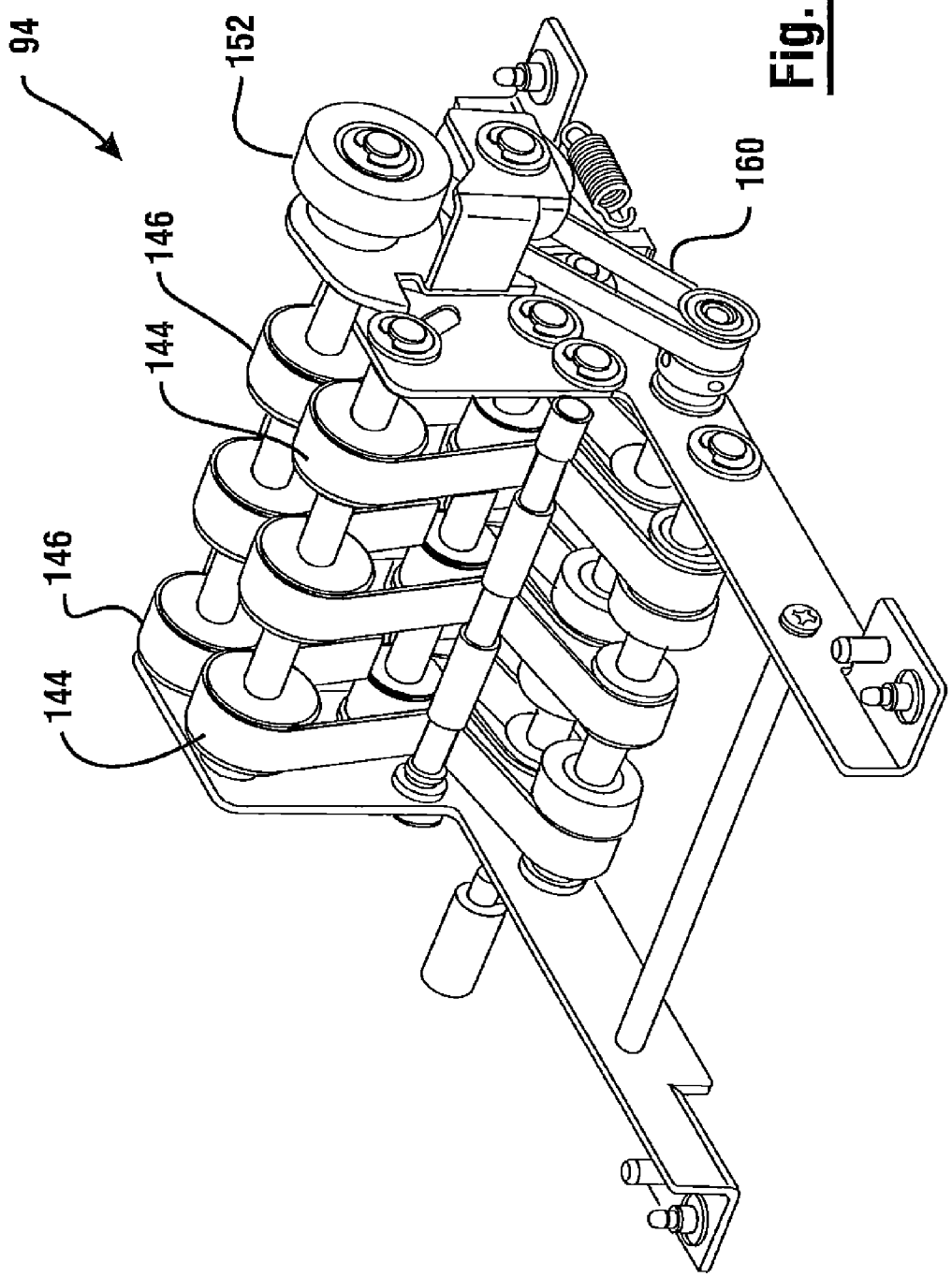
FIG. 24 is an isometric view of the intermodule sheet transport shown in FIG. 23.

A spring 162 is operative to bias the rotatable support 154 in a counterclockwise direction as shown in FIG. 23. In the exemplary embodiment when the currency evaluation module is moved inward into the housing of the machine, the gear thereon engages drive gear 152 and moves it clockwise with the rotatable support against the force of the spring 162. As can be appreciated the position in which the currency evaluation module is placed in position for operation can be varied somewhat linearly as long as the drive gear 152 is engaged with the mating gear on the module. Thus a relatively large amount of variance in the operative position of the module may occur while still providing effective operation of the intermodule transport. Of course this approach is exemplary, and in other embodiments other approaches may be used.

Figure 27:
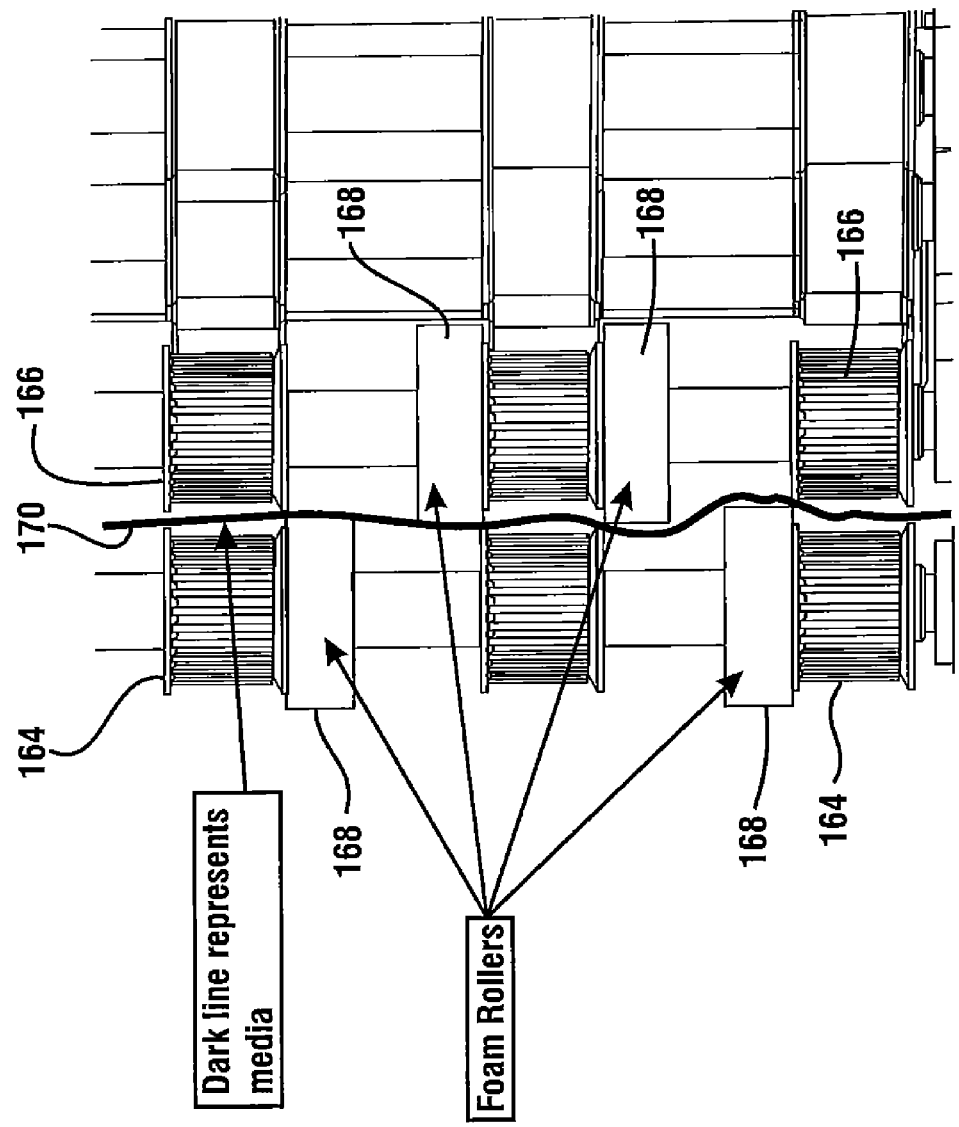
FIG. 27 is a schematic view showing the orientation of sheets passing out of the intermodule transport.

The exemplary intermodule transport further includes outlet rolls 164, 166. Outlet rolls 164 and 166 are operative to support belts 144 and 146 and engage bills that pass from the outlet 150. In the exemplary embodiment rolls 164 are supported on a relatively movable shaft which is biased toward engagement with rolls 166. Further in the exemplary embodiment outlet rolls 164 and 166 have foam rollers 168 positioned adjacent thereto on the roller support shafts. As best shown in FIG. 27 the foam rollers are operative to impart a cross-sectional wave configuration to sheets such as sheet 170 which pass therethrough. This cross-sectional wave configuration provides rigidity to the sheets to facilitate movement of the sheets from the outlet 150 and into the opening 172 at the top of sheet directing assembly 96. Of course this approach is exemplary, and in other embodiments other approaches may be used.

FIGS. 11 through 14 show an exemplary embodiment of sheet stacking container 98. It should be understood that in the exemplary embodiment sheet stacking container 100 is generally constructed in a manner similar to container 98 but is a mirror image thereof. Container 98 includes a body 174. The exemplary body is comprised of plastic, aluminum or other material that enables sensing magnetic fields therethrough. Body 174 includes a front opening 176. In exemplary embodiments opening 176 may be selectively closed by one or more doors 178 schematically shown in FIG. 12. In addition in the exemplary embodiment the door 178 includes a lock 180 so that only authorized persons are enabled to gain access to the sheet holding compartment generally indicated 182 that is within the interior area of the body.

Figure 12:
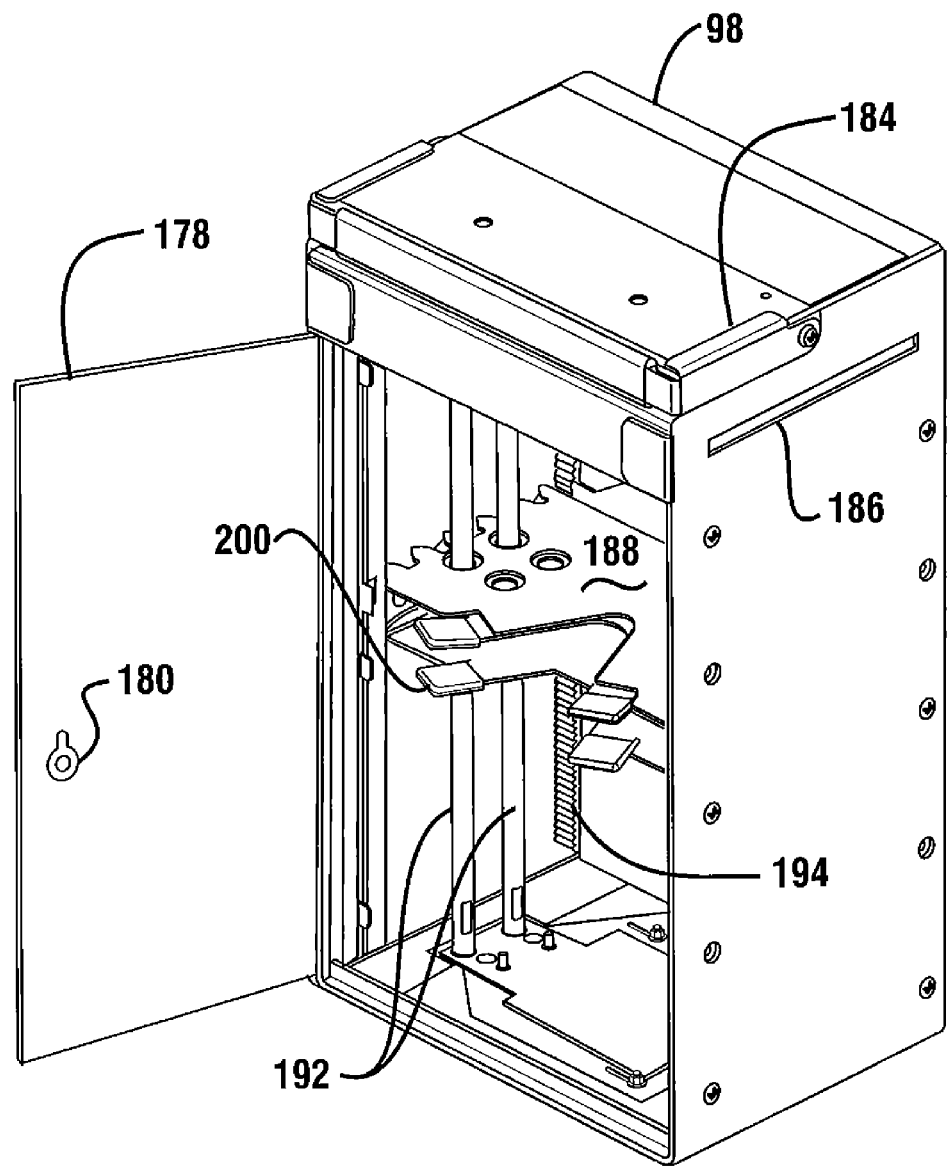
FIG. 12 is an opposite hand isometric view of the sheet holding container shown in FIG. 11.
Figure 13:
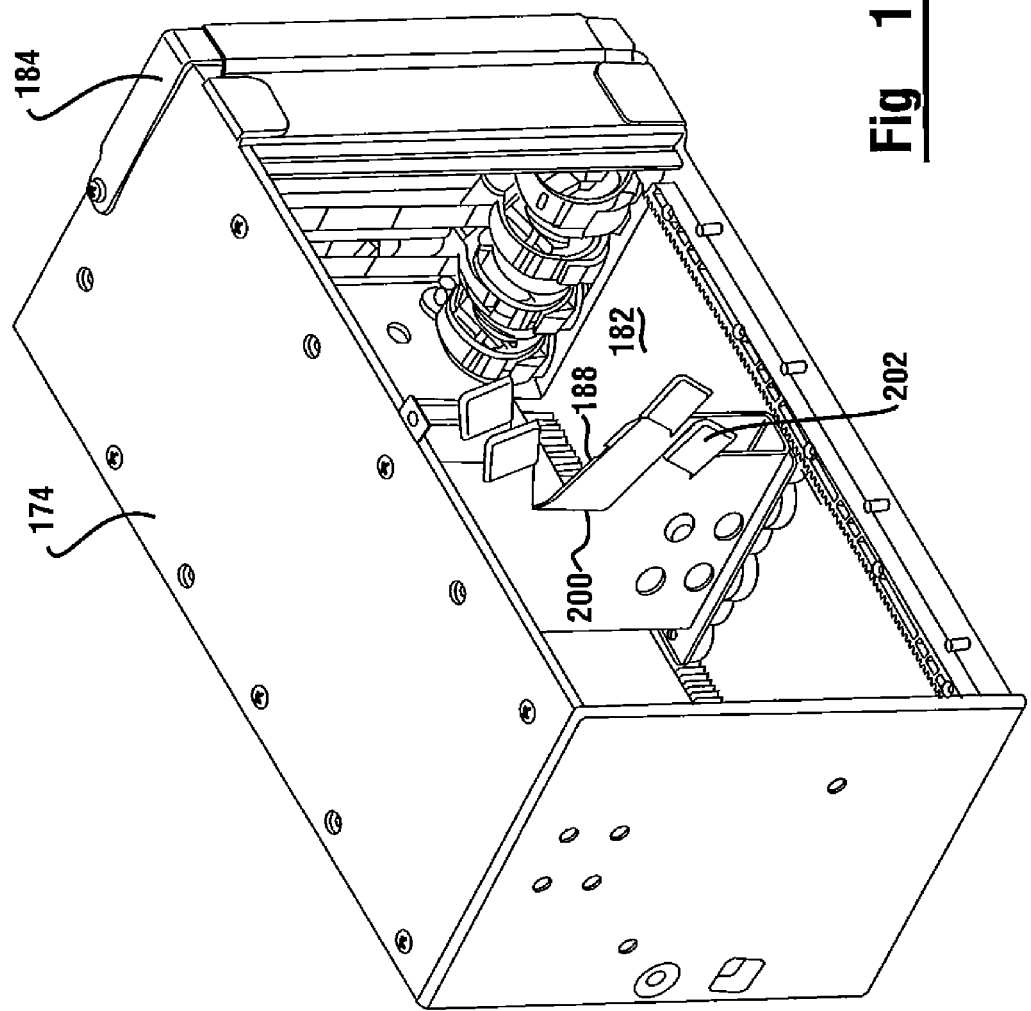
FIG. 13 is a bottom isometric view of the sheet holding container.

The exemplary container further includes an external handle 184. Handle 184 is a rotating handle that can be lifted to facilitate removal of the container 98 from engagement with tray 112. In addition as best shown in FIG. 12 container 98 includes an opening 186. Opening 186 enables sheets from the sheet directing assembly 96 to pass inwardly into the sheet holding compartment of container 98.

Figure 15:
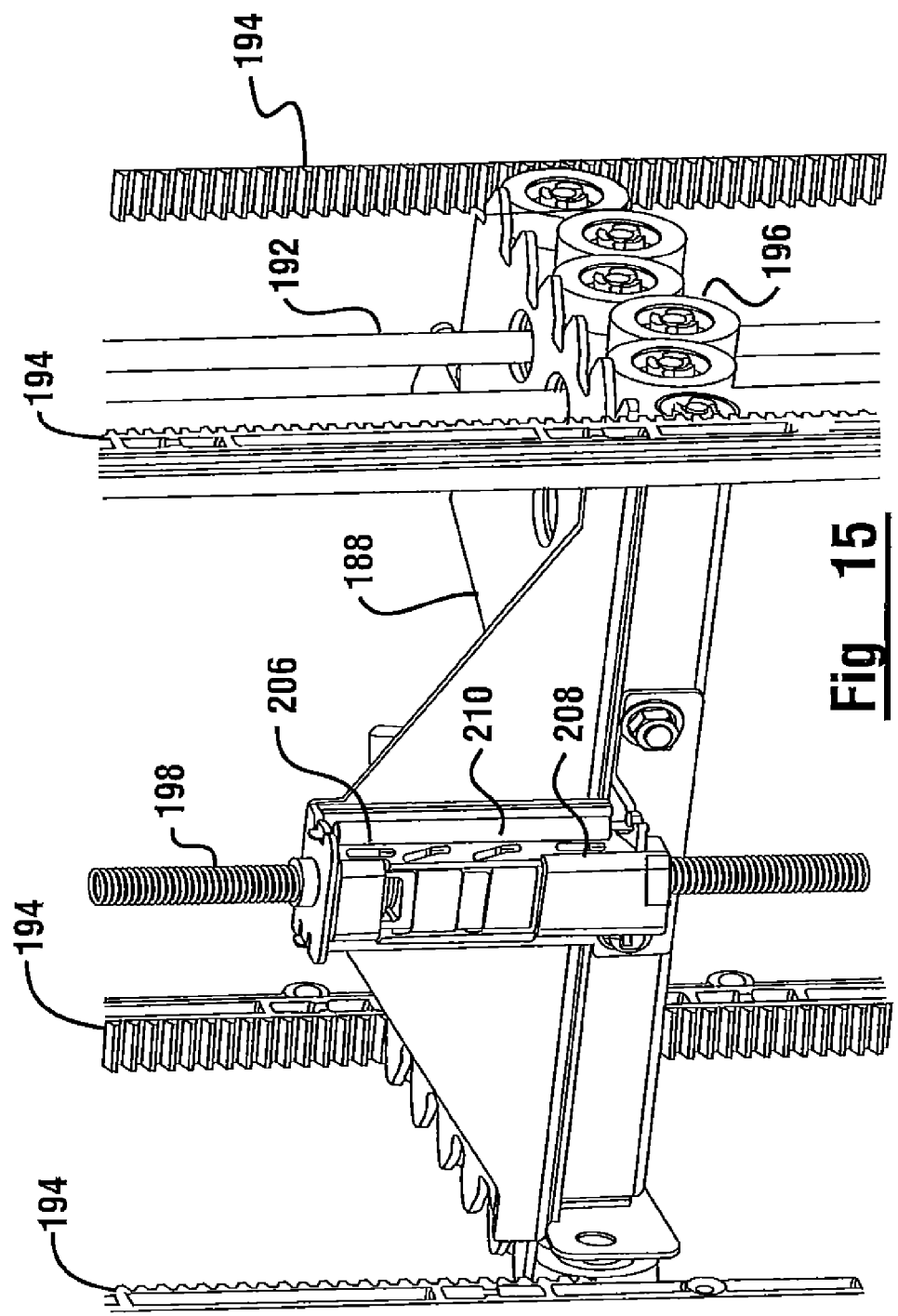
FIG. 15 is a back isometric view of the stack support plate within the sheet holding container.
Figure 16:
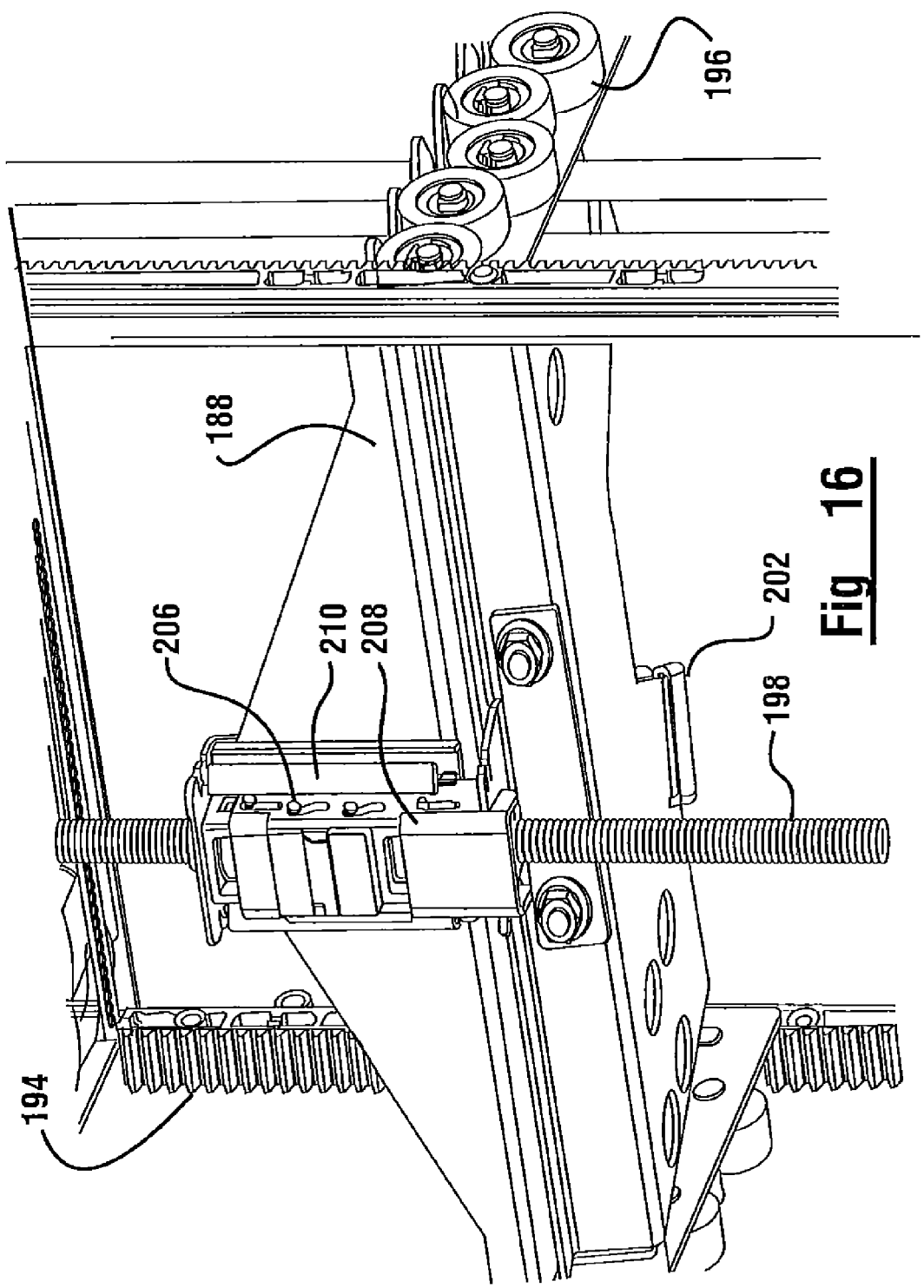
FIG. 16 is an opposite hand back isometric view of the stack support plate within the exemplary sheet holding container.

The exemplary container 98 includes a sheet supporting plate 188. Plate 188 is operative to support a stack of sheets in supporting connection therewith above the plate. The plate 188 includes openings therethrough 190. Support rods 192 extend through the openings 190. As best shown in FIGS. 15 and 16 two pairs of spaced gear racks 194 extend within the container. Each pair of gear racks engages a set of gears 196. Gear sets 196 operatively extend between each pair of gear racks 194 at each lateral side of the plate 188. At least one of the gears in each gear set on a lateral side of the plate 188 is connected through a shaft to another gear included in the gear set on an opposed side of plate 188. As a result the connected gear sets constrain the plate 188 to move in a uniform and level manner in a direction perpendicular to the gear racks.

Figure 17:
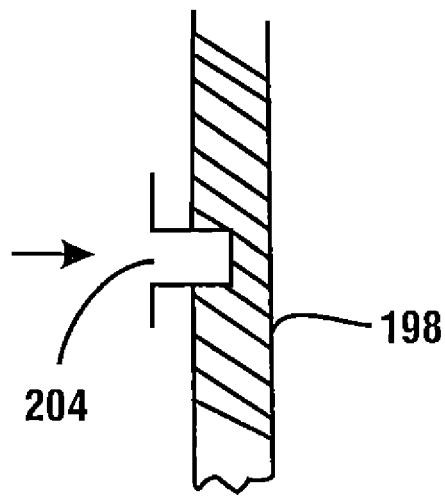
FIG. 17 is a schematic view of a nut portion engaged with a drive screw operative to move the stack support plate.

As shown in FIGS. 16 and 17 the exemplary plate 188 is in operative connection with an internal drive. The drive includes a rotatable screw 198. The drive which includes the screw also includes at least one gear which is engageable through a wall in the cassette with a driving gear outside the cassette as later discussed. As a result the drive within the cassette is able to move the plate selectively within the interior of the container responsive to rotation of the screw 198.

In the exemplary embodiment the plate is in operative connection with a manually actuatable lever 200. In exemplary embodiments the manually actuatable lever 200 is positioned below the plate. The lever 200 includes outward extending tabs 202 which can be displaced toward the plate 188.

Figure 18:
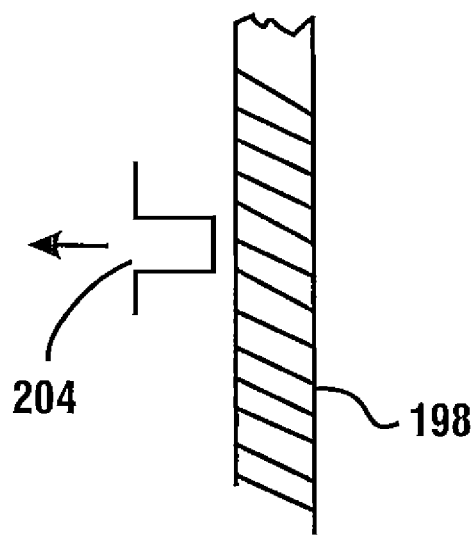
FIG. 18 is a schematic view similar to FIG. 17 but showing the nut portion disengaged from the drive screw.

Displacement of the lever 200 through movement of the tabs is operative to change the engaged relation of a plate and the drive. This is done in the exemplary embodiment as schematically represented in FIGS. 17 and 18. In the exemplary embodiment a nut portion 204 is biased to engage screw 198 of the drive. Nut portion 204 of the exemplary embodiment includes a half nut with threads thereon that are configured to engage the threads of the screw. As a result when the nut portion 204 and the screw 198 are engaged the plate moves in response to rotation of the screw. Likewise when the screw is stationary the plate is likewise held in a fixed position.

Moving the tabs 202 of the lever 200 toward the plate 188 causes the nut portion 204 to move so as to disengage the screw 198. This is schematically represented in FIG. 18. As a result the plate 188 can be selectively positioned within the interior of the container. Thus for example in situations where a servicer may wish to remove a stack of accumulated sheets from within the sheet holding compartment within the container, the support plate may be moved so as to facilitate the removal of sheets from the container. Likewise after the sheets have been removed the servicer may selectively position the plate so as to put it in a position where it is closer to the opening in the container so as to be more readily positioned to accept more sheets. Of course these approaches are exemplary.

Further in the exemplary embodiment the nut portion 204 is movably supported through guide slots 206 in a bracket 208. A spring 210 operates to provide biasing force that causes the nut portion 204 to be in engagement with the screw 198 of the drive when the tabs 202 are not moved toward the plate. Of course it should be understood that this construction is exemplary, and in other embodiments other approaches may be used.

Figure 22:
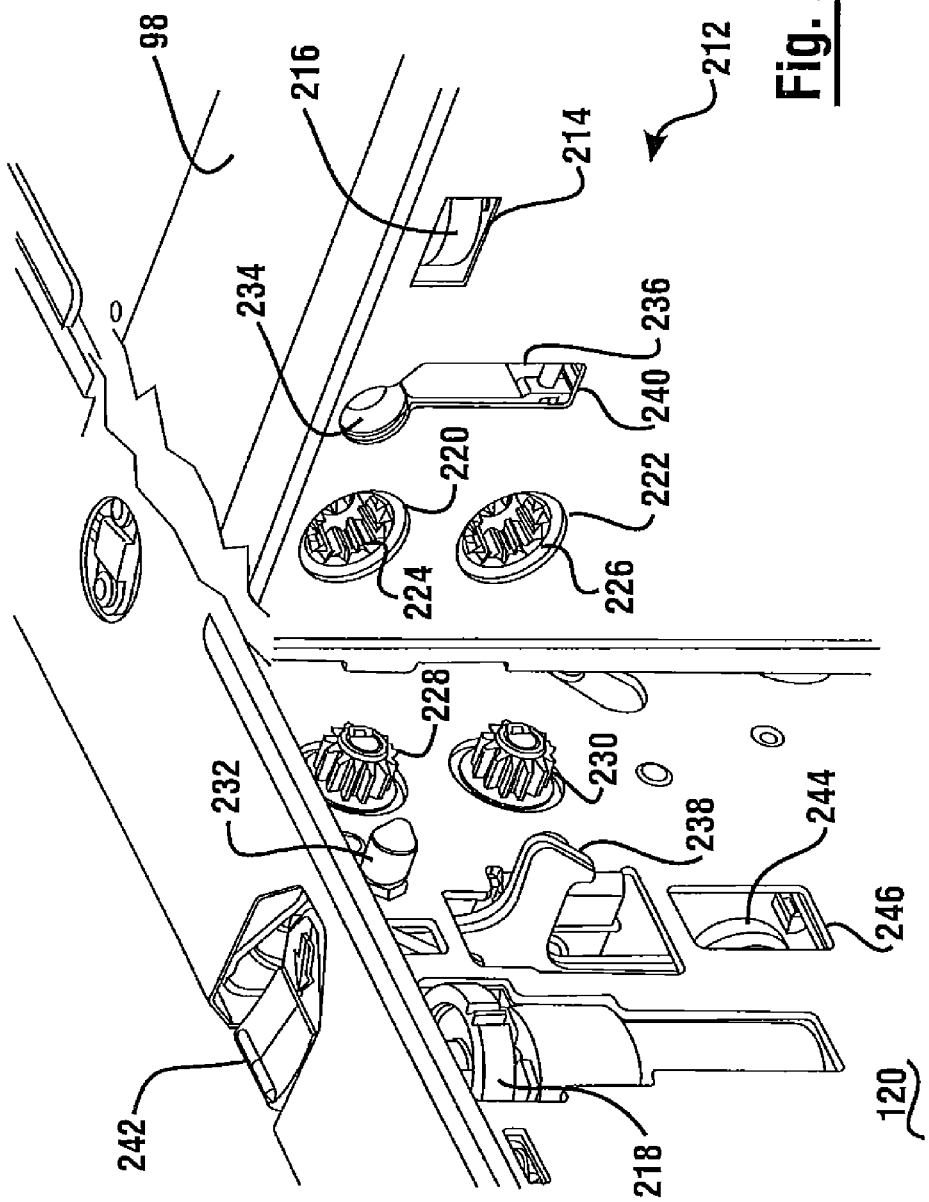
FIG. 22 is an isometric view showing the sheet holding container rotated 90 degrees from the operative position.

As shown in FIG. 22 the container 98 of the exemplary embodiment includes a rear wall 212. The rear wall includes an opening 214. Opening 214 provides access to a gear 216. Gear 216 is a part of the drive for moving the plate 188. Gear 218 in the exemplary embodiment is in operative connection with screw 198.

Opening 214 is aligned with a driving gear 218. Gear 218 extends outwardly from the back wall 120 of the tray 112. This can be appreciated from FIG. 22 in which container 98 is shown rotated 90 degrees relative to the back wall, and the sheet directing assembly is not shown for purposes of showing the mating engagement of components of the exemplary storage assembly. When the container 98 is in the operative position gear 218 engages gear 216 of the drive positioned within the cassette. The motor or other movement device which is operative to drive gear 218 can thereby relatively position plate 188 within the cassette.

Figure 19:
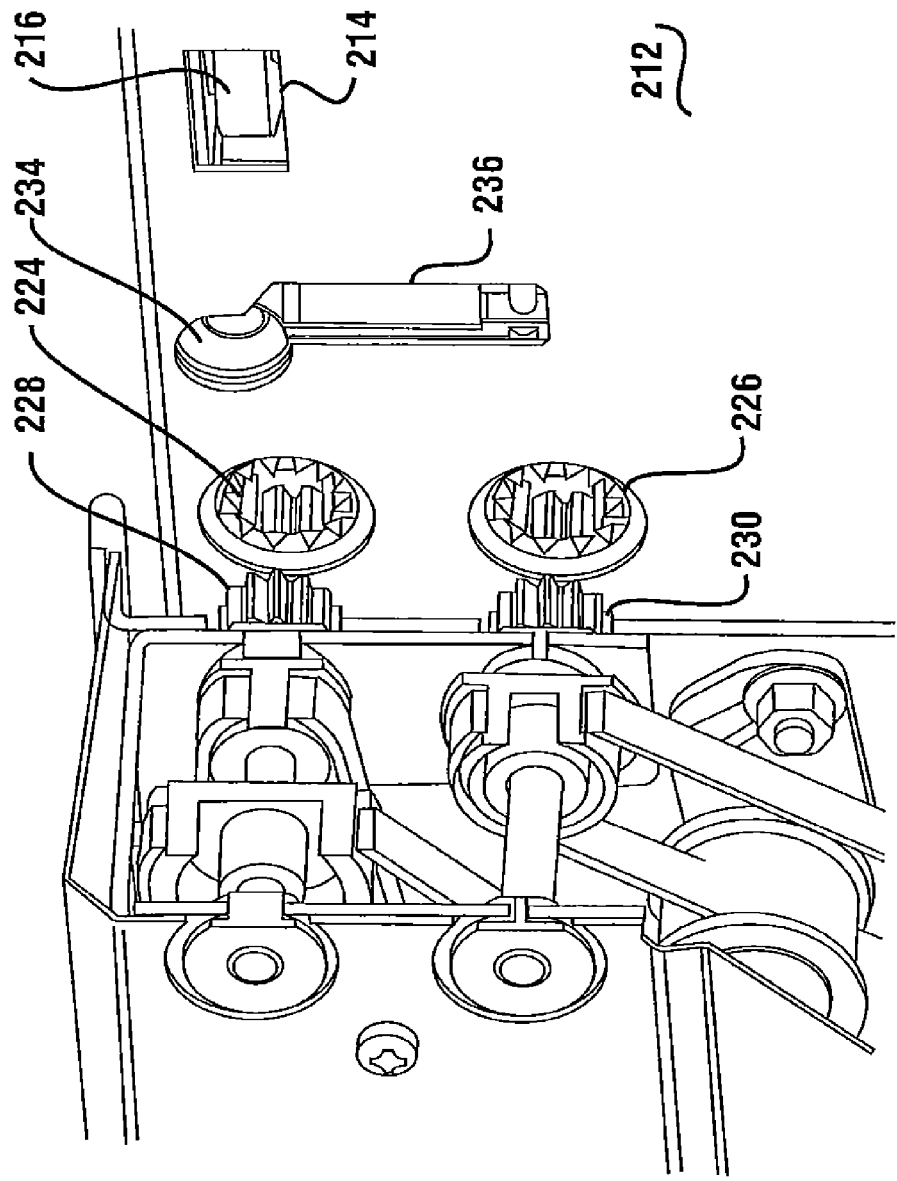
FIG. 19 is an isometric view of the drive gears of the machine and disengageable couplings of an exemplary storage container.

As is further shown in FIG. 22 rear wall 212 includes openings 220 and 222. Openings 220 and 222 each provide access to a disengageable shaft coupling 224 and 226 respectively. Shaft couplings 224 and 226 are toothed couplings which are each in respective connection with rotatable shafts that extend in the container for purposes which are later explained. In the operative position of the container 98, coupling 224 is operatively engaged with a rotatable drive gear 228 and coupling 226 is engaged with a drive gear 230. Drive gears 228 and 230 are selectively rotatable through operation of one or more drives such as motors that operate responsive to signals received from the terminal controller. The engagement of the drive gears and couplings is further represented in FIG. 19.

In the exemplary embodiment an aligning projection 232 extends outward from the back wall 120. The aligning projection is configured to engage in mating relation an alignment recess 234 in the rear wall 212 of container 98. In the exemplary embodiment the aligning projection and recess engage prior to the gears and facilitate the mating engagement thereof as the rear wall of the container is brought into close proximity with the back wall 120 of the tray. Of course this approach is exemplary, and in other embodiments other approaches may be used.

The exemplary container 98 further includes a latching recess 236. The latching recess 236 is sized for engaging a latching finger 238. The latching finger 238 is biased to extend in a downward position and to positively engage and hold the container 98 in an operative position such that gears 218 and 216 are engaged and drive gears 228 and 230 are engaged with couplings 224 and 226. In the exemplary embodiment the latching finger 238 is operative to biasingly engage a latch member 240 which is accessible through the latching recess 236. In the exemplary embodiment once the latching finger 238 engages the latch member the container 98 is held in the operative position.

In the exemplary embodiment a manually engageable release lever 242 is in operative connection with the latching finger 238. Relative downward movement of the release lever 242 in the configuration shown is operative to cause the latching finger 238 to move upward so as to disengage from the latch member of the container. Further in the exemplary embodiment a leg portion 244 is also in operative connection with the release lever. Movement of the release lever to disengage the latch member is further operative to cause the leg portion to move outward through an opening 246 in the back wall 120. In the exemplary embodiment the leg portion 244 operates to push against rear wall 212 of the container. This along with the action of the leaf springs 122 on the tray is operative to cause the upper portion of the container to be moved away from the back wall 120. As a result the handle 184 can be readily lifted and the container moved upward to disengage from the tray.

Likewise when the container is to be engaged in position the container may be placed in supporting connection with the tray and the upper portion of the container moved toward the back wall 120 until the latching finger 238 engages the latch. Once the container has been moved to this position and the tray is moved inward into the operative position within the secure chest, the container is ready for operation. Of course as can be appreciated, in the exemplary embodiment the safe door of the chest must be opened by authorized personnel before the tray 112 can be extended therefrom so as to enable access to the containers 98 and 100 so that the containers may be removed or installed. Of course these approaches are exemplary, and in other embodiments other approaches may be used.

Figure 14:
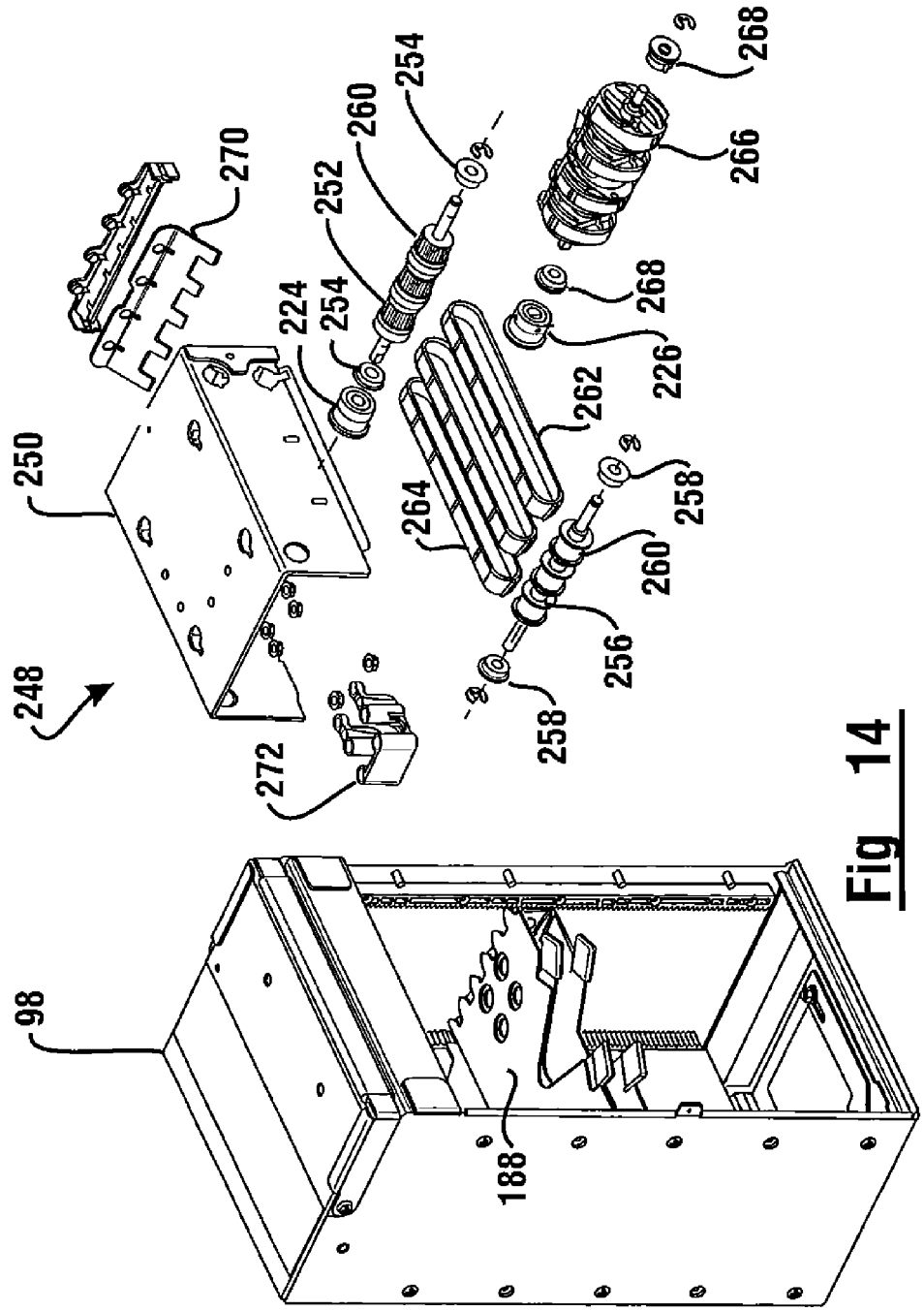
FIG. 14 is a further isometric view of the sheet holding container including an exploded view of the sheet stacking components.

As shown in FIG. 14 cassette 98 further includes a sheet stacking assembly generally indicated 248 in the interior thereof. In the exemplary embodiment the sheet stacking assembly 248 includes a support frame 250. Frame 250 is operative to support a flip shaft assembly 252 which is rotatable in bearings 254 which extend in openings from the frame. The releasable coupling 224 is in operative connection with the flip shaft assembly 252.

An idler shaft assembly 256 is supported on bearings 258 that extend in openings in frame 250. Each of the flip shaft assembly and idler shaft assembly includes corresponding rollers 260. Each of rollers 260 support a corresponding continuous belt 262. Belts 262 in the exemplary embodiment include outward extending cleats 264 thereon. In the position shown a lower belt flight of each of belts 262 extend in facing relation with plate 188.

The exemplary sheet stacking assembly further includes a stacker wheel assembly 266. Stacker wheel assembly 266 is rotatable in bearings 268 which extend in corresponding openings in frame 250. The releasable coupling 226 is in operative connection with stacker wheel assembly 266 and is operative to cause rotation thereof.

The exemplary embodiment further includes within the container a guide 270. Guide 270 includes fingers that are operative to direct sheets which move into the opening 186 in the container for purposes that are later discussed. The interior of the container also includes a bracket 272 which is operative to hold the support rods 192 previously discussed. Of course it should be understood that these structures are exemplary and in other embodiments other structures and approaches may be used.

Figure 47:
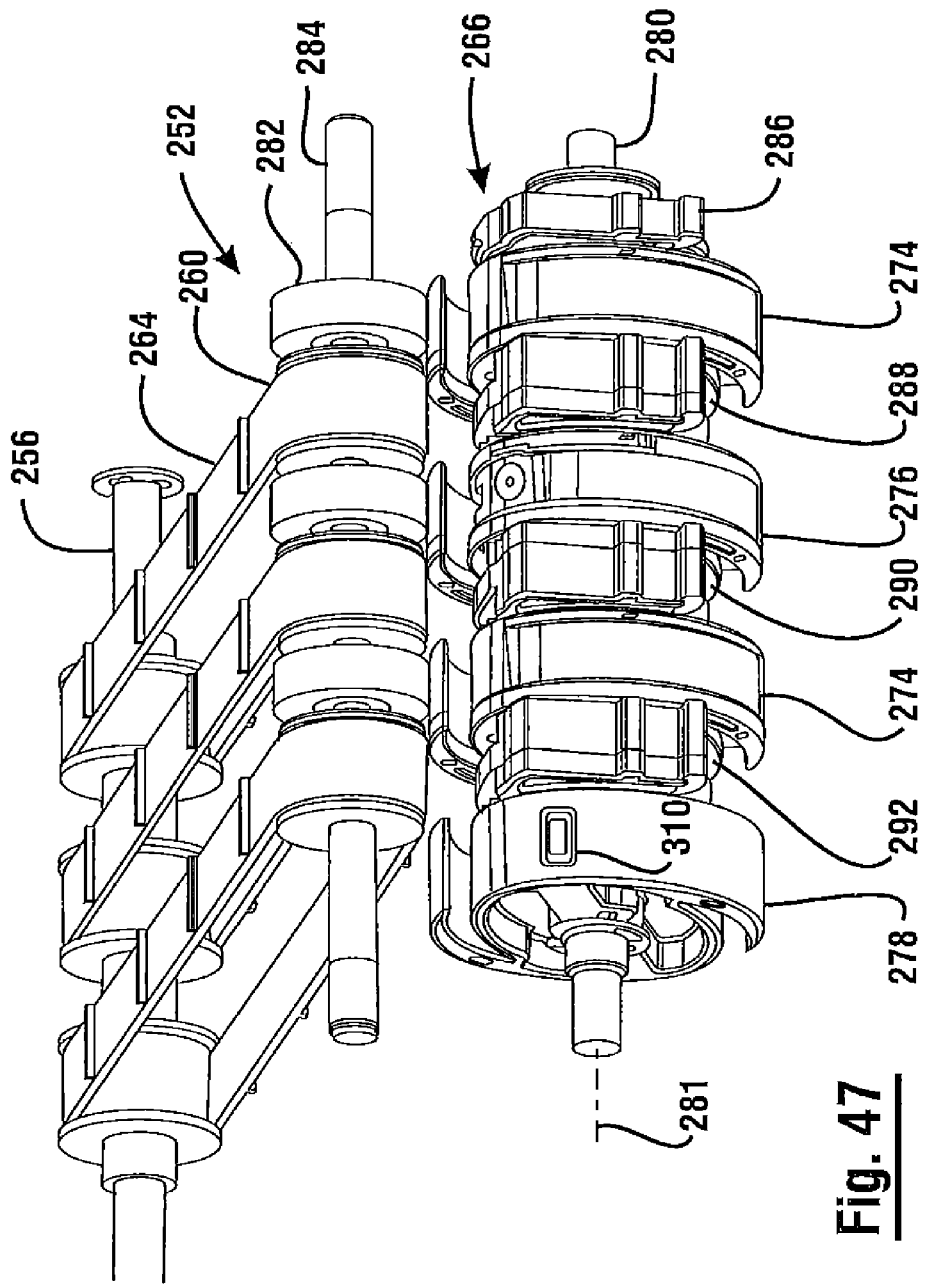
FIG. 47 is an isometric view of the stacker wheel assembly and belt and roller system for moving and stacking sheets in a sheet storage container.
Figure 48:
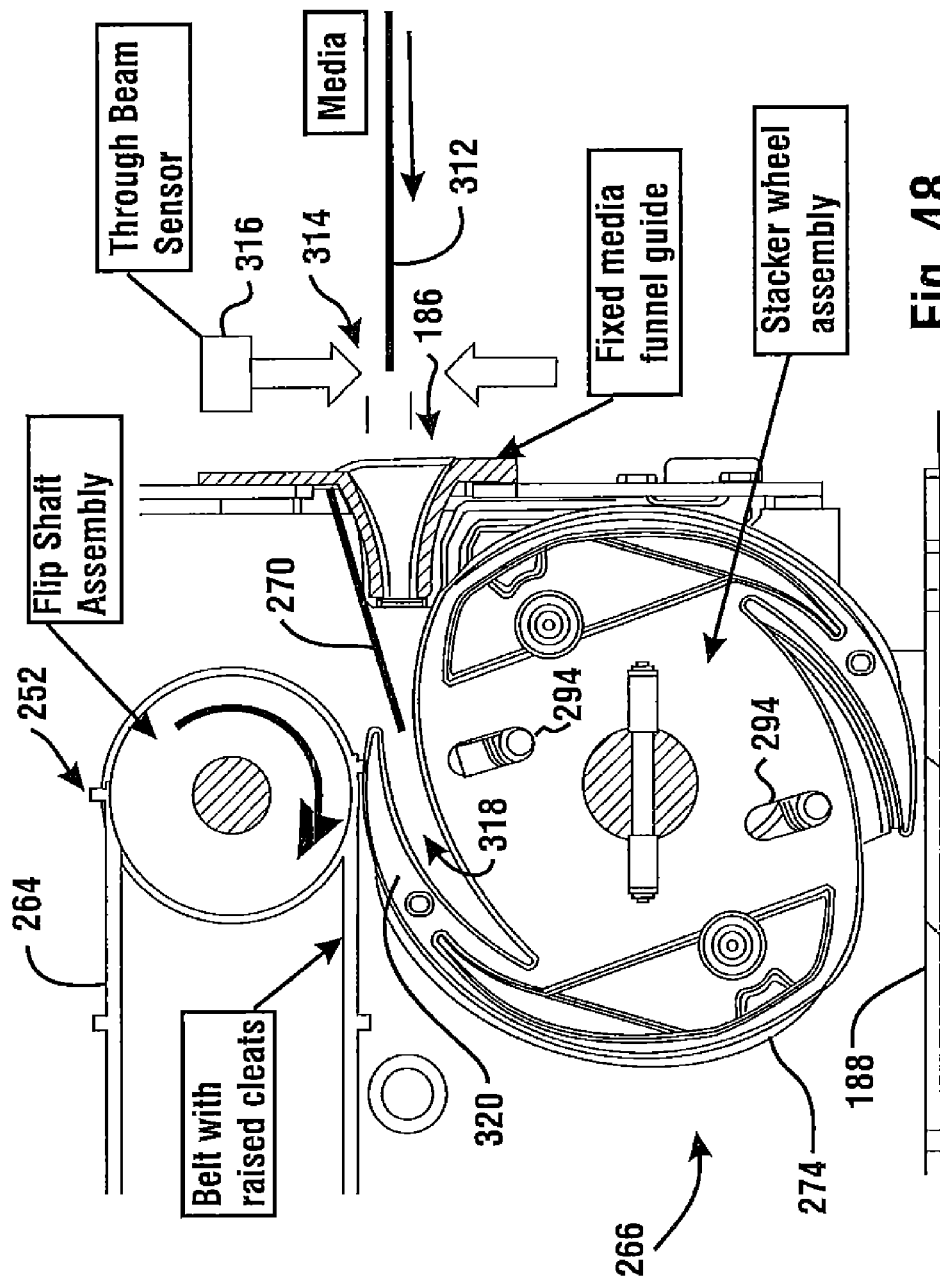
FIGS. 48 through 51 are side schematic views representative of the operation of a rotating gripping member operating to engage and release the sheet and place it in aligned relation with a stack within the sheet holding container.

FIG. 47 shows the exemplary embodiment of stacker wheel assembly 266, flip shaft assembly 252, idler shaft assembly 256 and belts 264. As can be seen the stacker wheel assembly 266 includes a plurality of rotating members. In the exemplary embodiment the rotating members include a pair of gripper members 274. The rotating members further include a sensing member 276. The stacker wheel assembly further includes an indicating member 278. Each of the rotating members 274, 276 and 278 are in operatively fixed connection with a common shaft 280 which extends along an axis 281 and is selectively rotatable through coupling 226.

The exemplary flip shaft assembly 252 includes the pulleys 260 which support belts 264 thereon. In addition in the exemplary embodiment the flip shaft assembly includes three deformable rollers 282. In the exemplary embodiment the deformable rollers are comprised of foam material. However, in other embodiments other materials as well as other relatively deformable structures may be used. The deformable rollers 282 and pulleys 260 are in operatively fixed connection with a common shaft 284 that is rotated through coupling 224. As can be seen, in the exemplary embodiment the belts 264 extend in intermediate relation between adjacent rotating members. The deformable rollers 282 are positioned so as to be aligned with rotating members and in some angular positions of the rotatable members are biased toward an engaged position with the adjacent rotatable members.

Figure 46:
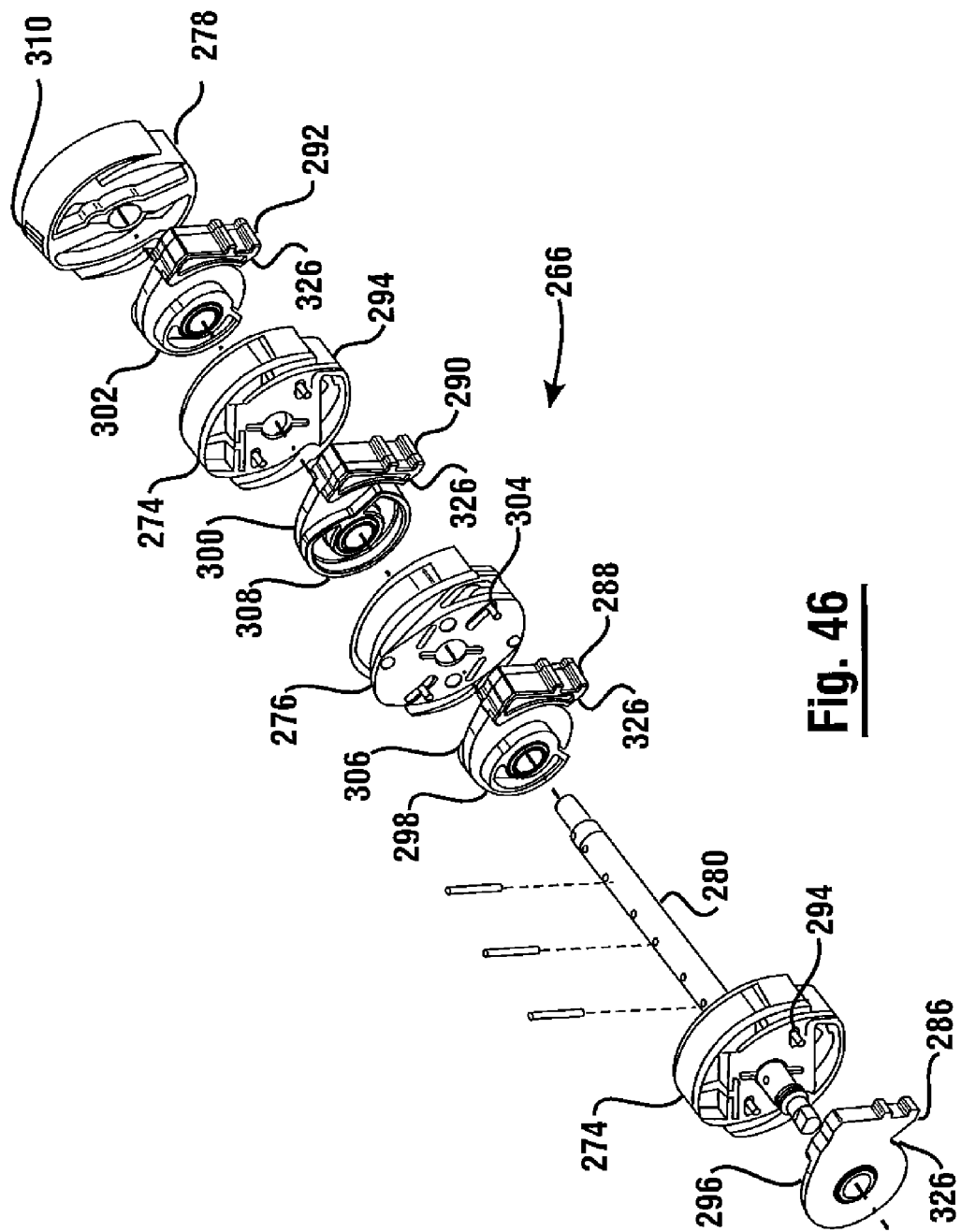
FIG. 46 is an isometric exploded view of the stacker wheel assembly shown in FIG. 45.

In the exemplary embodiment stationary members 286, 288, 290 and 292 extend between the rotating members. Each of the stationary members have cams supported thereon. The cams which comprise surfaces of the members operate to control movable components of the respective adjacent rotating members in a manner that is later discussed in detail. Further as shown in FIG. 46 gripper members 274 include cam followers 294 which extend laterally outward from each side thereof. The cam followers engage adjacent cams 296, 298 in the case of one gripper member 274, and cams 300 and 302 in the case of another gripper member. Likewise sensing member 276 includes cam followers 304 that extend generally axially outward therefrom and engage cams 306 and 308 that extend on opposed sides thereof. Of course it should be understood that these approaches are exemplary and in other embodiments other approaches may be used.

In the exemplary embodiment indicating member 278 includes a pair of indicating element portions 310. Indicating element portions in the exemplary embodiment comprise magnetic elements which are embedded in diametrically opposed positions on the periphery of the indicating member 278.

In the exemplary embodiment a contactless sensor such as a Hall effect sensor is positioned outside of the container on a face of the sheet directing assembly 96. In the operative position of the container the Hall effect sensor is operative to sense the varying magnetic field caused as the magnet passes in proximity to the Hall effect sensor. Further in the exemplary embodiment the poles of each magnetic element are at opposed positions tangentially to an outer circumferential surface of the indicating member. This facilitates sensing the movement of the magnetic element as it passes the adjacent sensor. Thus in the exemplary embodiment the external sensor is enabled to detect in an electrically contactless manner the stacker wheel assembly in two diametrically opposed rotational positions. This avoids the need for releasible electrical connections between the removable containers and the rest of the machine. Of course this approach for detecting the rotational position of the stacker wheel assembly is exemplary and in other embodiments other approaches may be used.

FIGS. 48 through 51 show the operation of the exemplary flip shaft assembly 252 and stacker wheel assembly 256 in moving and stacking sheets. In an exemplary operation a sheet such as a currency bill 312 is directed by the sheet directing assembly 96 toward the container 98. The sheet 312 passes through an opening generally indicated 314 in the sheet directing assembly. A sensor 316 operates to sense a leading edge of the sheet 312 passing through the opening 314. In the exemplary embodiment the sensor 316 is a through beam sensor such as a photosensor that is blocked upon a leading edge of the receipt passing between an emitter and a receiver of the sensor. Of course this approach is exemplary.

Figure 49:
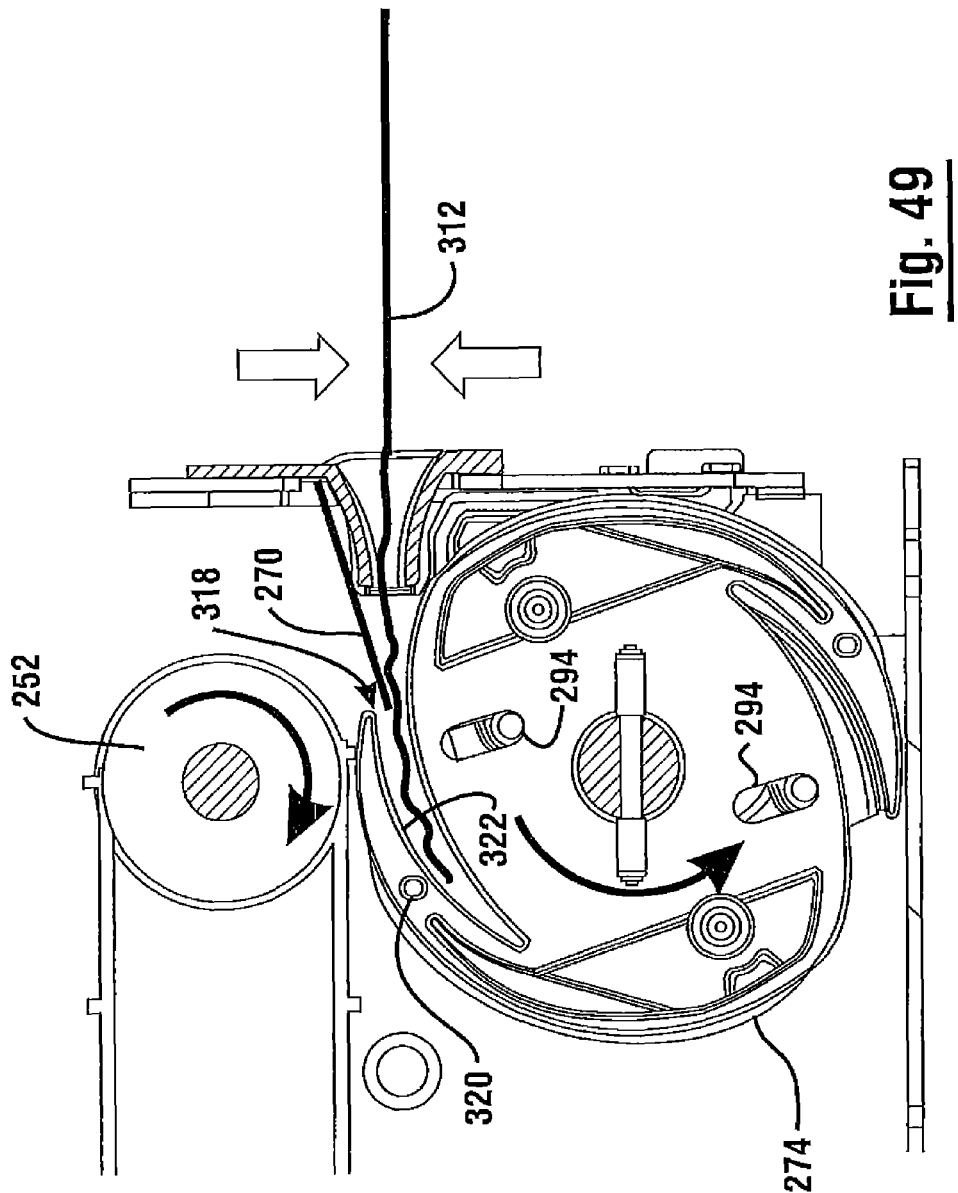

The leading edge of the sheet 312 that has been detected by the sensor 316 passes into the opening 186 of the container 98. As shown in FIG. 49 the leading edge of the sheet 312 engages the guide 270 and a portion of the sheet moves into a slot 318 which extends adjacent the periphery of gripper member 274. In the exemplary embodiment slot 318 is formed by a curved finger portion 320 which is bounded by a radially inward facing surface 322.

In the exemplary embodiment the at least one processor, based on at least one signal produced responsive to sensor 316, is operative to cause the stacker wheel assembly and gripper member 274 to begin rotating in a counterclockwise direction shown when the sheet 312 is engaged in the slot 318. The at least one processor is also operative to cause the flip shaft assembly 252 to rotate as the sheet enters the container and the flip shaft assembly continues rotating in a clockwise direction as shown as the gripper member rotates in a counterclockwise direction.

As later described in greater detail, rotation of the gripper member is operative to cause the cam followers 294 which extend on each side of the gripper member to be moved responsive to engagement of the adjacent cams. This causes a gripper portion 322 which is later described in detail to be moved radially outward and to engage the sheet 312 in the slot 318 in sandwiched relation between the radially inward extending surface 322 and the outer face of the gripper portion 322.

Figure 50:
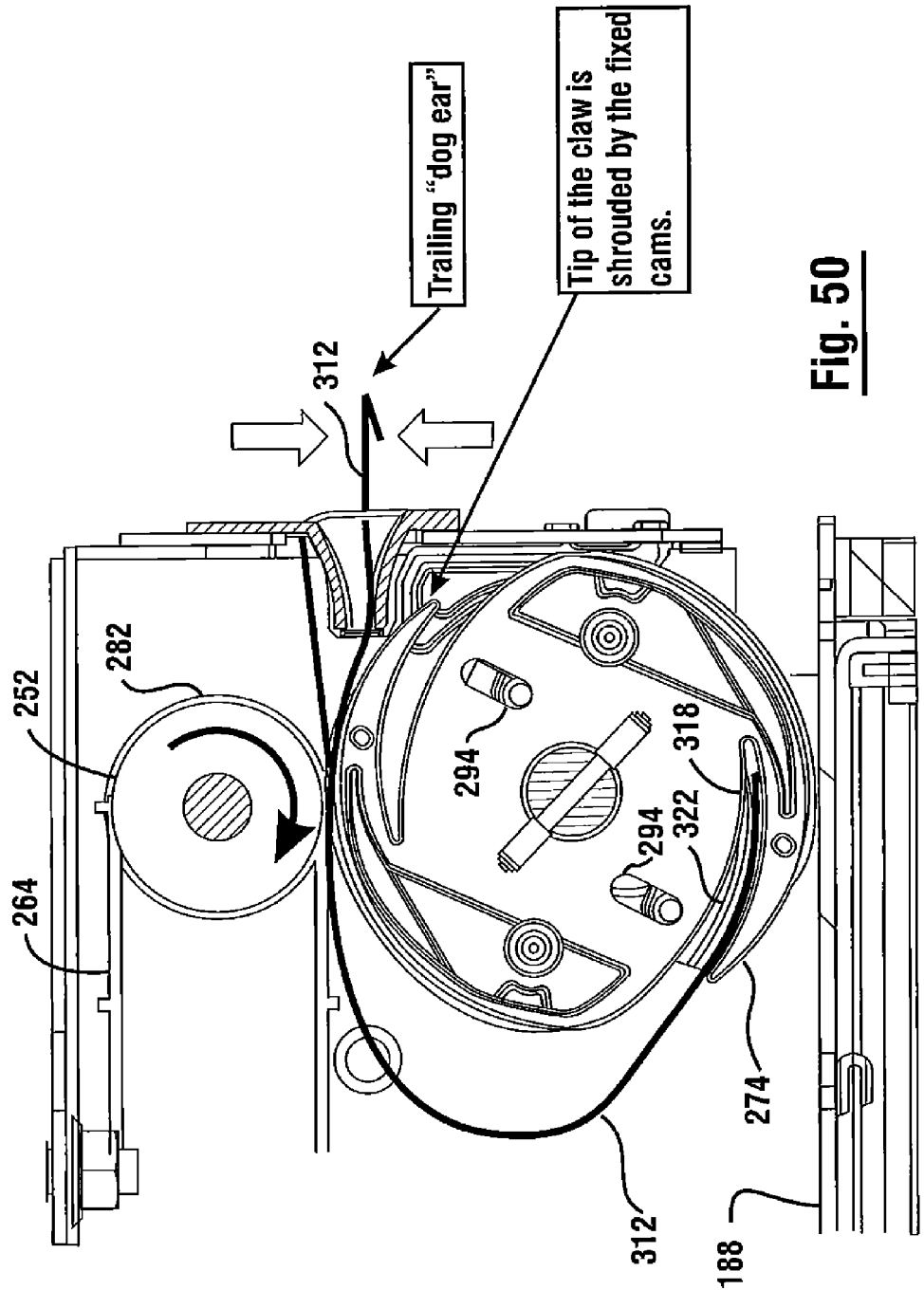

In the exemplary embodiment as the gripper member 274 rotates to the position shown in FIG. 50 the belts 264 and deformable rollers 282 engage the sheet 312 and pull it inward into the container. In the exemplary embodiment, the flip shaft assembly 252 continues rotating to move the sheet into the container, while the gripper member 274 stops rotating counterclockwise in the position shown in FIG. 50. This is done responsive to operation of the terminal controller. As can be appreciated the flip shaft assembly of the exemplary embodiment can operate to move a relatively long sheet a greater lineal distance than is caused by movement of the sheet by rotation in engagement with the gripper member. In the exemplary embodiment the terminal processor causes the flip shaft assembly to continue operating to urge the sheet to move into the container a programmed time after the trailing edge of the sheet clears the sensor. This assures that the sheet is moved entirely into the container and its trailing edge is urged by the belts to flip over into the stack. Of course this approach is exemplary.

Figure 51:
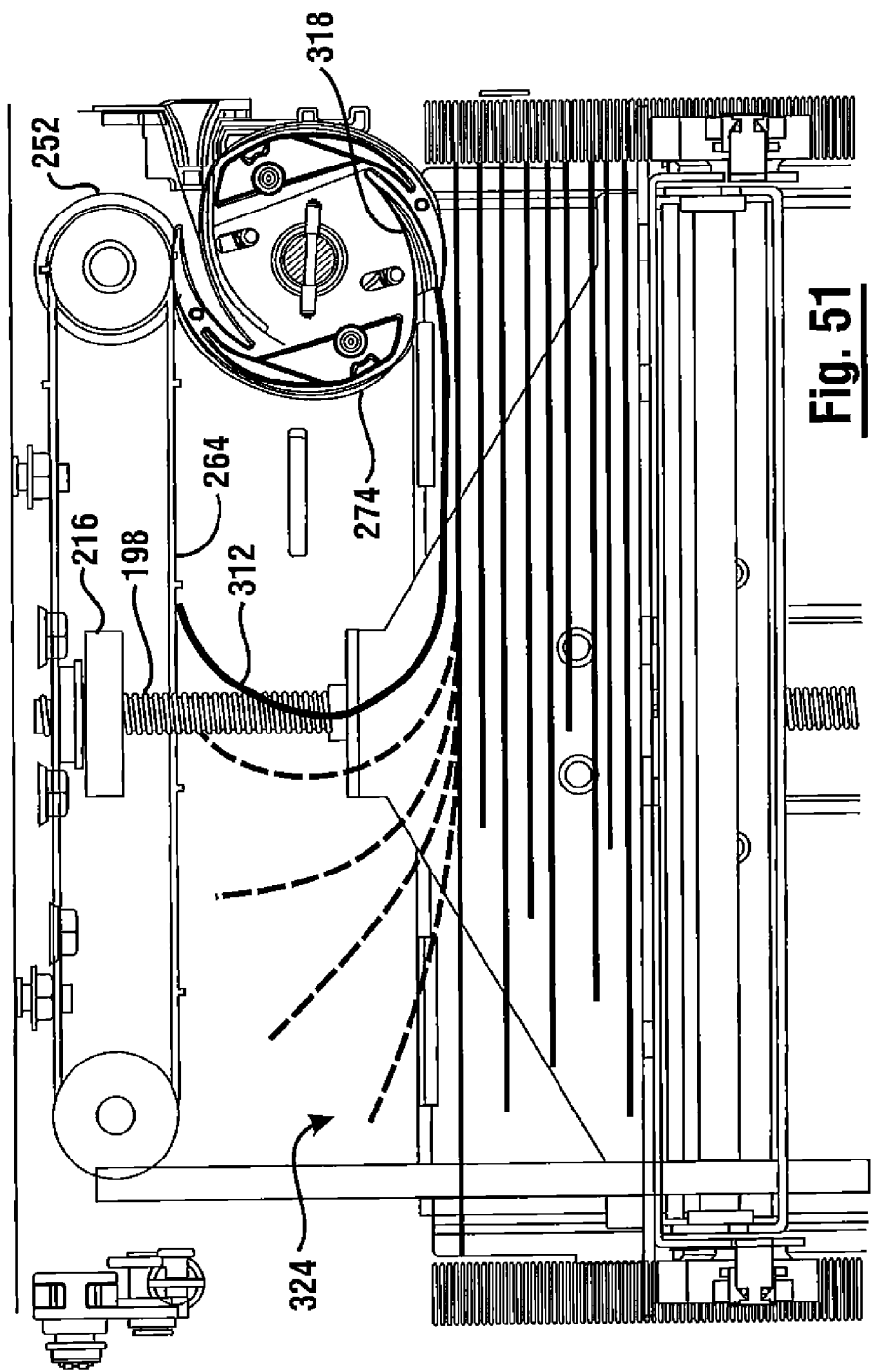

In the exemplary embodiment, the terminal controller operates to cause rotation of the gripper member to stop temporarily while a sheet 312 is sensed as still moving into the container. In this position the opposed finger portion that is not currently holding sheet 312 is disposed away from the trailing edge of the sheet as it enters the opening in the container. Further in the exemplary embodiment the finger is shrouded from engaging the trailing edge of the sheet by the adjacent members that include the cam surfaces. As a result if the trailing edge of the sheet has a "dog ear" portion as shown in FIG. 50, such portion will not get caught on the finger portion. This reduces the risk of jams. Once the trailing edge is sensed as having passed the sensor and subsequent sufficient movement of the flip shaft assembly has occurred to move the trailing edge inward beyond the finger portion, the terminal controller causes the stacker wheel assembly to rotate so that the finger portion and its associated slot is in position to engage the leading edge of the next incoming sheet. This further rotation further causes the gripper portion to release sheet 312. As shown in FIG. 51 the trailing edge of the sheet 312 can be engaged by the cleats on belts 264 and flipped as shown to be included in a sheet stack 324 within the container. Further the cam followers are moved by the corresponding cams so as to cause the leading edge of the sheet that has been engaged in slot 318 to be released by movement of the gripper portion as the gripping member 274 rotates to the position in which the slot on the member opposite to the slot 318 is positioned to engage another incoming sheet. As can be appreciated the sensing of magnetic elements 310 enables the terminal controller to rotate the stacker wheel assembly 266 in coordinated relation so as to engage, move and release a sheet into the stack upon each rotation.

Further in the exemplary embodiment as shown in FIG. 51 the gripper member 274 releases each sheet so that the leading edge thereof that entered the container is in generally aligned relation with the stack 274. As a result sheets of various lengths may be stacked within the container with their leading edges generally aligned.

Further in the exemplary embodiment each of the stationary members 292, 290, 288 and 286 include generally aligned sheet engaging surfaces 326 (see FIG. 46). These generally aligned sheet engaging surfaces 326 operate to engage the leading edge of the sheet and separate the sheet from the rotating members. This further helps to facilitate releasing the sheets in aligned relation with the stack. Of course this approach is exemplary and in other embodiments other approaches may be used.

It should also be pointed out that in the exemplary embodiment each of the sensing member and the indicating member also include peripheral slots that are generally aligned with the slots on the gripper members. As a result sheets that are engaged with the gripper members are moved while extending in the corresponding slots of the other rotating members. This further helps facilitate engaging, moving and releasing the sheets into the stack in coordinated relation.

Figure 52:
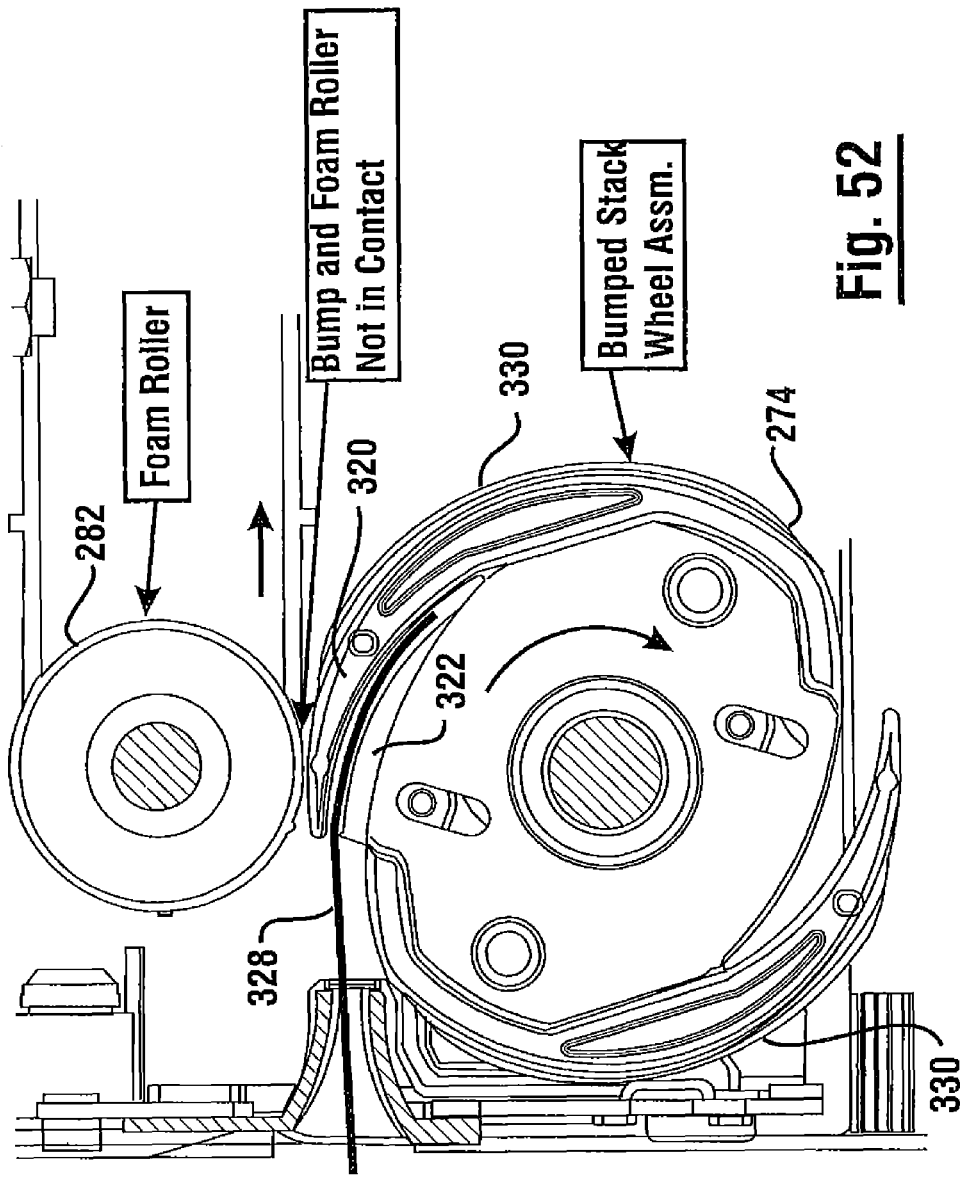
FIGS. 52 through 55 are plan views showing the configuration of the outer circumference of exemplary rotating members that facilitate sheet movement through engagement of raised circumferential portions with deformable rollers of the roller and belt assembly.
Figure 53:
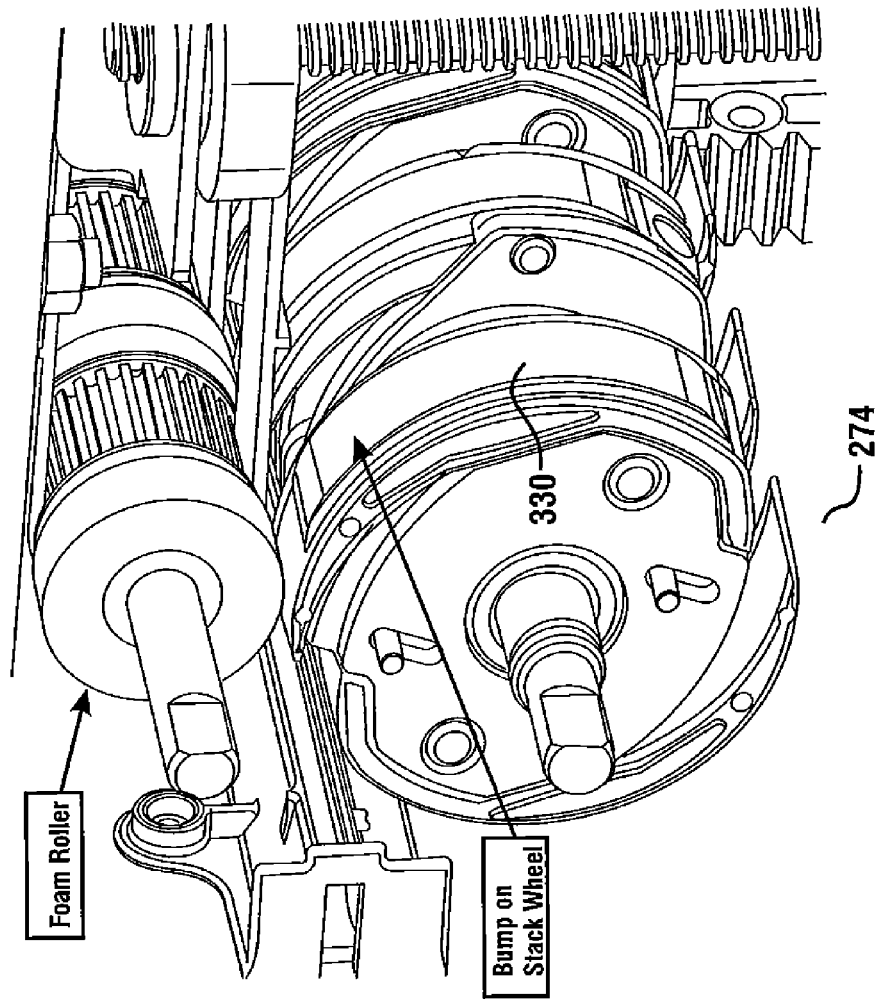

FIGS. 52 through 55 further show aspects of the exemplary embodiment which facilitates the movement of sheets into the container. FIG. 52 shows an opposite hand view of a gripper member 274 and a deformable roller 282. FIG. 52 shows the gripper member in the initial position in which the gripper member has received a sheet 328 in a slot thereof and the gripper portion 322 is moving responsive to rotation of the gripper member in engagement with the cams to engage the sheet. In this position the outer circumference of the finger portion is not engaged with the deformable roller 382. However, as can be seen, the outer circumference of the gripper member 274 includes radially outward extending circumferential bump portions 330 that extend further radially outward than other portions of the outer circumference of the gripper member 274. It should be noted that FIG. 53 shows gripper member 274 in a similar position to that shown in FIG. 52 but without sheet 328 therein so as to better show the exemplary configuration of the roller.

Figure 54:
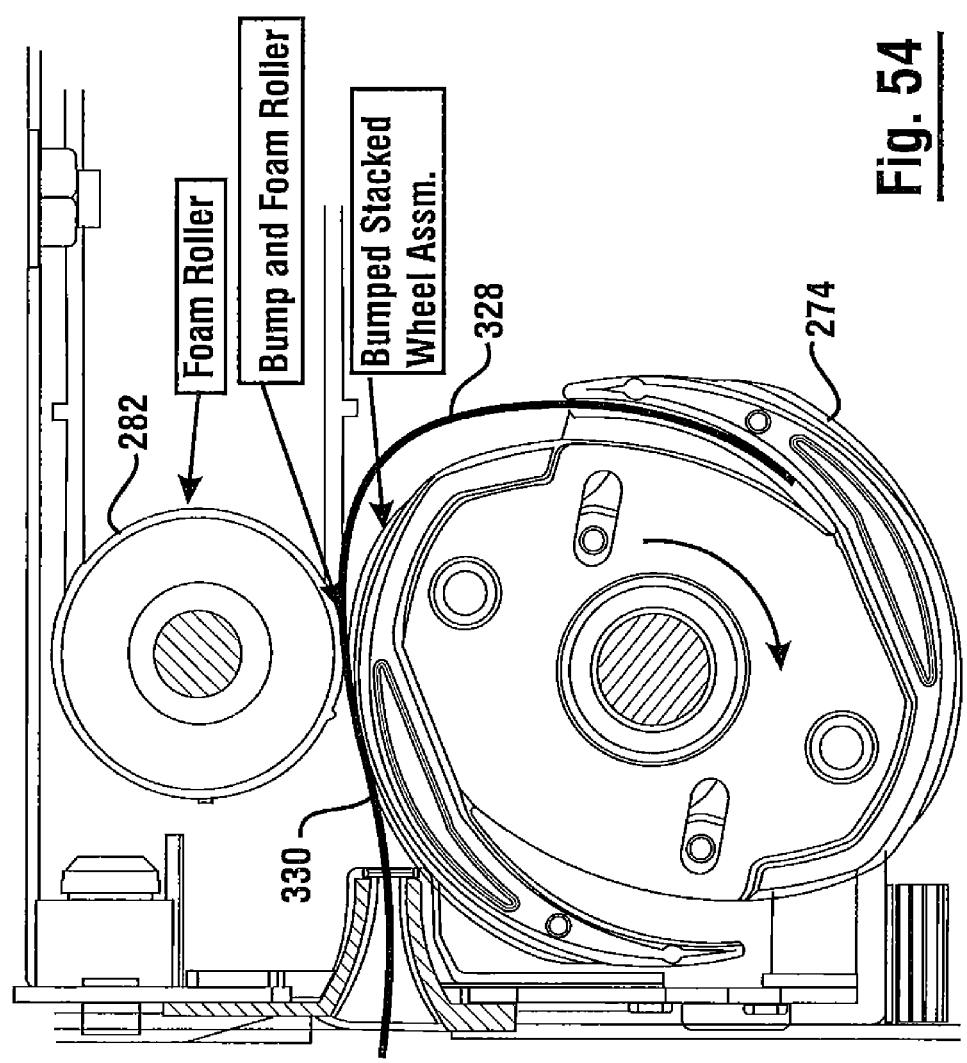
Figure 55:
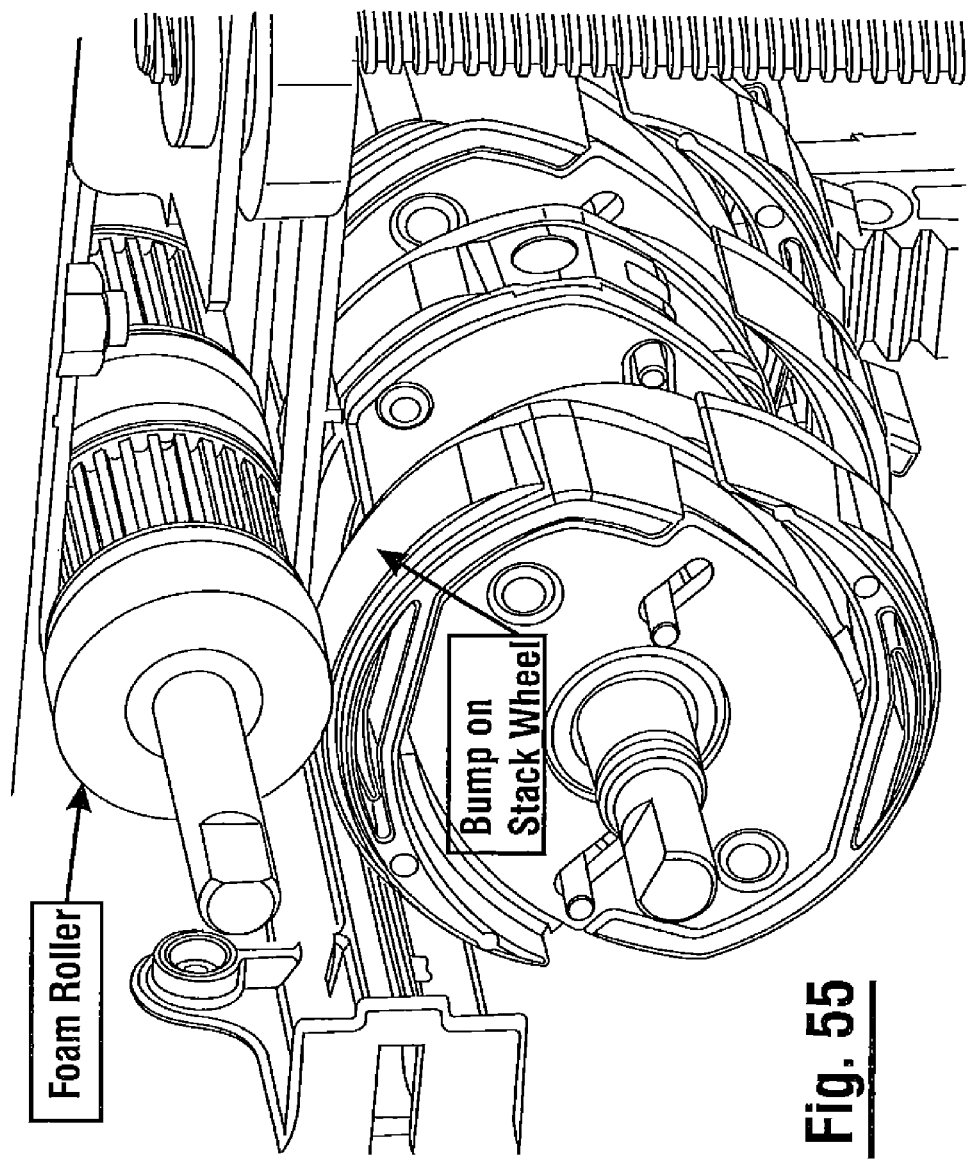

FIG. 54 shows the rotation of the gripper member further clockwise from that shown in FIG. 52. As can be seen, the front portion 330 is moved to adjacent the deformable roller 282. Because of the raised circumferential bump portion the foam roller is deformed and provides biasing engagement between the roller, the sheet and the gripper member. This engages the sheet 328 in sandwiched relation between the deformable roller and the gripper member and urges its movement of the sheet into the container. In the exemplary embodiment if the sheet were not present between the deformable roller and the gripper member, the deformable roller would be in engagement with a bump portion of the gripper member. This is further represented in FIG. 55 which like FIG. 53 does not include the sheet to facilitate understanding of the structures. Of course in the exemplary embodiment further rotation in a clockwise direction as shown causes the circumferentially extending bump portion to again rotate away from the deformable roller as the gripper member moves to a position in which another sheet may be accepted into a slot thereof. Of course it should be understood that these approaches are exemplary, and in other embodiments other approaches may be used.

Other exemplary embodiments may use mechanisms of other types to stack sheets in aligned relation. Further such other embodiments may operate to dispense sheets that have been previously stored. This may be done for example in the manner disclosed in U.S. Pat. No. 6,302,393 and/or 6,331,000 the disclosures of each of which are incorporated herein by reference in their entirety. For example in some embodiments a single sheet handling apparatus may be operative to perform both the functions of receiving sheets from users as well as dispensing sheets. Further as previously discussed while some embodiments may operate to handle sheets such as currency bills, other embodiments may also operate to receive and/or dispense other financial instruments and/or sheets including for example checks, gaming materials, money orders, food stamps, gift cards, payment cards or other sheet items. Of course these approaches are exemplary and in other embodiments other approaches may be used.

In an exemplary embodiment the containers 98 and 100 are made so that the sheet stacking assembly as well as the position of the stack may be precisely controlled without the need for wired connections or electrical contacts between the removable containers and the remainder of the automated banking machine. This facilitates the installation and removal of the cassettes without the need for concern about breakage of electrical connectors or deterioration of electrical contacts. This is accomplished in the exemplary embodiment through the sensing of magnetic fields using sensors that are positioned adjacent to the container when the container is in an installed position. The container operates to vary the magnetic properties that can be sensed with varying conditions within the container so as to enable contactless sensing. This also enables the terminal controller of the automated banking machine to effectively control the components within the container so that sheets may be reliably received and stacked within the containers. Of course it should be understood that using magnetic principles is but one example of indicating and sensing approaches that may be used for such purposes.

Figure 28:
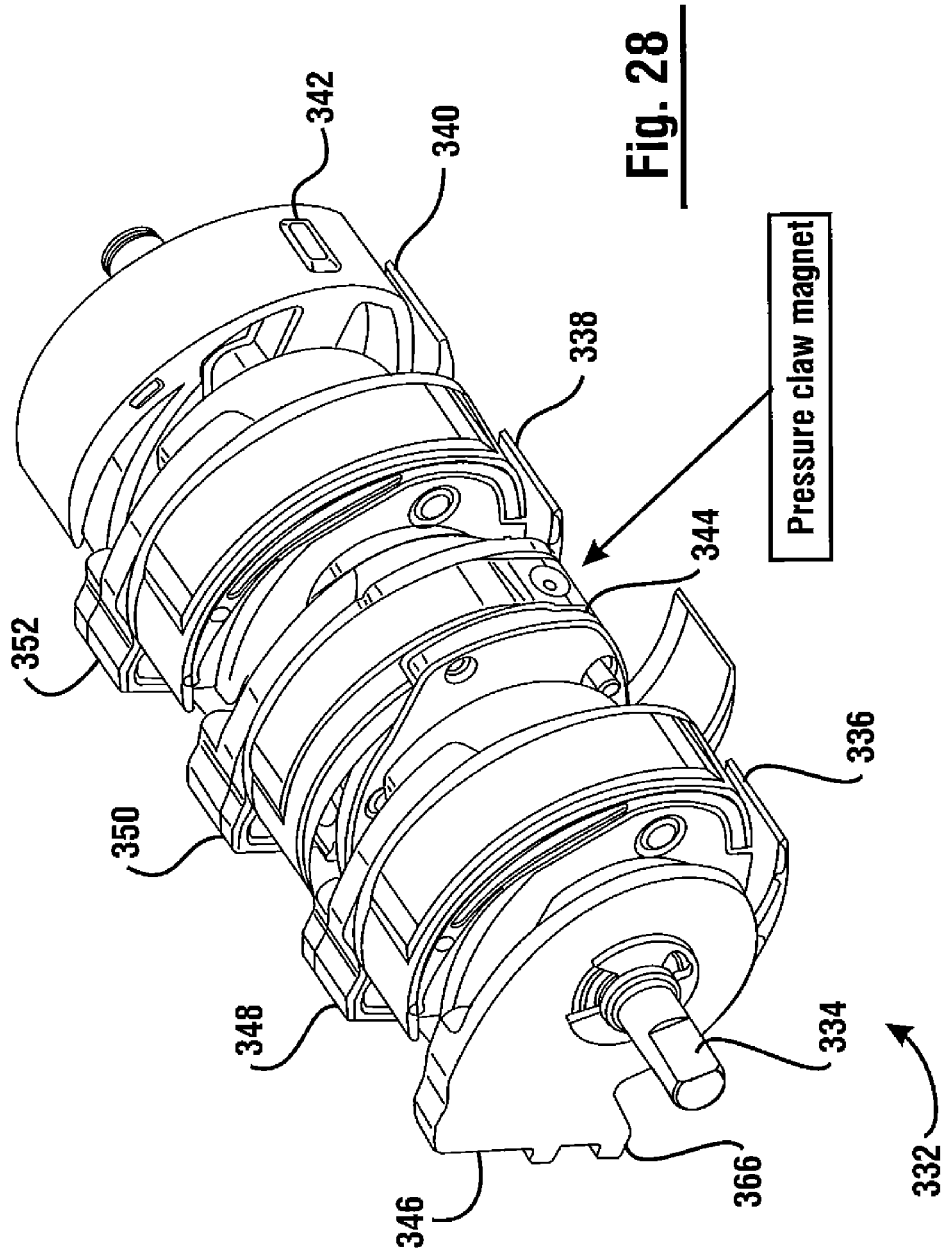
FIG. 28 is an isometric view of a right-hand bill stacking assembly included in an exemplary sheet storage container.
Figure 29:
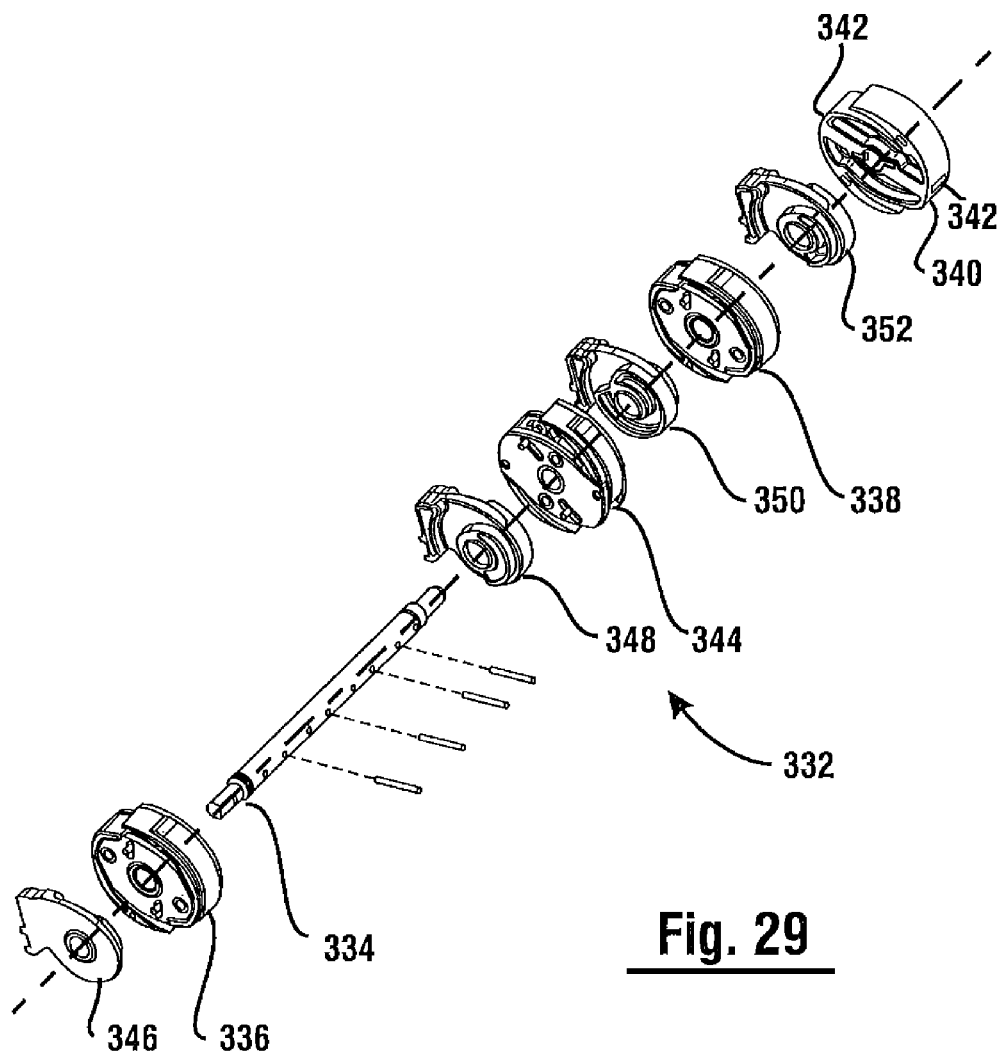
FIG. 29 is an exploded view of the sheet stacking assembly shown in FIG. 28.

FIGS. 28 and 29 show an alternative stacker wheel assembly 332. Stacker wheel assembly 332 is similar to stacker wheel assembly 266 except that it is configured for use in an opposite hand container from assembly 266. For example stacker wheel assembly 332 may be installed in container 100 for purposes of receiving and stacking sheets. Stacker wheel assembly 332 includes a shaft 334. The shaft 334 is assembled in operatively fixed connection with gripper members 336 and 338. Gripper members 336 and 338 are generally similar to gripper member 274.

The stacker wheel assembly 332 further includes an indicating member 340. Indicating member 340 is generally similar to indicating member 278. Indicating member 340 further includes indicating element portions 342 thereon which are sensed in the exemplary embodiment by a Hall effect sensor to detect rotational position of the assembly. As a result as previously described, this enables the stacker wheel assembly to be positioned responsive to operation of the terminal controller to receive a sheet and to move the sheet through operation of the stacker wheel assembly and flip shaft assembly to a position aligned in the stack.

The stacker wheel assembly 332 further includes a sensing member 344. The sensing member 344 is generally similar to sensing member 276 previously discussed.

Figure 38:
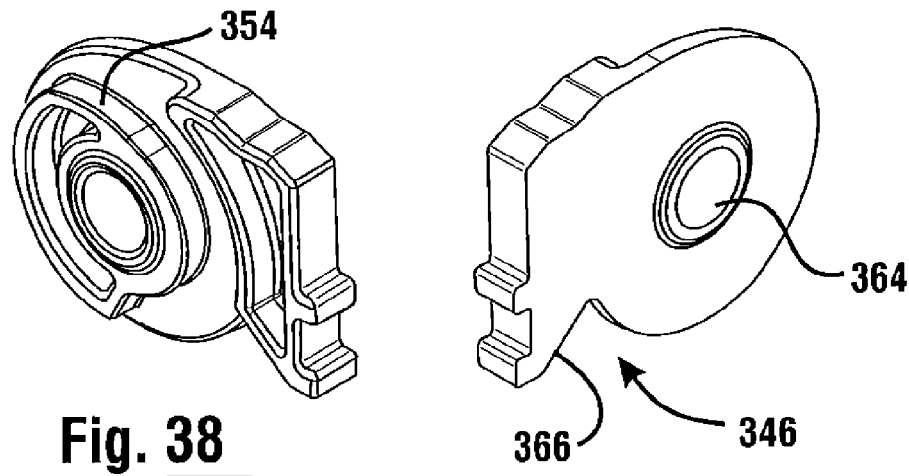
FIGS. 38, 39 and 40 are opposite hand views of different stationary cams used in connection with the assembly shown in FIG. 38.
Figure 39:
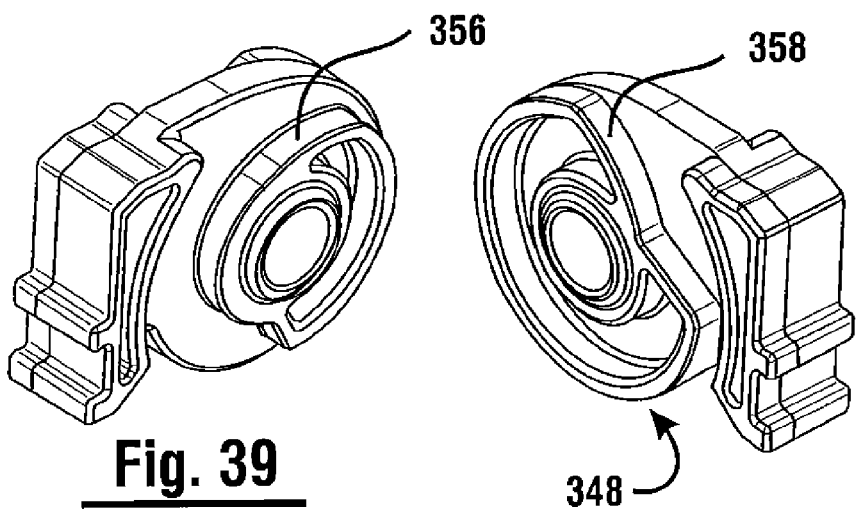
Figure 40:
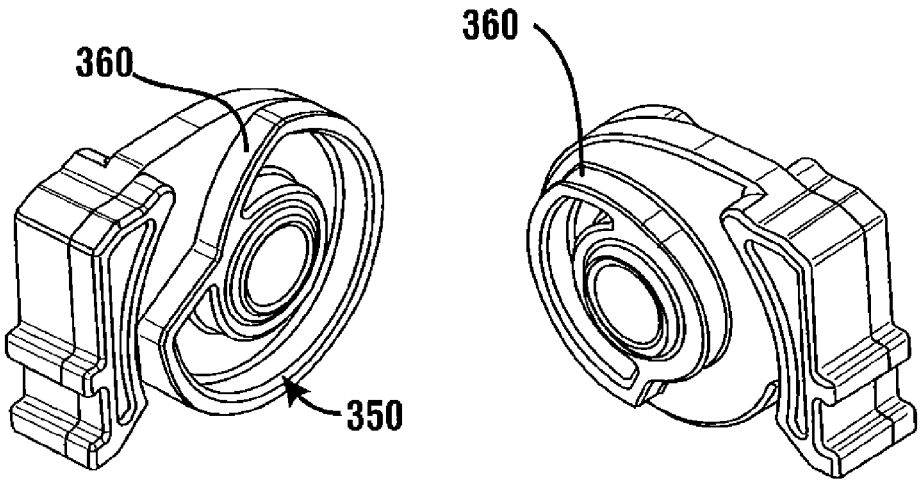
Figure 41:
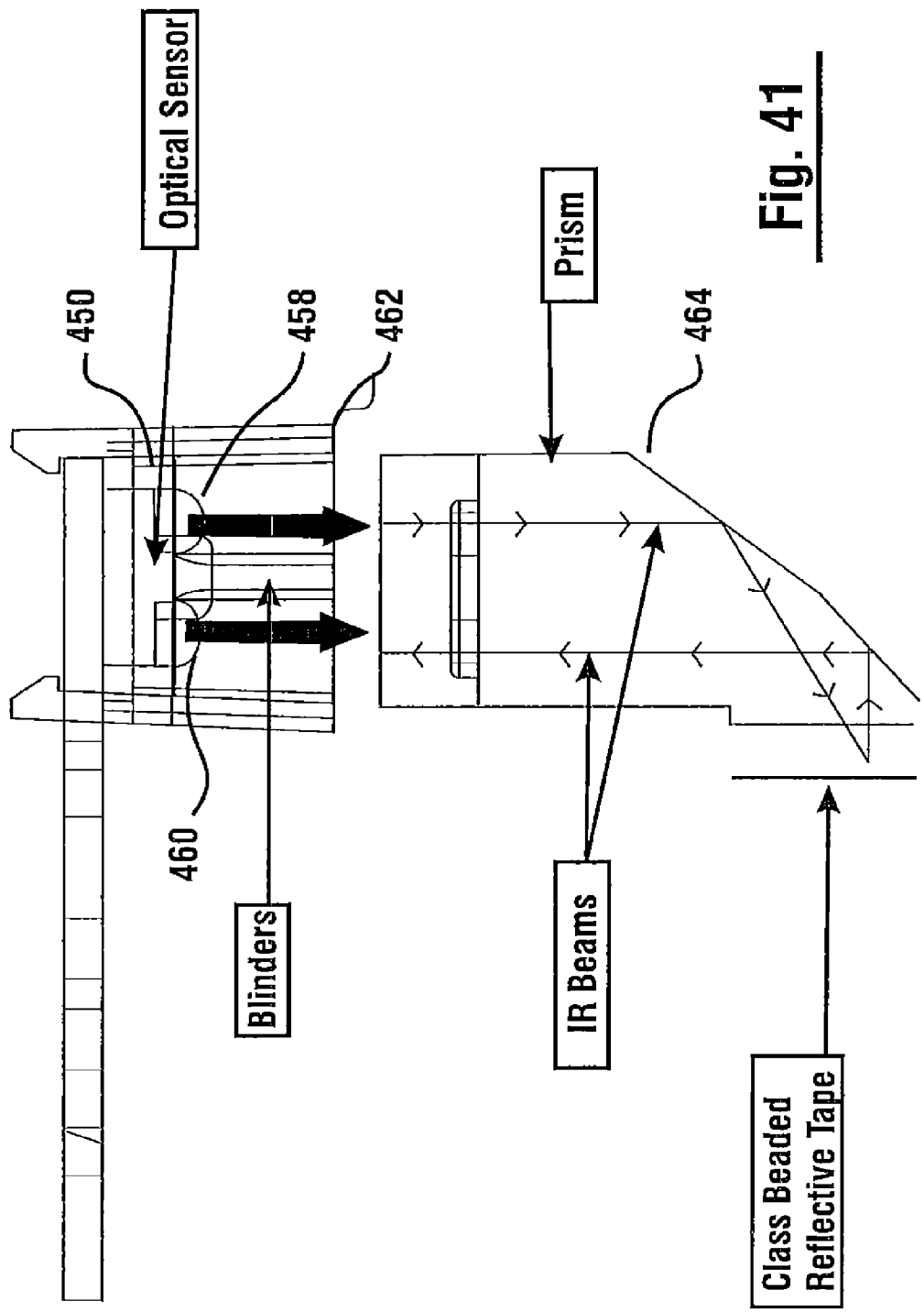
FIGS. 41 through 44 are schematic views of a sensing system for contactlessly sensing the rotational position of a rotating assembly within an exemplary sheet holding cassette.
Figure 42:
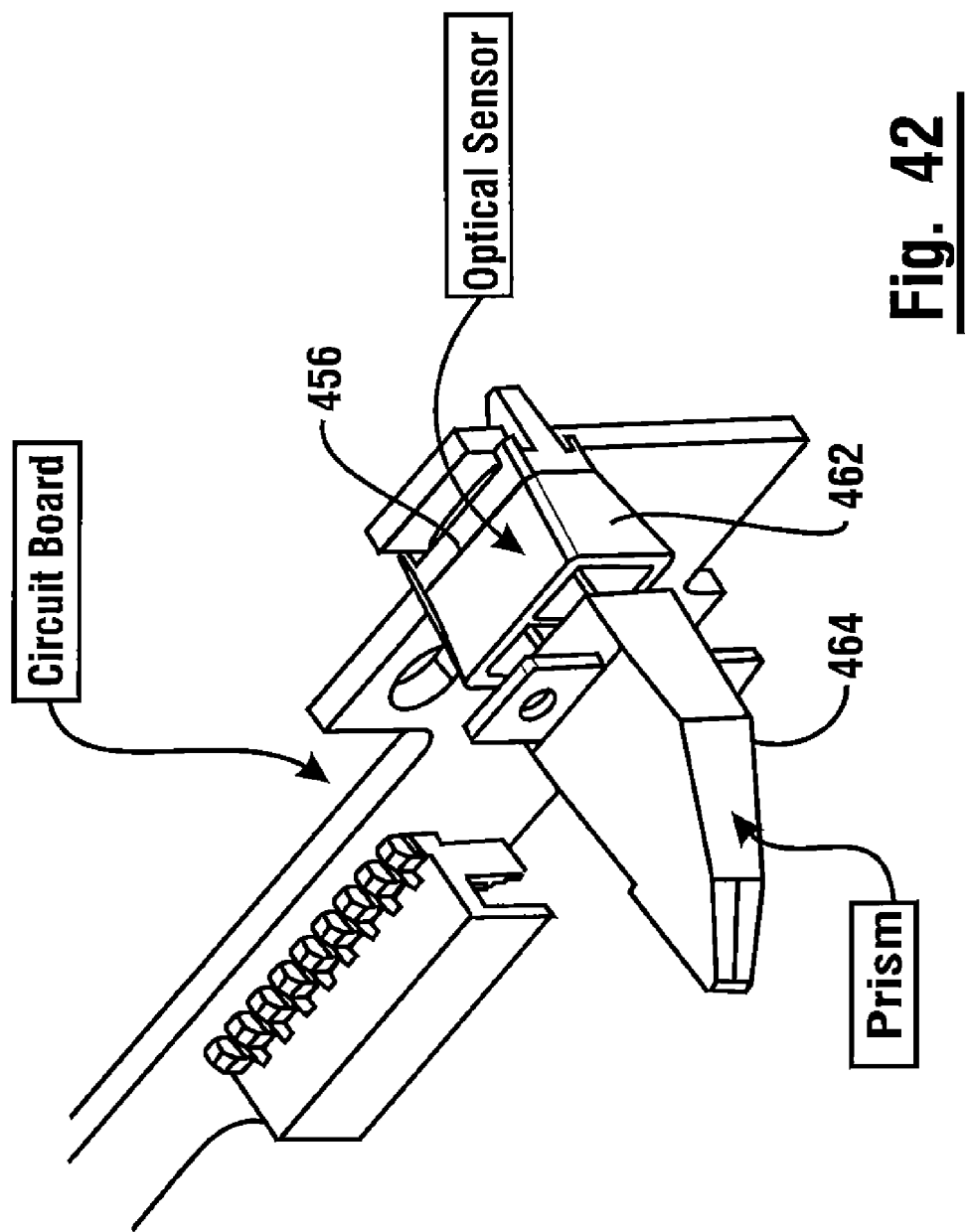
Figure 43:
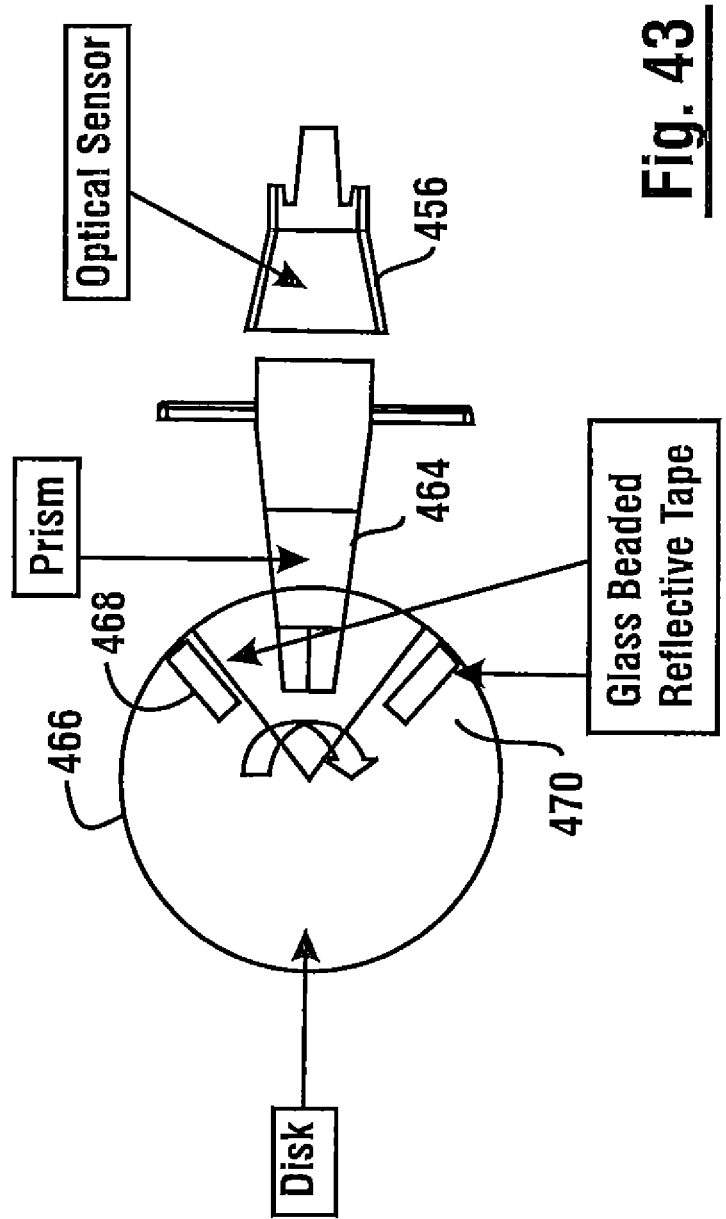
Figure 44:
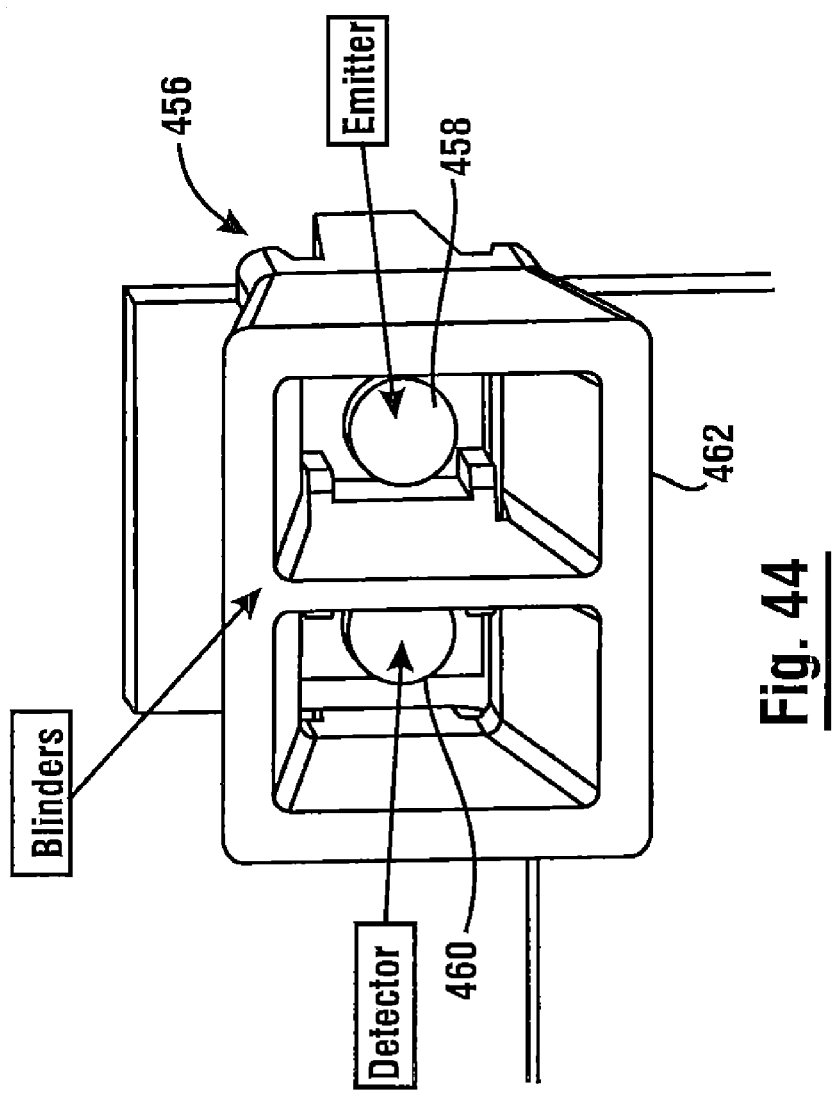
Figure 45:
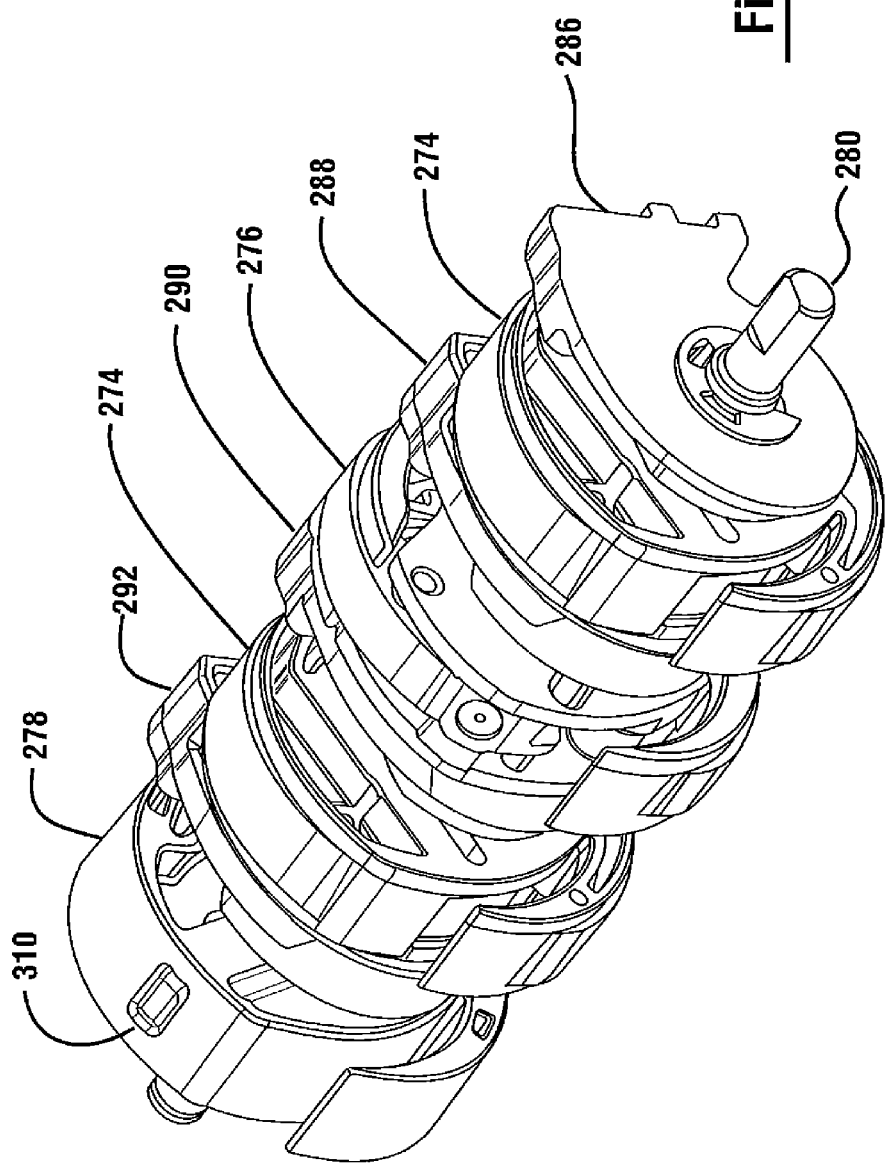
FIG. 45 is an isometric view of an opposite hand stacker wheel assembly from that shown in FIG. 28.

Stacker wheel assembly 332 further includes stationary members 346, 348, 350 and 352. The exemplary stationary members which are shown in greater detail in FIGS. 38 through 40 each include cams thereon. This includes for example cam 354 on member 346, cams 356 and 358 on member 348, and cams 360 and 362 on member 350. Further as can be appreciated in the exemplary embodiment member 352 is configured as a mirror image of member 346. As with the stationary members previously described, each stationary member has a bore therethrough in which shaft 334 can freely rotate. This is represented for example by bore 364 and member 346. In addition each of the stationary members include aligned sheet stop surfaces which are operative to engage sheets in aligned relation with the stack. The sheet stop surfaces facilitate separation of sheets from the rotating members. The sheet stop surfaces are represented for example by surface 366 on member 346.

As previously discussed the gripper members and sensing member each have cam followers extending from opposed lateral axial sides thereof. The cam followers are operative to engage the adjacent cam surfaces and cause movement of components of the rotating members in coordinated relation with the rotation thereof. Of course this approach is exemplary, and in other embodiments other approaches may be used.

Figure 35:
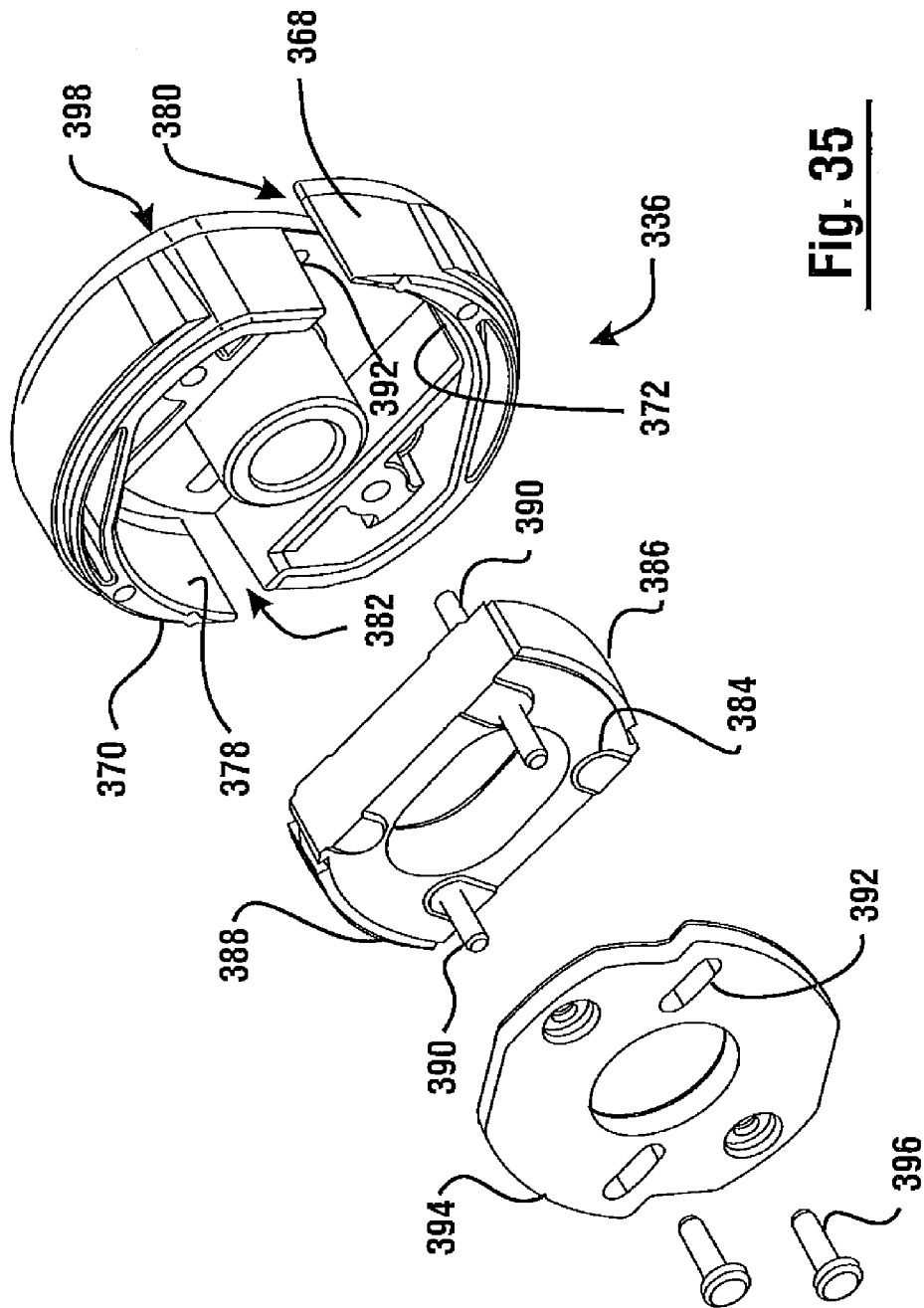
FIG. 35 is an isometric exploded view of components of a rotating member that is operative to selectively hold, move and release sheets in engagement therewith.

FIG. 35 shows an exploded view of the exemplary embodiment of gripper member 336. Similar to gripper member 274, gripper member 336 is a rotating member that rotates in operatively fixed connection with shaft 334 of its associated stacker wheel assembly. Gripper member 336 includes a pair of finger portions 368, 370. Each of finger portions 368 and 370 each have respective radially inward facing surfaces 372 and 378 that each define slots 380 and 382.

A gripper portion 384 is movably mounted on gripper member 336. Gripper portion 384 includes sheet engaging portions 386 and 388 at opposed ends thereof. In exemplary embodiments the sheet engaging portions may include a deformable material such as an elastomer portion for purposes of engaging sheets in sandwiched relation between the sheet engaging portion and the adjacent radially inward opposing surface. Of course this approach is exemplary, and in other embodiments other approaches may be used.

Gripper portion 384 includes cam followers 390 which in the exemplary embodiment extend laterally axially from both sides thereof. Cam followers 390 extend in and are constrained to move in elongated slots 392. Elongated slots extend in a cover 394 which is releasibly attached to the gripper member 336 through fasteners 396. The elongated slots also extend in a wall 398 of the gripper member that is opposite of the cover 394.

As can be appreciated in the exemplary embodiment engagement of the cam followers 390 with the adjacent cams on each side of the gripper member cause the gripper portion 384 to move so as to engage and release sheets in the slots in the desired rotational positions. This is done in the manner previously discussed in connection with gripper member 274. Further in exemplary embodiments if the gripper portion should become worn or saturated with dirt or other contaminants, it may be removed and the interior area of the gripper member cleaned. Likewise the gripper portion 384 may be cleaned or replaced. This is done by removing the fasteners holding the cover 394 and removing the gripper portion from engagement with the gripper member and then reassembling the gripper portion cover. Of course these approaches are exemplary and in other embodiments other approaches may be used.

Figure 37:
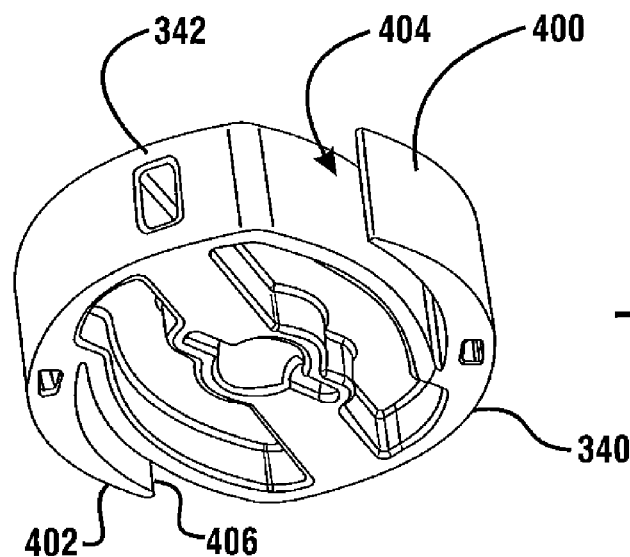
FIG. 37 is an isometric view of the rotating member shown in FIG. 36.
Figure 36:
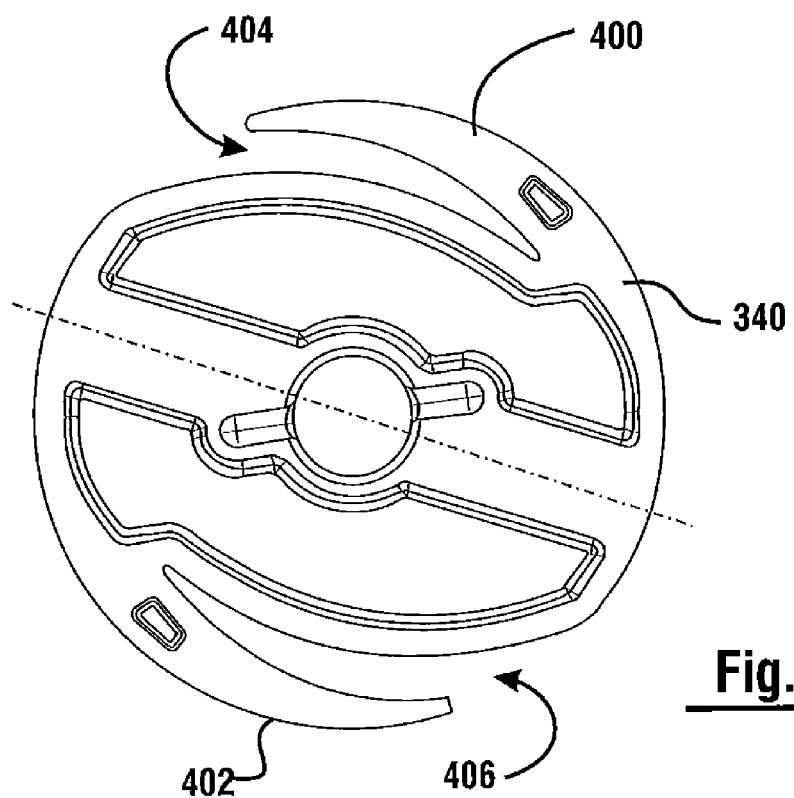
FIG. 36 is a plan view of an exemplary indicating member operative to indicate the rotational position of the rotating members of the assembly shown in FIG. 28.

The exemplary indicating member 340 is similar to indicating member 378. As shown in FIGS. 36 and 37 the indicating member 340 is a rotating member that rotates in operatively fixed engagement with the shaft 324. The indicating member includes a pair of finger portions 400 and 402. The finger portions bound slots 404 and 406 which are configured for accepting sheets therein. As can be appreciated slots 404 and 406 are arranged such that they are angularly aligned with the slots formed on the gripper members 336 and 338 as well as slots on the sensing member 344 so as to facilitate sheets extending therein as they are held, moved and released into the stack. Of course it should be understood that these configurations are exemplary.

FIGS. 30 through 34 show features of the exemplary embodiment of the sensing member 334. It should be understood that sensing member 334 is similar to sensing member 276 that operates in an opposite hand manner.

Figure 30:
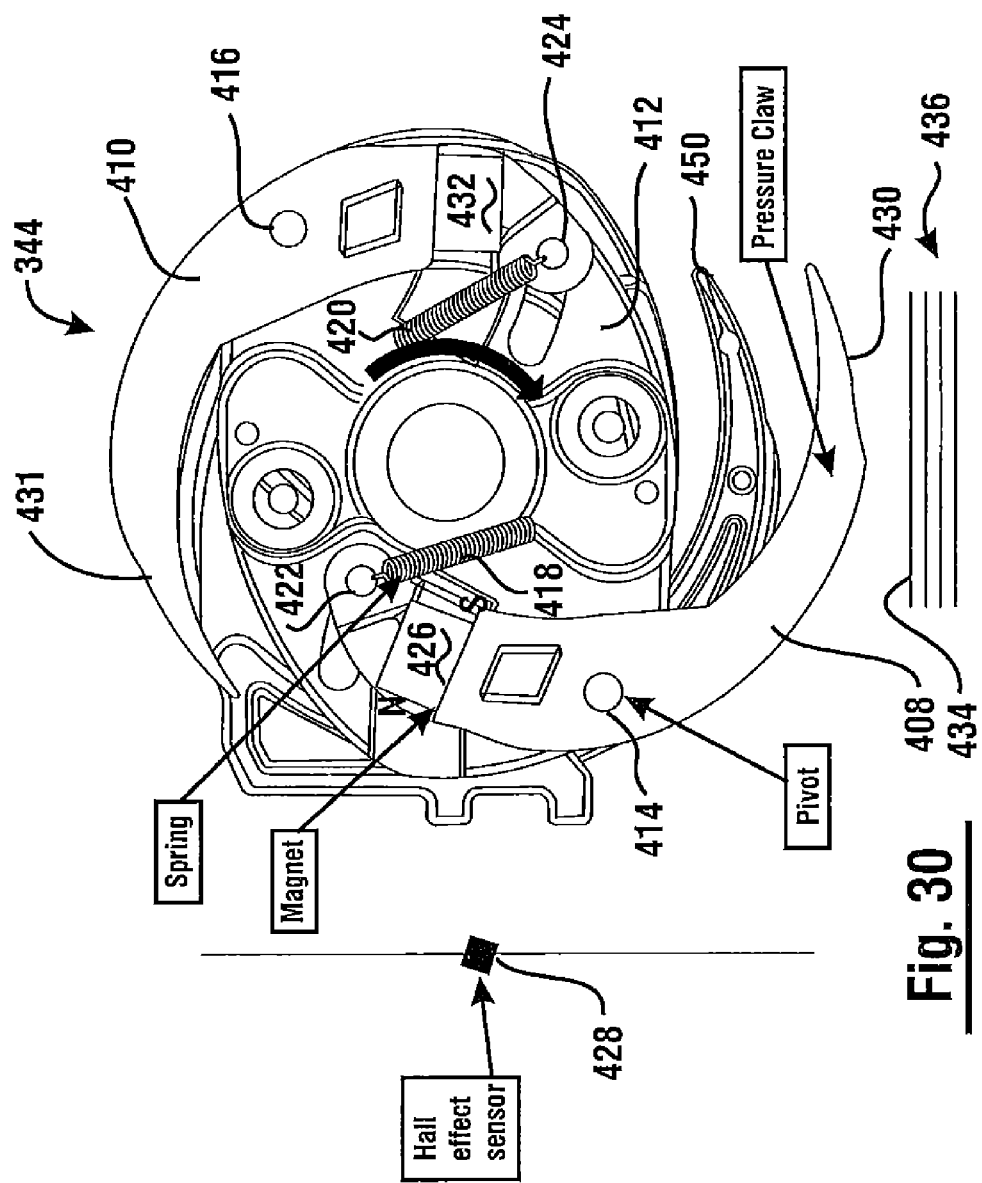
FIG. 30 is a side view of an exemplary rotating member that is operative to sense stack position and facilitate stacking sheets within the sheet holding container.
Figure 31:
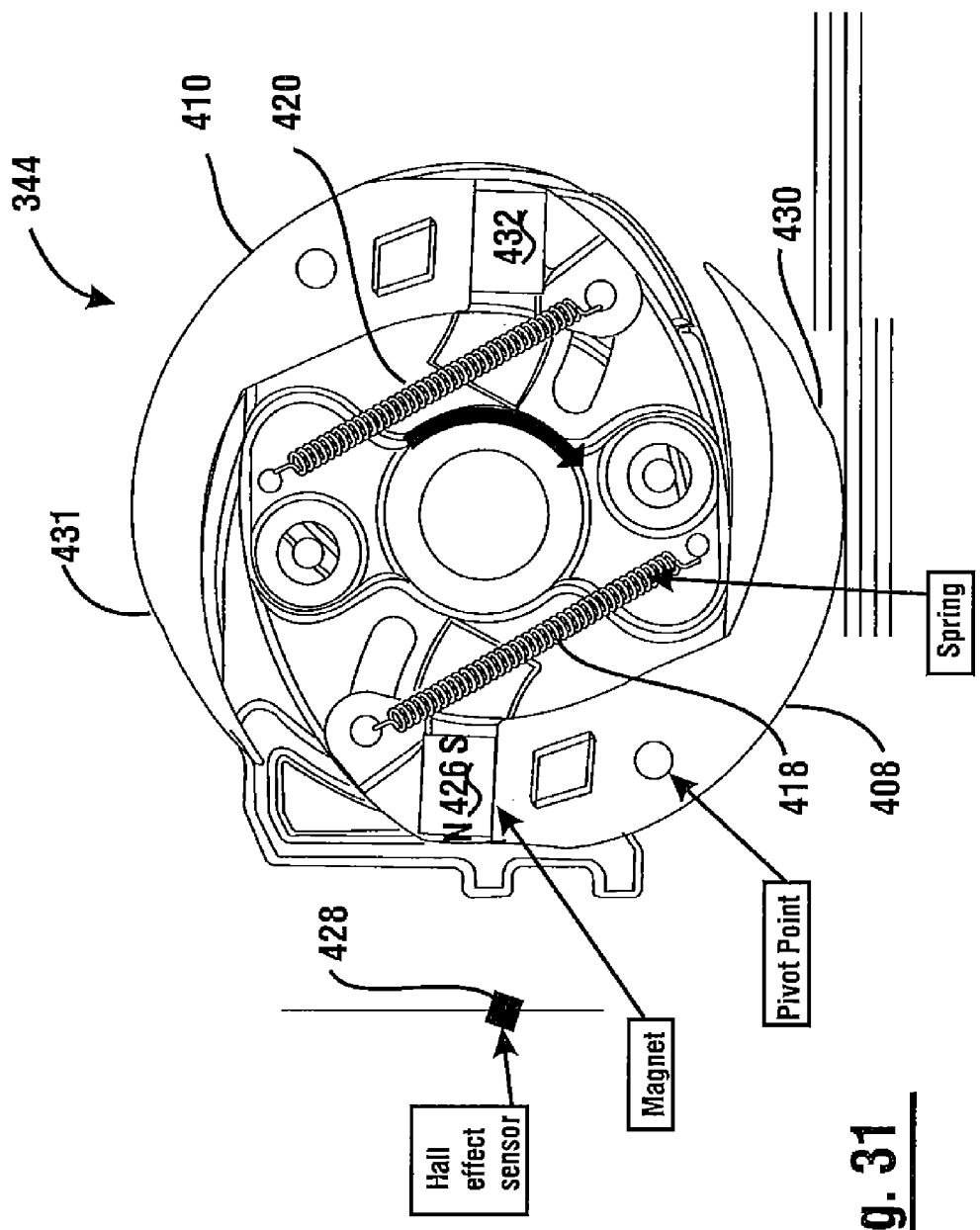
FIG. 31 is a view similar to FIG. 30 but showing the projecting portion of the rotating member moved to a position for properly applying pressure to a stack.

As shown in FIG. 30 sensing member 334 is a rotating member that rotates in operatively fixed engagement with shaft 334. As shown the sensing member rotates in a clockwise direction with the shaft. Sensing member 334 includes a first curved finger portion 408 and a second curved finger portion 410. Finger portion 408 is rotatably mounted to a body member 412 (see FIG. 34) about a pivot 414. Finger portion 410 is mounted to the body portion and rotates about a pivot 416. Finger portion 408 is biased by a spring 418. Spring 418 biases finger portion 408 about the pivot 414 such that the finger portion is biased toward the radially outward position. Similarly finger portion 410 is biased by a spring 420 toward the radially outward position.

Finger portion 408 is in operative connection with a cam follower 422. Cam follower 422 is operative to engage adjacent cams in the stacker wheel assembly 332. Finger portion 410 is also in operative connection with a similar cam follower 424.

Finger portion 408 includes a magnet 426 mounted in supporting connection therewith. Magnet 426 has its poles oriented as shown. Magnet 426 comprises a first target element portion which can be sensed through operation of a Hall effect sensor schematically indicated 428. In the exemplary embodiment the Hall effect sensor is mounted outside of the container 100 and enables sensing the magnetic properties of the magnet in a contactless manner. As can be appreciated from FIGS. 30 and 31 the magnet is movably positioned responsive to radially inward displacement of an outward projecting portion 430 of the finger portion 408. Finger portion 410 includes a projecting portion 431 and a magnet 432. Magnet 432 is similar to magnet 426 and is movable with finger portion 410.

As represented in FIG. 30 the outer projecting portion 430 of finger portion 408 engages the upper sheet 434 in a stack 436 of sheets that are accumulated in container 100. Engagement of the first sheet and the engaging portion is operative to move and position magnet 426. Thus in the exemplary embodiment the position of the first sheet in the stack is detectable through sensing of the magnetic field that can be sensed responsive to the position of the magnet on each finger portion using the Hall effect sensor.

As best seen in FIGS. 33 and 34 the finger portions 408 and 410 each define slots 438, 440. Slots 438 and 440 are configured to be angularly aligned with the slots and the other rotating members in the stacking assembly 332. Further the cam followers 424 and 422 are constrained to move in slots 442. Slots 442 extend in body 412 as well as in a cover 446 that is releasibly attachable through fasteners 448. In operation of the exemplary sensing member 344 the member rotates clockwise as shown. As the projecting portions 430, 431 rotate into engagement with the top sheet bounding the stack, the magnets 426, 432 are positioned so as to enable the Hall effect sensor to sense the position of the magnet and thus the associated projecting portion. Further the action of the springs in the exemplary embodiment biasing the finger members outward, generally maintain a desired pressure on the top of the stack so as to facilitate holding the sheets in the stack. In the exemplary embodiment the projecting portion generally applies approximately one quarter to one half pound of force to the top sheet in the stack for this purpose. Of course this approach is exemplary, and in other embodiments other approaches may be used.

During operation of the sensing member engagement of the cam followers with the adjacent cams enable the projecting portion adjacent to the stack to extend the full outward extent of its radial travel as necessary for purposes of moving to engage the top sheet in the stack. This is represented in FIG. 30 in which a finger portion 450 of an adjacent gripper member is also shown for purposes of demonstrating the extent of travel of the finger portions of the sensing member. However, engagement of the cams operate to limit the outward travel of the finger portions when they are angularly disposed away from the stack. This is represented by the position of finger portion 410 in FIGS. 30 and 31. Holding the finger portion that is rotated away from the stack radially inwardly through engagement with the cams facilitates engagement with the sheets and avoids problems that might occur with potentially catching outwardly extending finger portions on the associated flip shaft assembly. Of course this approach is exemplary, and in other embodiments other approaches may be used.

Figure 32:
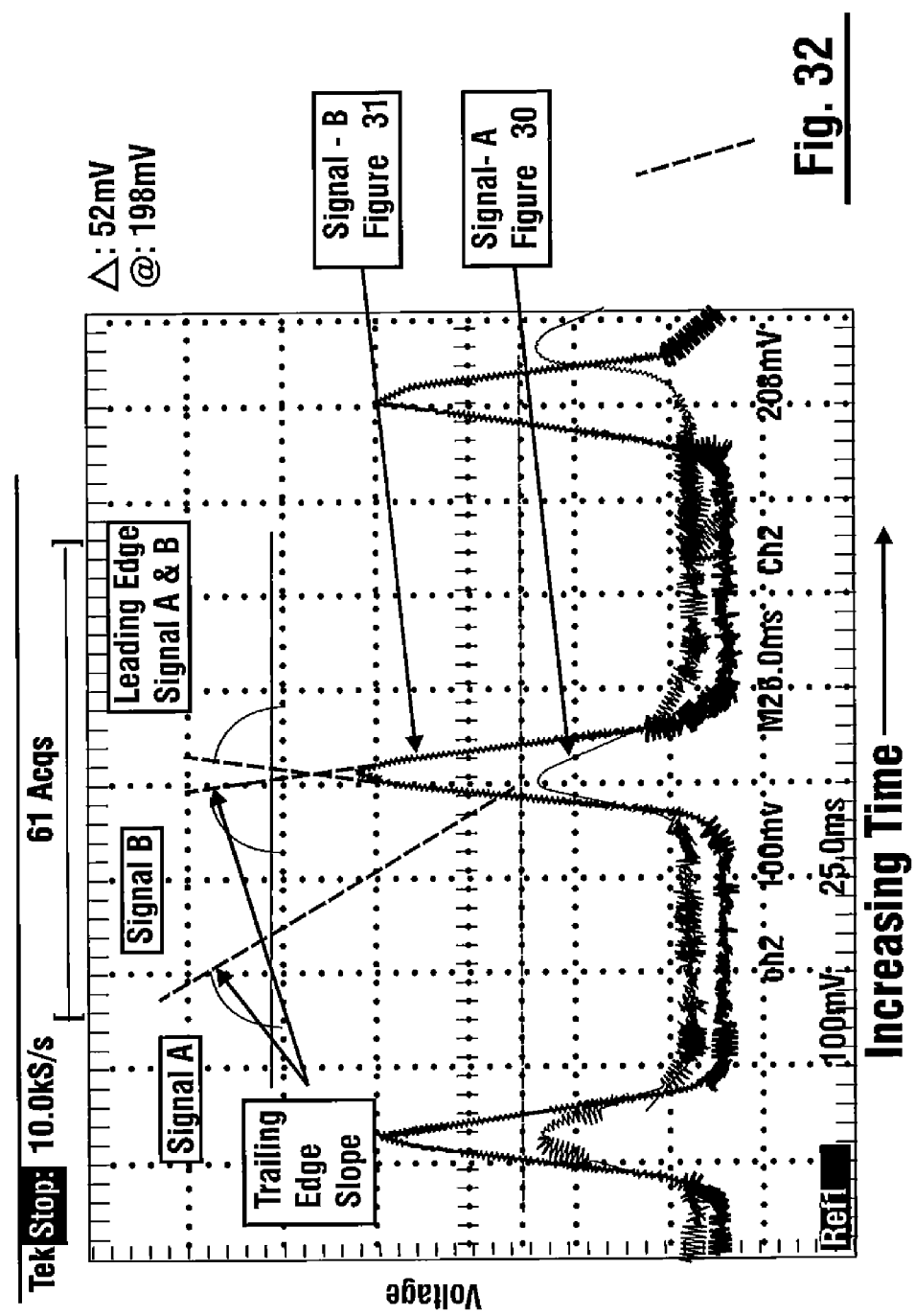
FIG. 32 is a schematic view of exemplary signals generated by a Hall effect sensor based on the positions of the projecting portion in FIGS. 30 and 31.

FIG. 32 shows an exemplary graph of signals that are generated through an adjacent Hall effect sensor through the positioning of the magnets on the movable finger portions of the exemplary sensor member. In FIG. 32 line A corresponds to the signal that is received from the Hall effect sensor when the magnet 426 is positioned as shown in FIG. 30. Line B represents signals that correspond to the position of the magnets in the position shown in FIG. 31 which corresponds to the generally desirable position of the engaging portion relative to the stack.

In operation of one exemplary embodiment the Hall effect sensor 428 is in operative communication through appropriate interfaces with the at least one terminal controller of the automated banking machine. The terminal controller is operative as control circuitry to cause movement of the drive within the associated container so as to position the plate 188 previously described, so as to maintain the projecting portions of the sensing member in the desired position. This is accomplished in the exemplary embodiment by the automated banking machine imparting rotational movement through a gear 218 on the machine to gear 216 which is part of the drive within the container. Rotation of gear 216 is operative to rotate screw 198 of the drive so as to position plate 188 within the container.

In one exemplary embodiment as sheets are added to the stack within the container the Hall effect sensor 428 is operative to sense the magnetic signals generated responsive to the position of the target element portion which includes the magnets 426 and 432. The at least one processor is operative to cause the plate supporting the stack to be moved so as to maintain the desired Hall effect signal which is indicative of the projecting portion on the sensing member being in the desired position upon each rotation. Thus in the exemplary embodiment the appropriate position and pressure is maintained for the stack by the sensing member as sheets are added to the stack. Further as can be appreciated when the container is first installed in an empty condition in the machine, the at least one processor may operate to cause the plate to move so that the plate is positioned and engages the passing projecting portions so that the plate is ready to support incoming sheets.

In some other alternative embodiments at least one processor in the automated banking machine may be operative to selectively control the movement of the plate 188 based on the characteristics of those sheets that are being received into the stack. In an exemplary embodiment at least one data store in operative connection with at least one processor may have stored therein at least one value. This at least one value is used by the processor as sheets are being added to the stack to move the support plate a corresponding distance. Thus for example in some embodiments the addition of each sheet being engaged with the stacker wheel assembly and added to the stack, causes the support plate to be moved away from the stacker wheel assembly a distance that corresponds to the stored value. In such embodiments the at least one stored value corresponds to a thickness of each added sheet. Thus in such embodiments the movement of the support plate is designed to move the stack so that as sheets are being added, the desired amount of compressive force is maintained between the movable projecting portions of the sensing member and the top of the stack. This can help to assure that the integrity of the stack is maintained by avoiding force outside of a desired range which can result in loss of stack integrity. In exemplary embodiments it is desired to maintain approximately one quarter to one half pound of force between the top sheet applied by the rotating assembly that comprises the stacker wheel assembly. This force is applied by the movable projecting portion of the sensing member engaging the top sheet of the stack. Of course this approach is exemplary and in other embodiments other approaches may be used. Further it should be understood that while in this exemplary embodiment the support plate is moved in response to the stored value to accommodate the thickness of each sheet as it is being added to the stack, in other embodiments movement of the support plate may be made only after multiple sheets have been added to the stack.

In operation of the automated banking machine various types of sheets may be accepted within the stack. The sheets being added may vary in their properties. Sheets may include for example new paper or plastic sheets which are relatively rigid and incompressible. Other sheets may include worn sheets which have been crinkled and/or which are relatively more compressible. In some embodiments the stack may be receiving different types of sheets which have different properties in terms of compressibility, which compressibility may be alternatively thought of as sheet fluffiness.

In some exemplary embodiments it is desirable to operate the processor to change the at least one stored value which causes movement of the support plate away from the rotating assembly, based on the degree of compressibility of the sheets that are being sensed as added to the stack in the environment in which the device is operated. This is accomplished in some embodiments by utilizing the existing stored value to move the support plate downward with each sheet that is added to the stack. Then after the current activity or a given transaction in which sheets have been added to the stack, the at least one processor is operative in accordance with its programming to cause the drive to move the plate downward. The plate is moved downward until the projecting portion which serves as a movable sensing member has moved radially outward in engagement with the top sheet of the stack to an extent that a level of movement of the projecting portion is sensed by the sensor that detects the magnetic element in connection with the movable projecting portion.

After the at least one processor has sensed that the movable projecting portion is disposed radially outward to a reference level, the at least one processor is then operative to cause the drive to move the plate toward the stacker wheel assembly. The processor operates to cause the drive to move the plate toward the stacker wheel assembly until the projecting portion in engagement with the top sheet is moved radially inward to an extent in which the magnetic target element portion indicates that the compressive force applied between the projecting portion and the top sheet is at a desired level. This is sensed in the exemplary embodiment by the sensor sensing the position of the magnetic element. In response to sensing the projecting portion having moved to a position in which a desired compressive force is acting between the sensing member of the stacker wheel assembly and the stack, the processor is operative to cause the drive to stop moving the plate toward the rotating assembly.

In the exemplary operation the at least one processor operates to calculate data corresponding to the distances that the plate moves downward to cause the reference displacement of the projecting portion on the sensing member and then the data associated with moving the plate toward the stacker wheel assembly. As a function of the data corresponding to the distances the plate moves away and then toward the stacker wheel assembly to achieve the desired force, the at least one processor operates to calculate data corresponding to a determination of how closely the current at least one stored value is causing the plate to move the appropriate amount with each sheet to maintain the desired compressive force on the top of the stack. The at least one processor then operates in the exemplary embodiment to change the at least one stored value responsive to the determination to correspond to the data associated with moving the support plate.

For example in some exemplary embodiments if the distance that the plate moves downward is greater than the distance that the support plate then moves upward, this may be an indication that the plate is not currently moving downward far enough with each sheet that is being added. This will cause the processor to operate in accordance with its programming to change the at least one stored value stored in the data store so as to cause the support plate to move away from the rotating assembly somewhat more as each sheet is sensed as being added to the stack.

Likewise in an exemplary embodiment if the distance that the plate is moved downward is less than the amount the support plate is moved upward so as to achieve the desired compressive force, this may be an indication that the support plate is moving too far downward with each added sheet. The at least one processor may operate in accordance with its programming to adjust the at least one stored value so that the support plate moves downward somewhat less with each sheet being added to the stack.

Thus in this exemplary mode of operation the at least one processor is operative to change the at least one stored value to more closely correspond to the thickness and properties of sheets that are currently being received in the machine. In other embodiments the at least one processor may move the stack in only one direction and may base the change in stored value on only the one distance. This might be done in circumstances where the plate moves to a location which corresponds to a reference position. Of course these approaches are exemplary and in other embodiments other approaches may be used.

Further it should be understood that in some modes of operation sheets of various sizes may be received in the stack. This may be for example situations where currency bills of various sizes are used within a given country or territory. In situations where smaller bills have been stacked on top of larger bills (or vice versa) it is possible that the stacked sheets may fall over. This may periodically occur due to the unstable nature of a single stack which includes areas with smaller and larger sheets.

In some exemplary embodiments when this occurs the at least one processor may operate responsive to the at least one sensor no longer sensing that the projecting portions on the sensing member on the rotating assembly are engaged with the stack. In such circumstances the at least one processor may operate in accordance with its programming to cause the drive to move the plate toward the stacker wheel assembly until contact of a suitable nature is again established with sheets included within the container. In an exemplary embodiment the at least one processor will then operate to cause another stack of sheets to be built within the container. The further stack will generally begin to build on at least a portion of the earlier stack which is not transversely disposed in the container due to having fallen over. The at least one processor may then operate in the manner described to continue to build the sheet stack within the container. Further in some exemplary embodiments the at least one processor may operate in accordance with its programming to determine a situation where the plate has been required to operate to move toward the sheet stacker assembly a much greater distance than would be appropriate in situations where the integrity of the sheet stack had been maintained. The at least one processor may operate in accordance with its programming to cause certain steps to be taken in such circumstances. These steps may include for example, operating the machine to cause a notification to be given to a remote entity to indicate that stack integrity within a particular container is no longer being maintained. As a result a servicer may be notified to travel to the machine and replace the container. This might be done in circumstances where further processing of sheets is facilitated if stack integrity is maintained. Alternatively if it is desirable to include as many sheets as possible within a given sheet holding container before it is changed, the at least one processor may operate in accordance with its programming to store data which indicates that additional sheets may be stored in the cassette because of the particular circumstances and to continue to operate to add sheets to a container beyond a number that might otherwise be considered a maximum for the container. In still other embodiments the automated banking machine may include mechanisms or members which operate to move or vibrate the containers so that additional sheets may be stored therein.

Of course these approaches are exemplary and in other embodiments other approaches may be used.

Figure 20:
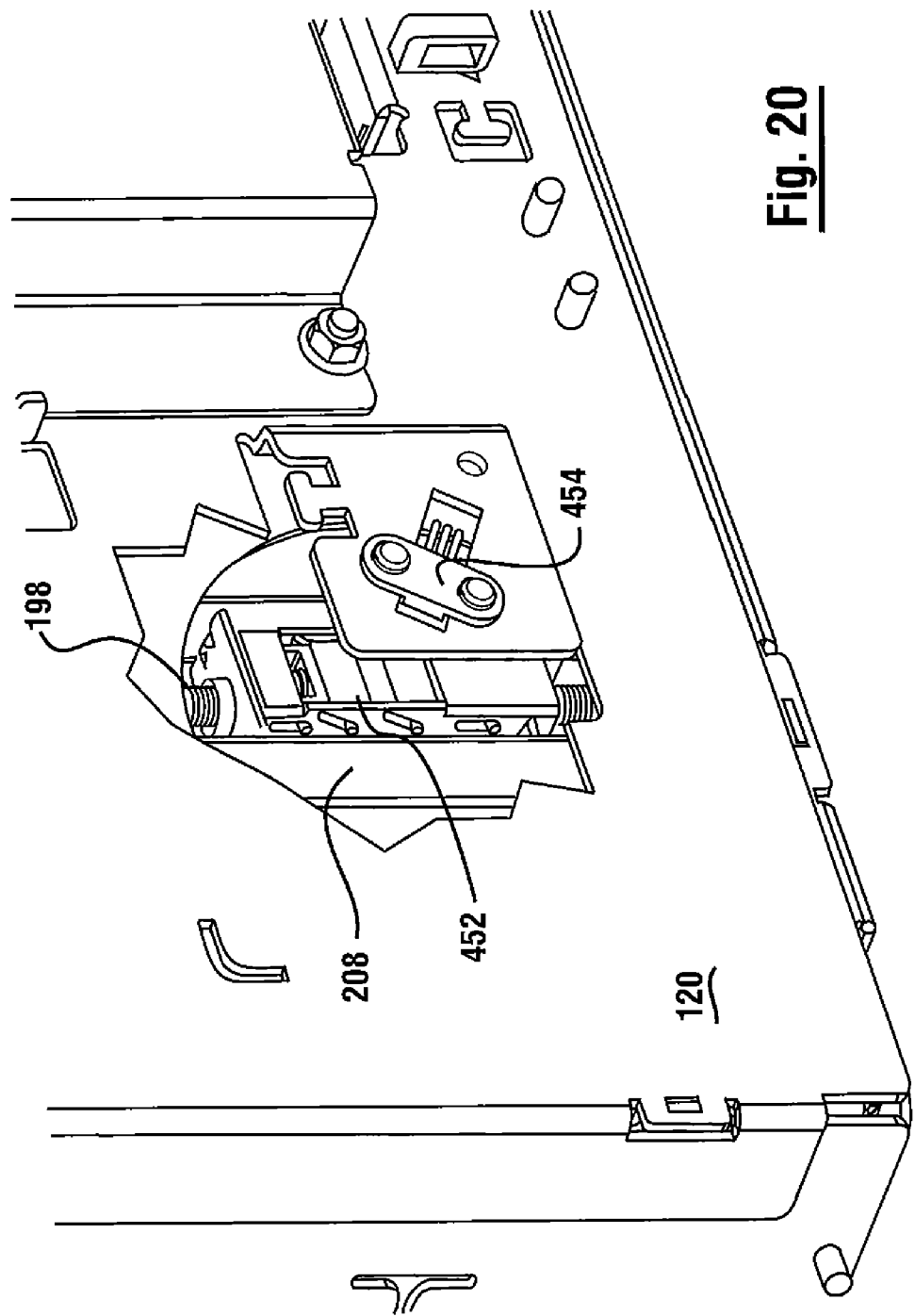
FIG. 20 is a cutaway view of an exemplary sensor for contactlessly sensing the position of the stack plate.
Figure 21:
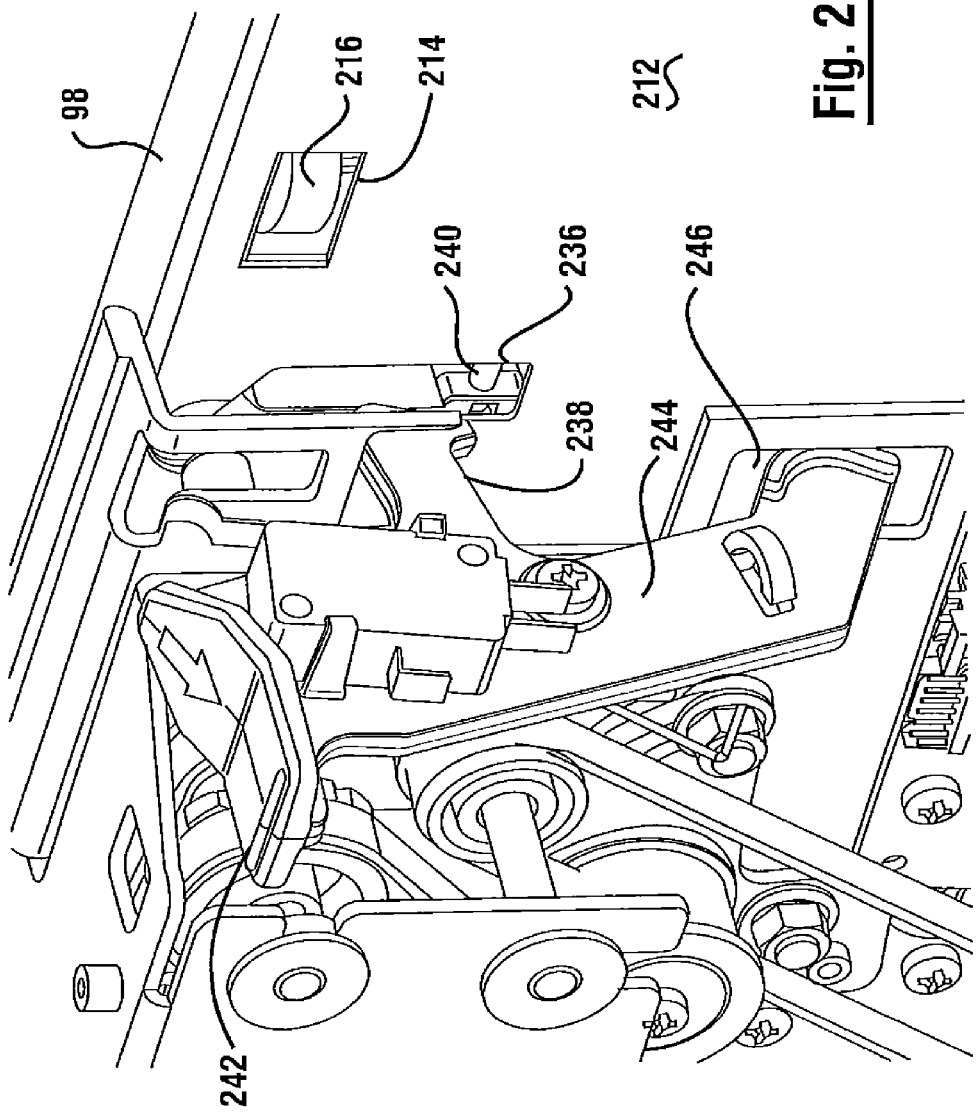
FIG. 21 is an isometric view of an exemplary latch for holding a sheet holding container in an operative position.

In addition in the exemplary embodiment the bracket 208 which is in operative connection with the plate 188 includes a location indicating element 452 thereon. This is represented in FIG. 20. The location indicating element in the exemplary embodiment comprises a magnet which is detectable through a Hall effect sensor 454. The exemplary Hall effect sensor is in operative supported connection with the back wall 120 of the tray 112.

In the exemplary embodiment the Hall effect sensor 454 is positioned so as to indicate that the stack size has grown to the point where it is approaching a maximum number of sheets the container will hold. This is indicative that the container will soon no longer be able to accept additional sheets therein. The terminal controller of the exemplary embodiment is operative to take actions in accordance with its programmed instructions responsive to sensing this condition. This may include for example operating in a manner described in the incorporated disclosures to give notice to an appropriate entity of the need to replace or empty the sheet holding containers within the machine. Further in other embodiments additional sensing devices may be positioned so that the position of the plate 188 may be detected at numerous locations within the container. This enables an exemplary terminal controller to detect the numbers of sheets in each of the containers and use this information to calculate time periods at which replacement of the containers would be required or other actions that need to be taken. Of course this approach is exemplary, and in other embodiments other approaches may be used.

Although the previously described exemplary embodiment uses magnetic sensing principles to contactlessly sense properties and positions of components within the removable containers, other embodiments may use other principles. These include other principles for sensing such components and conditions in a contactless manner. An alternative exemplary embodiment to accomplish such sensing is shown schematically in FIGS. 40 through 44. In this exemplary embodiment radiation sensing principles may be utilized for purposes of sensing such components and conditions. These may include for example sensing of the rotational position of a stacker wheel assembly. It may also include for example sensing positions of a support plate. Such principles may also be applied to sensing the finger portions on a sensing member so as to maintain a proper stack conditions.

In an exemplary embodiment a radiation sensor 456 may be utilized. Such a sensor includes a radiation emitter 458 and a receiver 460 (see FIG. 44). The exemplary sensor uses infrared radiation but in other embodiments other approaches may be used. In exemplary embodiments a radiation blinder structure or similar structure for preventing leakage of radiation directly from the emitter to the receiver may be used. The exemplary blinder structure 462 is shown in detail in FIG. 44. Of course it should be understood that this blinder structure is exemplary and in other embodiments other approaches may be used.

The exemplary embodiment includes a radiation conducting element 464. The radiation conducting element 464 includes a prism which is operative to direct radiation from the emitter and the receiver in the direction of the arrows as shown. In an exemplary embodiment a movable member schematically indicated 466 within the container may have one or more target element portions 468 and 470. The target element portions in an exemplary embodiment may comprise a reflective material which has reflective elements therein that are uniformly aligned so as to provide reflection therefrom. In the exemplary embodiment the target element portions are comprised of glass bead material which includes reflective elements that are operative to reflect incident radiation at an angle of reflection which differs from the angle of incidence. In this way the target element portions may provide reflective properties that are more readily detectable through a radiation sensor. In some exemplary embodiments the target element portions may comprise a reflective tape of the type used in connection with the apparatus described in U.S. patent application Ser. No. 11/983,410 the disclosure of which is incorporated herein by reference in its entirety. Of course this approach is exemplary, and in other embodiments other approaches may be used.

In an exemplary method of an operation target element portions may be positioned on the periphery of one or more rotating members in a stacking element assembly. Using the exemplary optical sensor and radiation conducting element, the sensor 456 is operative to sense each time a target element portion passes in proximity to the end of the radiation conducting element. In this manner the sensor which is in operative connection with the terminal controller enables the terminal controller to operate to control rotation of the stacker wheel assembly.

Alternatively or in addition radiation target element portions may be included in operative connection with a bracket or other member that is in operative connection with a support plate similar to support plate 188. Thus for example sensors and radiation conducting elements may be used to sense the position of the support plate such that the terminal controller may determine when a container has reached a particular degree of fullness (or emptiness). This may be done for purposes of determining that a cassette that is receiving the sheets does not become filled and/or a cassette for dispensing sheets therefrom does not become empty. Of course this approach is exemplary.

In other exemplary embodiments radiation reflective members may be used for purposes of determining and controlling stack position within a container. For example movable finger portions like those previously described may include thereon or in operative connection therewith radiation reflective portions rather than magnetic elements of the type described in the previous embodiment. Such radiation reflective portions may be moved responsive to engagement of the finger portions with the stack. Such movement can be used to provide radiation signals which are sensed through operation of the sensor and which can be used by the terminal processor to maintain the top sheet in the stack and the stacker assembly in the desired relative positions.

Of course it should be understood that the use of magnetic and radiation sensing elements of these described embodiments is exemplary of approaches that may be used for purposes of sensing and controlling items within a container. While in the exemplary embodiment contactless approaches have been described, in other embodiments other approaches including approaches which use electrical and/or physical contact between the container and the remainder of the automated banking machine may be used. It should be understood that these approaches are merely exemplary of applications of the various principles described.

In operation of an exemplary embodiment of the automated banking machine, the machine may operate as an automated teller machine (ATM). In the exemplary embodiment a user operating the machine inputs a data bearing record such as a card to the slot that is operatively connected with card reader 22 of the machine. The card reader operates to read data from the data bearing record that corresponds to a user and/or the user's financial account. In the exemplary embodiment the user also inputs a personal identification number (PIN) through the keypad 24. In the exemplary embodiment the terminal controller operates to provide outputs through the display 28 and/or through the speakers 32 or headphone jack 34 so as to prompt the user to provide these inputs. Of course it should be understood that in other embodiments users may be prompted to input other types of data bearing records or user identifying inputs for purposes of identifying the user or their account.

After receiving the inputs from the user the at least one terminal controller operates the automated banking machine in accordance with its programming to determine if the data read from the data bearing record and/or other inputs correspond to an authorized user and/or a financial account which is authorized to conduct transactions through operation of the machine. This is accomplished in exemplary embodiments by the terminal controller causing communication between the automated banking machine and one or more remote computers to determine that the input data corresponds to data for an individual who is authorized to conduct a transaction. Alternate embodiments may use features like those described in U.S. patent application Ser. No. 13/200,016 filed Sep. 15, 2011 the disclosure of which is incorporated herein by reference in its entirety.

In the exemplary embodiment the user may also provide inputs through one or more input devices indicating that they wish to withdraw cash from the machine. In such circumstances the terminal controller operates in accordance with its associated programmed instructions to cause the machine to communicate with at least one remote computer to determine if the user is authorized to conduct the requested transaction. In response to receiving an indication that the data input by the user corresponds to an individual authorized to conduct such a cash withdrawal transaction, the exemplary terminal controller operates to cause the cash dispenser 38 to dispense the requested cash to the user. The terminal controller operates to cause communications between the automated banking machine and one or more remote computers so as to assess the value associated with the dispensed cash to an account of a user. This may include for example causing a debit to be assessed to an account of the user or by a bank or other financial institution.

Likewise in some exemplary embodiments if the user wishes to deposit cash in the machine the terminal controller causes operation of the currency accepting device 42. The currency accepting device operates to open a gate to provide access through the fascia opening 46 so that the user can insert a stack comprising one or more currency bills. The terminal controller then operates the stack handling mechanism 78 and the picker mechanism 80 so as to unstack the bills one by one and deliver them into the document alignment mechanism 82. Each document is aligned in a desired orientation by engagement with the document alignment mechanism and then moved through the sensing module 84. The sensing module 84 operates to sense various characteristics of each bill, which sensed characteristics are usable to determine properties of the bill such as denomination as well as the genuineness thereof.

In the exemplary embodiment the bills that have been evaluated by the sensing module 84 are directed for storage onto the storage device 88. The terminal controller then operates to advise the user through outputs through the display or other output devices, concerning the machine's determination concerning the number and type of bills that the user has input. In exemplary embodiments the user may be given the option to cause the bills to be deposited for storage in the machine or to have one or more (or all) of the bills returned to the user. Alternatively in some embodiments the machine may operate to advise the user that certain bills are suspect and may be confiscated from the user. Alternatively or in addition other embodiments may operate in accordance with their programming to advise the user that certain sheets do not correspond to bills. Of course these approaches are exemplary and depend on the programming of the particular automated banking machine.

In the exemplary embodiment if the user indicates that they wish to have the bills they have input deposited, the bills are delivered one at a time from the storage device and directed by the gates 86 through the intermodule transport 94 into the sheet directing assembly 96. The terminal controller then causes the sheet directing assembly to operate based on the characteristics of each respective sheet as determined by the sensing module 84. For example the terminal controller may cause sheets having particular denominations or characteristics to be stored in container 98, while sheets having other characteristics are stored in storage location 102, and still other types of sheets are stored in container 100. For example in some embodiments the bills may be sorted by denomination. In still other embodiments the bills may be sorted by the country of origin of the bills, or other properties. Of course this is merely exemplary.

In the exemplary embodiment sheets that are not identifiable as currency bills may be selectively routed to the stack handling mechanism 78 while other bills are directed to the intermodule transport. Further in exemplary embodiments if bills are determined to be counterfeit or of suspected counterfeit they may be directed for storage into the document segregation compartment 92. Of course it should be understood that these approaches are exemplary, and in other embodiments other approaches may be used.

In such a deposit transaction the terminal controller may operate to cause the banking machine to communicate with one or more remote computers so as to cause the machine user and/or their financial account to be credited for a value associated with the valid bills deposited. The terminal controller may operate in some embodiments to indicate the denomination and types of bills that have been deposited. Further in some embodiments the terminal controller may operate to communicate information about the suspect or counterfeit nature of bills to remote computers so that authorities can be notified. Of course other steps may also be taken in accordance with the programming of the particular terminal controller and associated remote computers.

In operation of an exemplary transaction in which a user is to be credited for the value of bills deposited, the terminal controller operates in accordance with its programming to cause the receipt printer 36 of the automated banking machine to provide the user with a receipt. The receipt may include various information about the bills deposited by the user as well as the location, time and date of the transaction. This may be done to provide the user with a record of the transaction that has been conducted. Alternatively or in addition the terminal controller of the exemplary embodiment may cause communication of the machine with other computers so as to provide the user with receipt information via an e-mail message to an e-mail account and/or through a text message to a cell phone or other computer. Of course this approach is exemplary, and in other embodiments other approaches may be used.

In operation of the exemplary automated banking machine sheets are accumulated in stacks in the containers 98 and 100. Sheets may also be accumulated in the middle storage compartment 102. After a plurality of transactions have been conducted one or more of the containers may be sensed as approaching the maximum level of sheets that can be held therein. This may be done through a contactless sensor sensing the position of the stack support plate in the manner previously described, or in another suitable manner. In response to sensing a container reaching a near full condition, the terminal controller may operate in accordance with its programming to notify an appropriate entity of a need to change or remove bills from the container or containers. This may be done in the manner of the incorporated disclosures.

The servicer who is responsible for changing the cassettes or removing bills therefrom may do so by accessing the secure chest of the automated banking machine by opening the safe lock 52 and moving the safe door 50 to an open position. In this position the tray 112 which supports the containers may be moved outward in supporting connection with the slides. Each container may be removed by actuating the respective release lever 242 so as to disengage the latch member from the respective container. The servicer is then enabled to move the top of each container outward from the back wall of the tray and lift the container upward so as to disengage the tray.

With the container 100 disengaged from the tray the door 116 to the middle compartment may be unlatched and opened so as to remove bills which have been accumulated therein. In some exemplary embodiments the middle compartment may be used only under limited circumstances. This may be for example for storing bills when one of the containers has reached the filled condition and can no longer accept bills. Alternatively special types of bills that meet certain criteria or other parameters may be stored in the middle storage area. Notes stored in the middle storage area may be removed by the servicer, and thereafter the door 116 placed in a closed and latched position.

Generally persons responsible for removing containers which have notes stored therein will replace the removed containers with empty containers. The empty containers may be installed in engagement with the tray and have the upper portions thereof moved inward so as to be engaged in positive relation with the respective latching member. Once the containers have been replaced the tray 112 may be retracted to within the safe. The safe door may then be closed and secured and the machine returned to service.

The exemplary removed containers may be transported to a remote location in a locked condition. This may be done for purposes of moving the containers securely to a place where the containers are opened and currency bills therein may be removed and counted. Alternatively field personnel may be provided with keys or other items or data that can be used for unlocking the containers so as to access the bills therein.

In the exemplary embodiment authorized persons open the doors 178 on the containers by opening the associated locks 180. This provides access to the sheet holding compartment within the container. Removal of the sheets therefrom is preferably accomplished by engaging the tab 202 so as to move the lever which releases the plate 188 from operative engagement with the drive. This enables the plate to be moved in the cassette so that the stack of sheets can be more readily manually grasped. The bills are then removed and counted or otherwise processed for purposes of validating the transactions conducted through the machine.

In the exemplary embodiment once the bills have been removed from the container, the container door may be closed and locked and the containers routed for replacement in an automated banking machine. In the exemplary embodiment it is not required to position the plate 188 adjacent to the stacker wheel assembly after the sheets have been removed. This is because the terminal controller in the machine operates in accordance with its programming to automatically position the plate for purposes of receiving sheets once the container has been installed in the machine. Of course these approaches are exemplary, and in other embodiments other approaches may be used.

Figure 56:
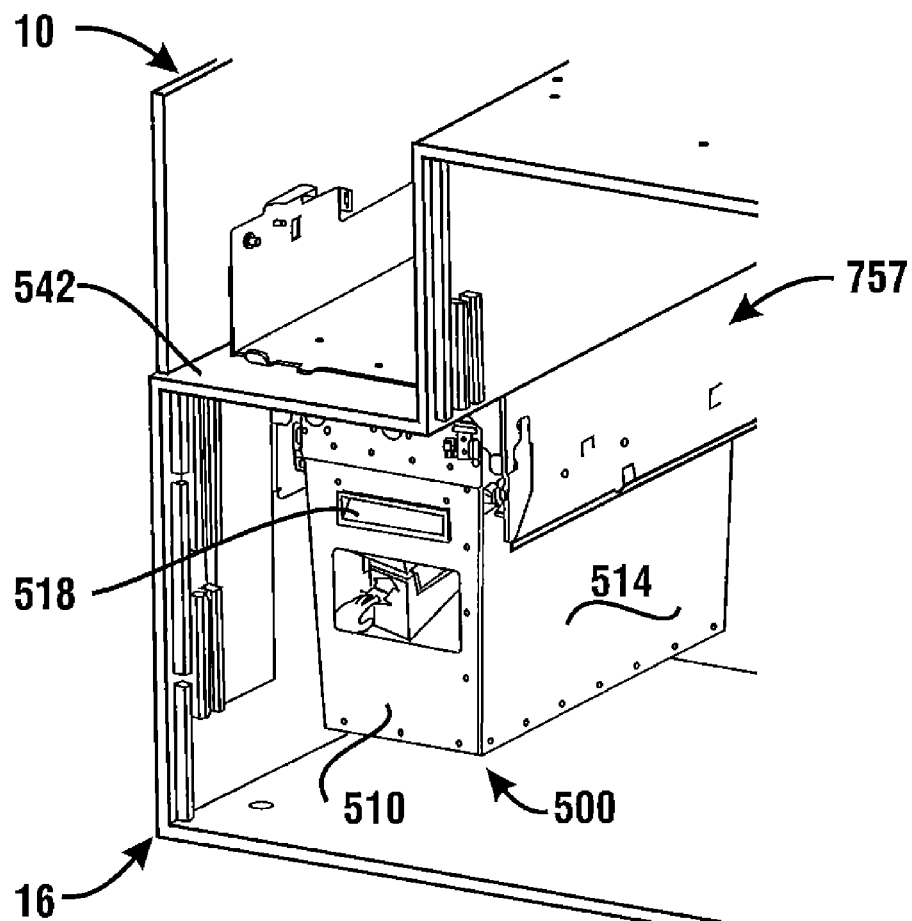
FIG. 56 is a rear and left side isometric view of a portion of an automated banking machine of another exemplary embodiment showing an exemplary free fall cassette docked inside the chest.

FIG. 56 shows another exemplary embodiment in which the chest 16 contains a free fall cassette 500, which is a large transportable container that stores deposited currency bills 502 or other sheets in its interior storage area. The free fall cassette 500 and related elements of the machine will be described with reference to the free fall cassette 500 stored in the rear load machine in which the chest door is located at the rear of the chest 16. The rear of the machine refers to the side of the machine generally opposite the side that includes the consumer interface. In this respect, the terms "rear," "rearwardly," "front," and "forwardly" will reference the location of elements of the free fall cassette 500 with respect to the rear loaded machine. The terms "right" and "left" will reference the location of elements of the cassette 500 and the machine with respect to a view looking at the front of the rear load machine. Of course it should be noted that the automated banking machine may alternatively be a "front load machine" in which the chest door may be situated at the front of the chest, and generally on the same side of the machine as the machine user interface operated by consumers.

Figure 58:
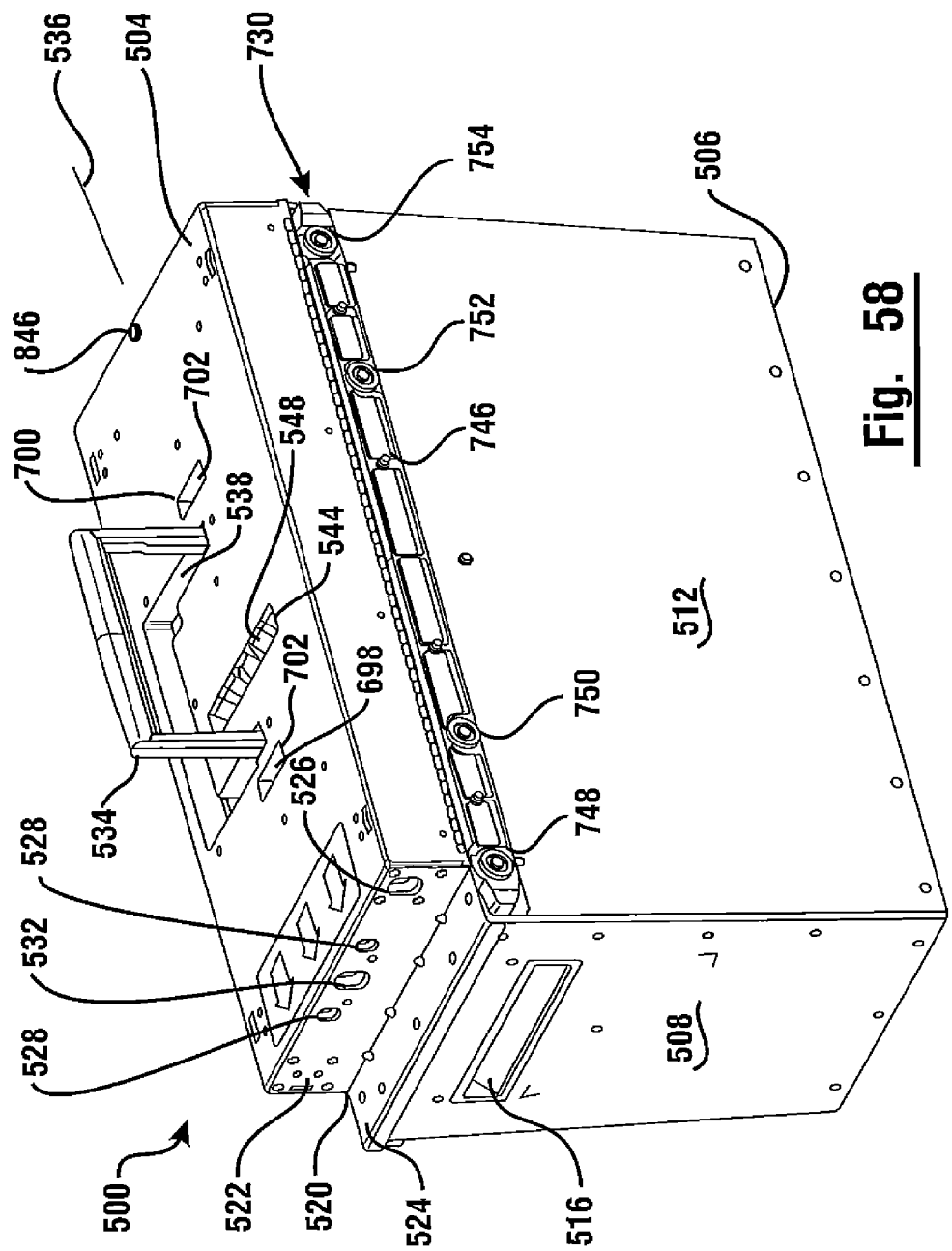
FIG. 58 is a front and right side isometric view of the free fall cassette of the embodiment of FIG. 56.
Figure 69:
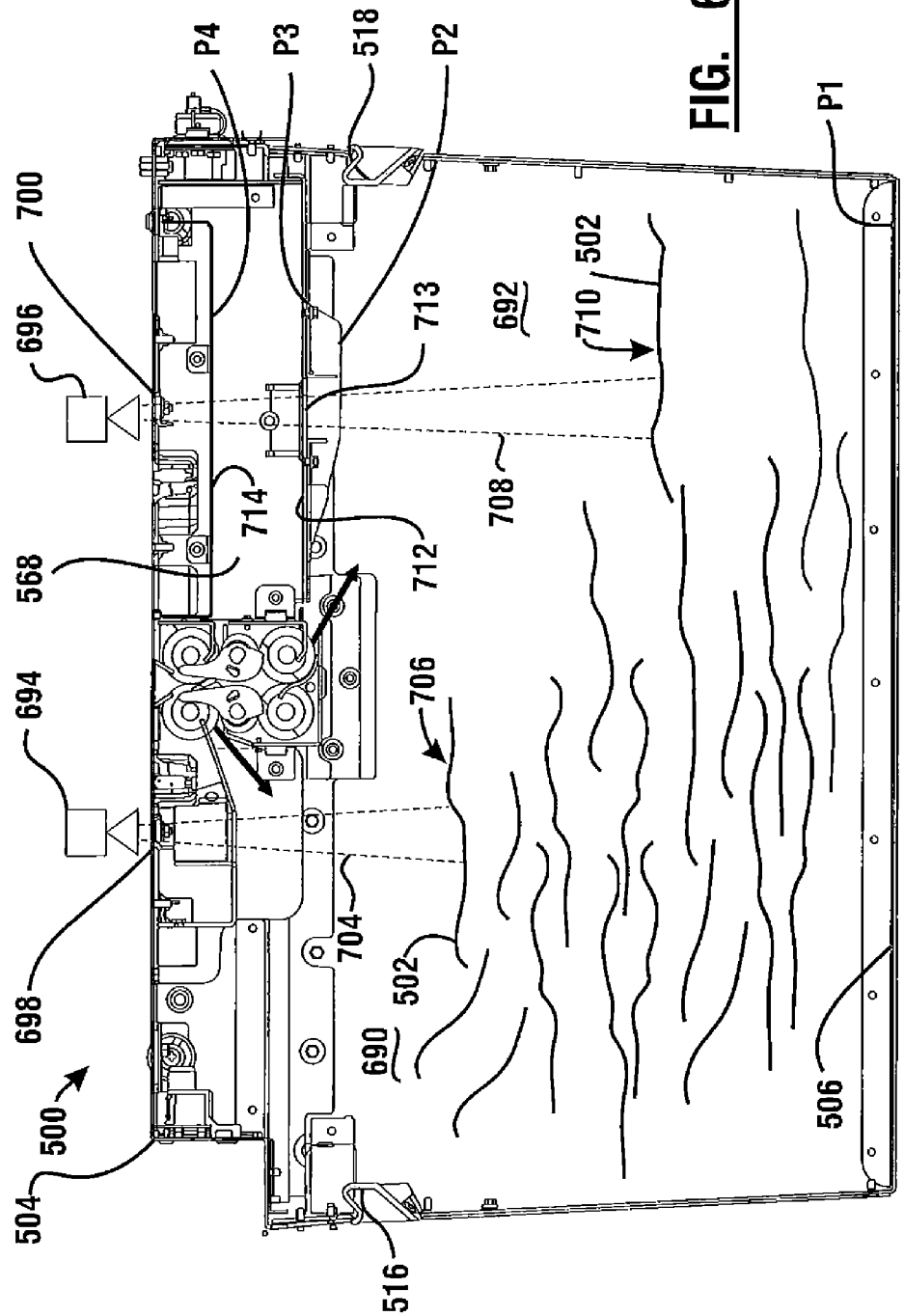
FIG. 69 is a right side sectional view of the free fall cassette of FIG. 56.
Figure 79:
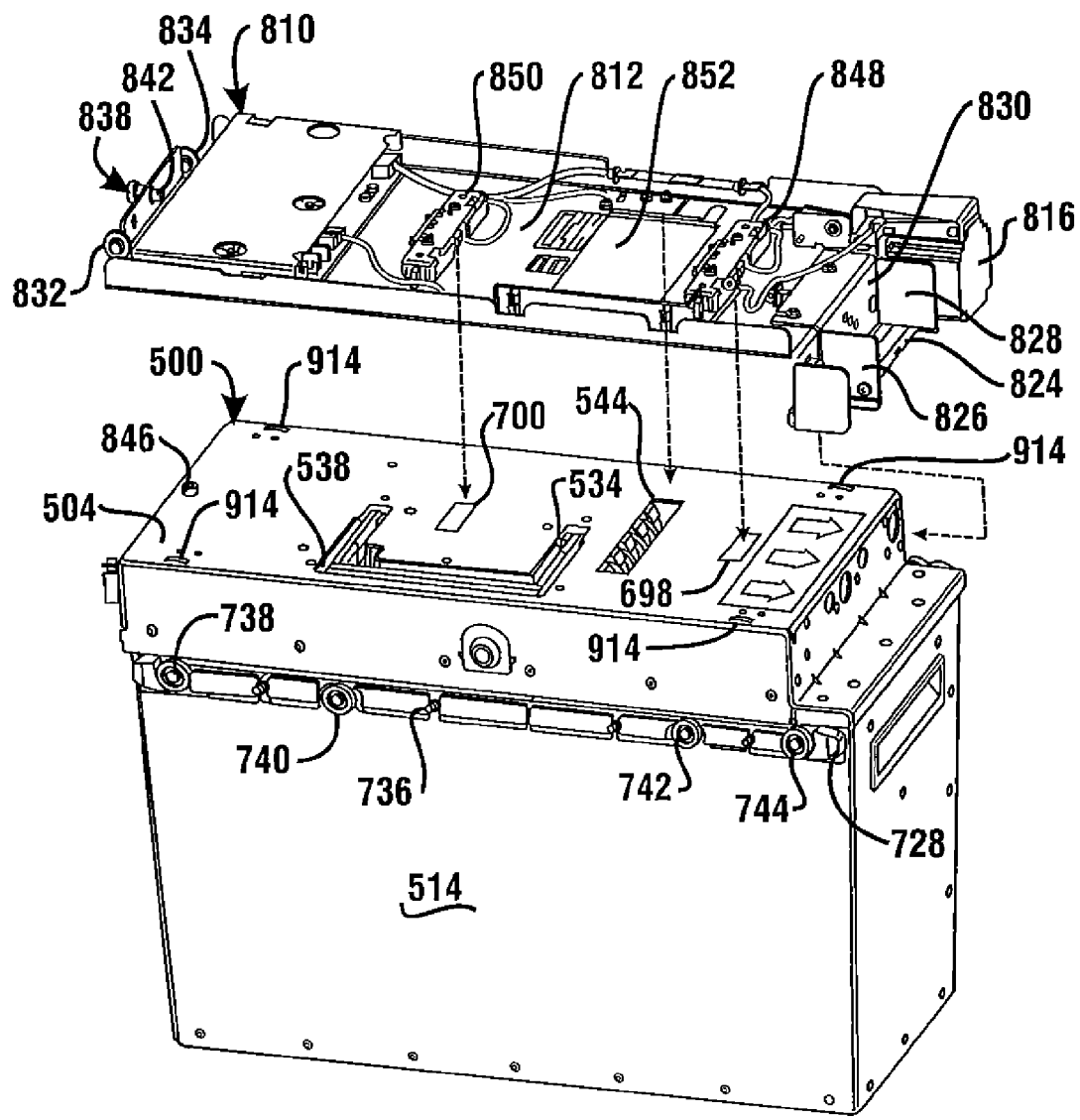
FIG. 79 is a top and left side exploded view of a portion of the embodiment of FIG. 56 showing a sensor plate assembly and free fall cassette.

Referring to FIGS. 56 and 58, the example free fall cassette 500 includes a storage area that is a deep rectangular shaped bucket. In particular, the cassette 500 includes a lid or top portion 504, a bottom wall 506, and upstanding front, rear, right, and left side walls 508, 510, 512, 514 that extend between the top portion 504 and bottom wall 506 (FIG. 69). The front and rear walls 508, 510 include upwardly extending recesses that define front and rear hand grips 516, 518. As seen in FIG. 58, the top portion 504 includes an L-shaped step portion 520 at its front end. The step portion includes a front wall 522 and a bottom wall 524. A pinion gear opening 526, openings 528 which comprise docking pin accepting slots 530 (FIG. 86) and a latch opening 532 between the openings 528 for the docking pin slots 530, are formed in the front wall 522 and are all transversely spaced from each other. The example cassette 500 is generally made of metal, plastic or other suitable high strength material. The top portion 504 and walls may be connected to each other by any suitable way such as by rivets or welding. A carrying handle 534 is pivotably mounted to the top portion 504. The exemplary handle 534 is pivotable about a central longitudinal axis 536 of the cassette 500 between a vertical carrying position as shown in FIG. 58 and a horizontal storage position as shown in FIG. 79. In the storage position, the handle is positioned within a complimentary recess 538 formed in the top portion 504 to provide additional clearance from the chest ceiling 542. In some embodiments the handle is biased to the storage position by one or more springs.

The top portion 504 of the example cassette includes an input opening 544 that receives currency bills that have been received through operation of a bill accepting and validating device. Alternatively the cassette may receive sheets from another type of sheet accepting device included in the machine such as a check acceptor and reader, ticket acceptor, voucher acceptor or other similar device. A first row of front ramp portions 546 (FIG. 72), which in the example embodiment are spaced from each other in the transverse direction relative to the longitudinal axis 536 of the cassette 500, extend downwardly and rearwardly from the front edge of the input opening 544. A second row of rear ramp portions 548, which are also spaced from each other in the transverse direction, extend downwardly and forwardly from the rear edge of the input opening 544. The first and second rows of ramp portions define in transverse cross section a generally funnel or v-shape input opening 544 to facilitate the entry of the bills into the input opening of the cassette.

Figure 59:
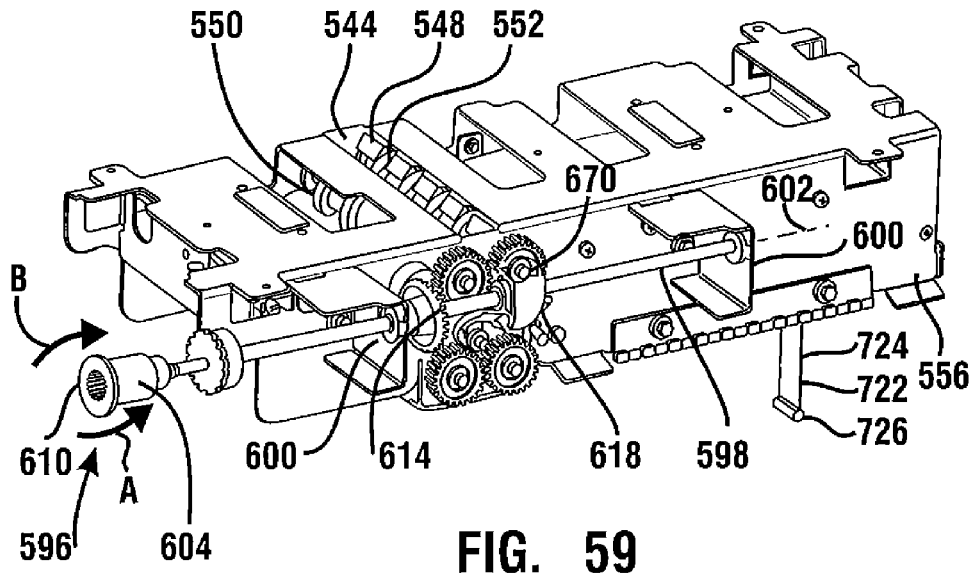
FIG. 59 is a front and right side isometric view of a portion of the top portion of the free fall cassette of the embodiment of FIG. 56 with portions removed for illustrative purposes.
Figure 60:
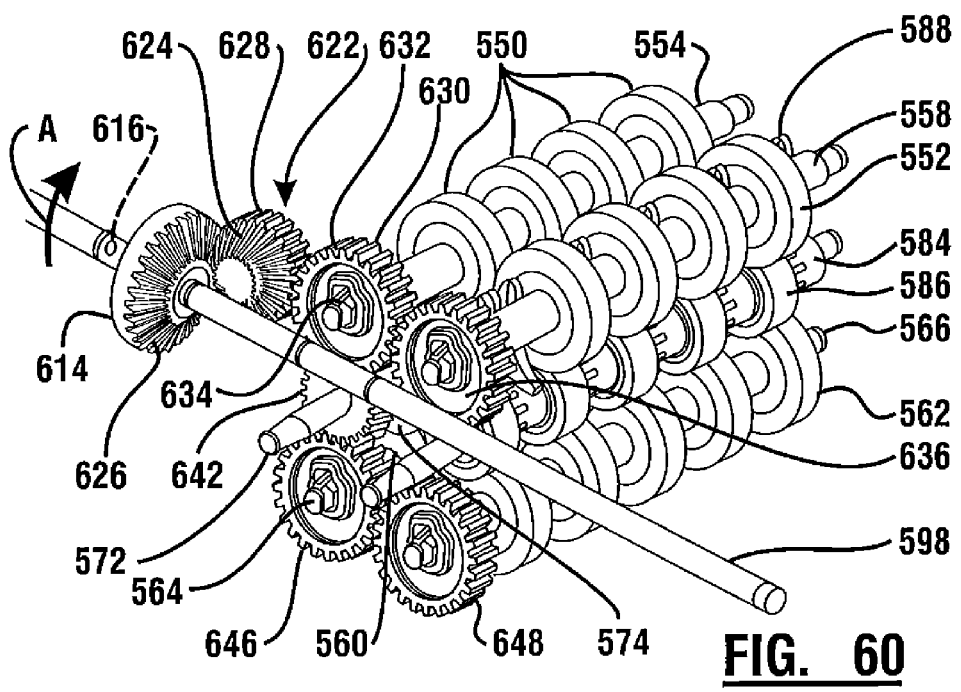
FIG. 60 is a rear and right side isometric view of a portion of the portion of FIG. 59 with portions removed to illustrate elements of a drive arrangement.

Referring to FIGS. 59-60, upper pairs of front and rear pinch rollers 550, 552 are provided inwardly downstream of the input opening 544 for engaging the bills to move them in engagement therewith. Other embodiments may use other structures, such as belts or flaps. Each pair of the rollers 550, 552 is spaced from each other in the transverse direction with respect to the longitudinal axis of the cassette 500. As best seen in FIG. 60, an upper front axle 554 extends through each of the front pinch rollers 550 and is rotatably supported by frame 556 of the top portion 504. The front pinch rollers 550 are in operatively fixed engagement with the upper front axle 554 and rotate with the axle 554. An upper rear axle 558 extends through each of the rear pinch rollers 552 and is rotatably supported by the frame 556 of the top portion 504. The rear pinch rollers 552 are in operatively fixed engagement with the upper rear axle 558 and rotate with the axle 558. Lower pairs of front and rear pinch rollers 560, 562 are provided downstream of the upper pairs of pinch rollers 550, 552 for engaging the bills to transport them in the interior area of cassette 500. Each of the lower pairs of the rollers 560, 562 is spaced from each other in the transverse direction. A lower front axle 564 extends through each of the front pinch rollers 560 and is rotatably operatively supported by the frame 556. The front pinch rollers 560 are in operatively fixed engagement with the lower front axle 564 and rotate with the axle 564. A lower rear axle 566 extends through each of the rear pinch rollers 562 and is rotatably support by the frame 556. The rear pinch rollers 562 are in operatively fixed engagement with the lower rear axle 566 and rotate with the axle 566. The top portion 504 of the example embodiments includes a retract bin 568 that is located rearwardly adjacent the upper pairs of rollers 550, 552 and the lower pairs of rollers 560, 562. The retract bin 568 is used to isolate selected sheets, notes or bills from certain customer transactions. Isolating these notes helps the bank personnel in balancing and reconciling certain transactions done by customers, or in tracking sheets stored in and/or that were unable to be dispensed from the machine, for example.

Figure 61:
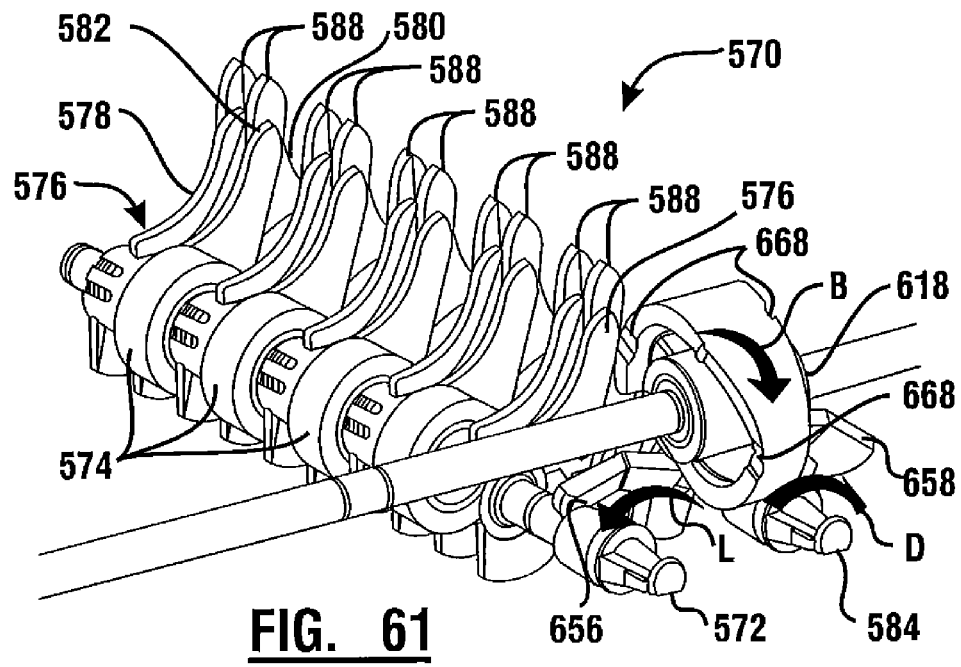
FIG. 61 is a front and right side isometric view of a portion of the portion of FIG. 59 with portions removed to illustrate elements of a gating system.

Referring to FIG. 61, an exemplary gating system 570 is provided to selectively direct the bills or other sheets to certain areas within the cassette 500. The gating system 570 includes a front shaft 572 that is positioned between the front axles 554, 564 (FIG. 60) and axially extends in the transverse direction with respect to longitudinal axis 536. The front shaft 572 extends through a plurality of front idle rollers 574 that freely rotate relative to the front shaft 572. The front idle rollers 574 are positioned between the upper front pinch rollers 550 and the lower front pinch rollers 560. The front idle rollers 574 engage the front pinch rollers 550, 560 and rotate with the pinch rollers 550 but allow the front shaft 572 to be fixed during their rotation. Profiled front gate guides 576 which serve as sheet guides are in operatively fixed relative engagement with the front shaft 572 and rotate with the front shaft 572. The front guides 576 extend radially outwardly relative to the rotational axis of the front shaft 572. Each front guide 576 includes a front side 578 that has a sheet engaging surface that is concavely curved and a rear side 580 that is generally straight. The front and rear sides 578, 580 converge toward each other going in the radially outward direction and terminate into an inverted U-shaped distal end 582.

Figure 64:
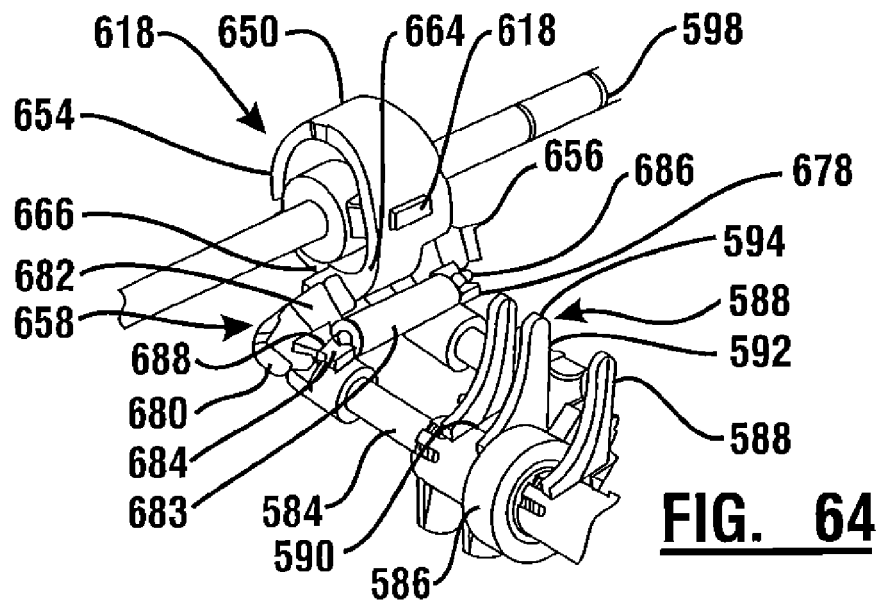
FIG. 64 is a rear and left side isometric views of a portion of the portion of FIG. 61.

The example gating system 570 includes a rear shaft 584 that is positioned between the rear axles 558, 566 and axially extends in the transverse direction with respect to the longitudinal axis 536. As depicted in FIG. 61, the rear shaft 584 extends through a plurality of rear idle rollers 586 that freely rotate relative to the rear shaft 584. The rear idle rollers 586 are positioned between the upper rear pinch rollers 552 and the lower rear pinch rollers 562. The rear idle rollers 586 engage the upper rear pinch rollers 552 and rotate with the pinch rollers 552, 562 but allow the rear shaft 584 to be fixed during their rotation. Profiled rear gate guides 588 are in operatively fixed relative engagement with the rear shaft 584 and rotate with the rear shaft 584. The rear guides 588 extend radially outwardly from the rotational axis of the rear shaft 584. As best depicted in FIG. 64, each rear guide 588 includes a rear side 590 that includes a sheet contacting surface that is concavely curved and a front side 592 that is generally straight. The front and rear sides 590, 592 converge toward each other going in the radially outward direction and terminate into an inverted U-shaped distal end 594. As seen in FIG. 61, the front guides 576 are transversely offset from the rear guides 588. This allows the front guides 576 to pivotably move past the rear guides 588, as well as the rear guides 588 to pivotably move past the front guides 576 so that in passing they do not block or strike each other. The front and rear idler rollers 574, 586 act to fill the space between the upper pinch rollers 550, 552 and the lower pinch rollers 560, 562 in order to help guide the bills from the upper pinch rollers to the lower pinch rollers and prevent the bill from moving outside of the passage between them.

Figure 62:
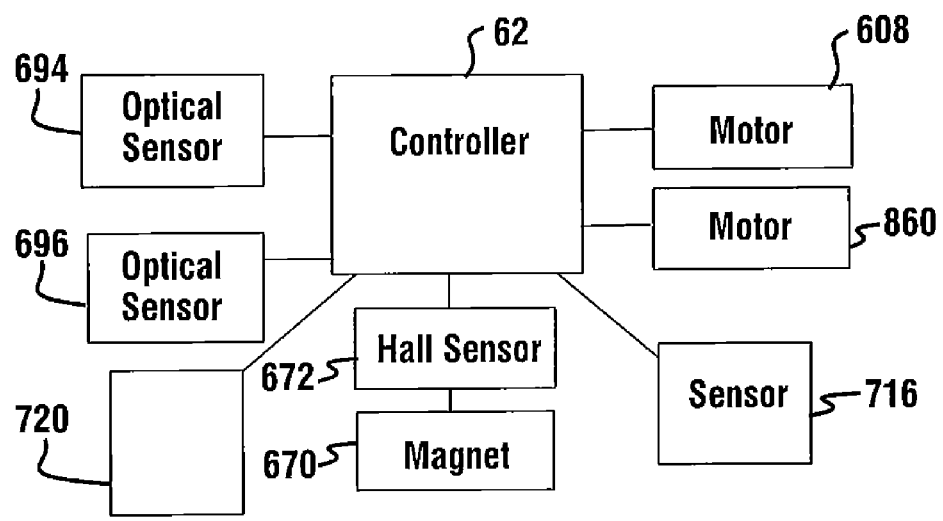
FIG. 62 is a schematic view of a portion of the exemplary embodiment of FIG. 56 showing a controller electrically connected to related elements of the exemplary embodiment.

An exemplary drive arrangement 596 is provided to selectively drive the pinch rollers and position the sheet guides. As depicted in FIG. 59, the example drive arrangement includes a single drive shaft 598 that is rotatably movably mounted to axial support plates 600 attached to the right side of the frame 556. The drive shaft 598 has an axis of rotation 602 that is generally parallel with the longitudinal axis 536 of the cassette 500. A female input coupling 604 is attached to one end of the drive shaft 598 and extends to the pinion gear opening 530. In the operative position of the cassette the input coupling receives a pinion gear 606 (FIG. 84) which is in operative connection with a bidirectional stepper motor 608 (FIG. 62). The motor 608 is operatively connected to the terminal controller 62 as seen in FIG. 62. The controller 62 may be the central computer of the automated banking machine, or any suitable module controller or processor. Alternatively, control circuitry may be provided which includes a processor and which circuitry comprises the controller 62.

The example input coupling 604 includes inner teeth 610 that meshingly engage outer teeth 612 of the pinion gear 606 so that rotation of the pinion gear 606 rotates the input coupling 604 and hence the drive shaft 598. The drive shaft 598 is in engagement with a first bevel gear 614 with an embedded one-way clutch 616 (schematically indicated in FIG. 60) and is operatively connected to the drive shaft 598 to drive the pinch rollers. The drive shaft 598 is also in engagement with a four-position cam 618 with an embedded one-way clutch 620 (schematically indicated in FIG. 63). The cam 618 causes the front and rear guides 576, 588 to each pivot between two positions to provide four operative configurations of the guides. When the drive shaft 598 rotates counterclockwise as represented by arrow A of FIG. 59, the one-way clutch 616 associated with the first bevel gear 614 engages such that first bevel gear 614 rotates with the drive shaft 598, but the one-way clutch 620 of the cam 618 does not engage and move with the drive shaft so that the cam 618 remains stationary with respect to the drive shaft 598. When the drive shaft 598 rotates clockwise as represented by arrow B of FIG. 59, the one-way clutch 616 in the first bevel gear 614 does not engage and move with the drive shaft such that first bevel gear 614 remains stationary with respect to the drive shaft 598, but the one-way clutch 620 of the cam 618 engages such that the cam 618 rotates with the drive shaft 598.

Referring to FIG. 60, the example drive arrangement 596 includes a second bevel gear 622 that rotates about an axis transverse to the rotational axis 602 of the drive shaft 598. The second bevel gear 622 includes inner beveled teeth 624. Teeth 626 of the first bevel gear meshingly engage the inner beveled teeth 624 of the second bevel gear 622 at the front end of the second bevel gear 622. The second bevel gear 622 includes outer teeth 628 that engage teeth 630 of an upper front gear 632. The upper front gear 632 includes a hub opening 634 that receives the upper front axle 554. The hub opening 634 is non-circular in shape that conforms with the shape of the axle in the area of the hub so that the upper front gear 632 rotates with the upper front axle 554. The teeth 630 of the upper front gear 632 also engage teeth of an upper rear gear 636. The upper rear gear 636 includes a hub opening 634 that receives the upper rear axle 558. The hub opening is non-circular in shape so that the upper rear gear is in operative connection with and rotates 636 with the upper rear axle 558. The teeth 630 of the upper front gear 632 also engage teeth 640 (FIG. 63) of a front idler gear 642. The front idler gear 642 is operative supported on the front shaft 572 and freely rotates relative to the front shaft 572. The teeth 640 of the front idler gear 642 also meshingly engage teeth of a lower front gear 646. The lower front gear 646 includes a hub opening that receives the lower front axle 564. The hub opening is non-circular in shape so that the lower front gear is in operatively fixed engagement with and rotates 646 with the lower front axle 564. The teeth of the lower front gear 646 also meshingly engage teeth of a lower rear gear 648. The lower rear gear 648 includes a hub opening that receives the lower rear axle 566. The hub opening is non-circular in shape and is in operatively fixed engagement with axle 566 so that the lower rear gear 648 rotates with the lower rear axle 566. Of course this engagement is exemplary and in other embodiments other arrangements of gears or other drive members may be used, for example rollers, belts or other structures.

Rotation of the first bevel gear 614 in the direction indicated by A of FIGS. 59 and 60, causes rotation of the second bevel gear 622 in the counterclockwise direction (as viewed in FIGS. 59 and 60) which in turn causes rotation of the upper front gear 632 in the clockwise direction. Rotation of the upper front gear 632 in the clockwise direction causes rotation of both the front idler gear 642 and the upper rear gear 636 in the counterclockwise direction. Rotation of the front idler gear 642 in the counterclockwise direction rotates the lower front gear 646 in the clockwise direction, which in turn rotates the lower rear gear 648 in the counterclockwise direction. Rotation of the upper front gear 632 in the clockwise direction rotates the upper front pinch rollers 550 clockwise and rotation of the upper rear gear 636 rotates the upper rear pinch rollers 552 such that they engage and move a bill from the input opening 544 down into the cassette 500. Rotation of the lower front gear 646 in the clockwise direction rotates the lower front pinch rollers 560 clockwise and rotation of the lower rear gear 648 rotates the lower rear pinch rollers 562 such that they engage and move a bill transported from the upper front and rear pinch rollers 550, 552 down into the cassette 500.

Figure 63:
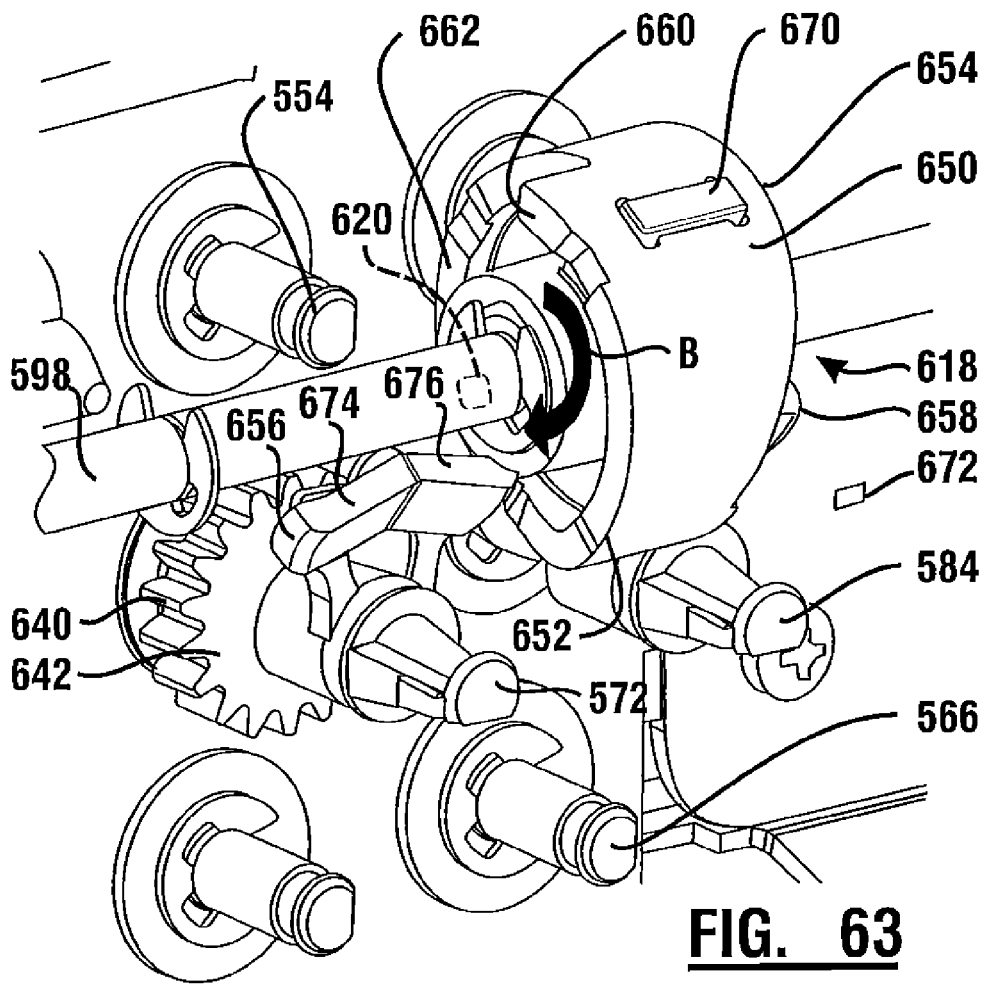
FIG. 63 is a front and right side view of a portion of the portion of FIG. 59 with portions removed to illustrate elements of the gating system.

Referring to FIG. 63, the exemplary cam 618 is centered between and just above the front and rear shafts 572, 584. The cam 618 includes a rim or periphery 650 that has profiled front and rear cam surfaces 652, 654 that are engaged by respective front and rear cam arms 656, 658 which act as cam followers. The front cam surface 652 has first and second portions 660, 662. The first portion 660 extends a further distance forwardly than that of the second portion 662. Referring to FIG. 64, the rear cam surface 654 has first and second portions 664, 666. The first portion 660 extends a further distance rearwardly than that of the second portion 662. The cam 618 includes notches 668 formed in the cam surfaces at the junction of their respective portions. The notches are configured to include a step so that when the notch is engaged with a gate arm, the cam will not move counterclockwise (as viewed in FIGS. 59, 61 and 63) and slip out of position when the drive shaft 598 rotates in the counterclockwise direction A. A magnet 670 is embedded into the exemplary cam 618 between the front and rear cam surfaces 652, 654. An analog Hall Effect sensor 672 is operatively connected to the housing of the machine outside the cassette. The sensor is operative to sense at least one property of the magnetic field of the magnet to detect at least one position of the magnet 670. As seen in FIG. 62, the Hall Effect sensor 672 is operatively connected to the controller 62 so that this position data can be resolved through operation of the controller 62. The controller 62 determines the home or starting position of the cam from this data. The controller is operative to output control signals to the motor 608 to operate the motor to cause the guides to selectively pivot to positions for directing sheets to desired portions of the cassette interior area based on data received by the controller as will be explained further.

Referring to FIG. 63, the example front gate arm 656 is in operatively fixed engagement with the front shaft 572 of the gating system 570. The front gate arm 656 has a proximal portion 674 that extends generally radially outward in the rearward direction from the front shaft and distal portion 676 that extends or angles rearwardly from the proximal portion 674 and axially away from the guides. A front retaining projection 678 extends from the front gate arm towards the front guides 576. The example rear gate arm 658 is in operatively fixed engagement with the rear shaft 584 of the gate system at a location on the rear shaft near the cam 618. The rear gate arm 658 has a proximal portion 680 that extends generally radially outward in the forward direction from the rear shaft 584 and a distal portion 682 that extends or angles forwardly from the proximal portion 680 and axially away from the rear guides 588. A rear retaining projection 684 extends from the rear gate arm 658 towards the rear guides 588. A tension spring 683 with opposite front and rear looped ends 686, 688 is operatively connected to the front and rear gate arms 656, 658. In particular, the front looped end 686 engages the front retaining projection 678 of the front gate arm 656 and the rear looped end 688 receives the rear retaining projection 684 of the rear gate arm 658. The tension spring 683 serves to urge and maintain the gate arms in contact with the cam surfaces. Of course, this approach is exemplary and in other embodiments other structures may be used.

Figure 65:
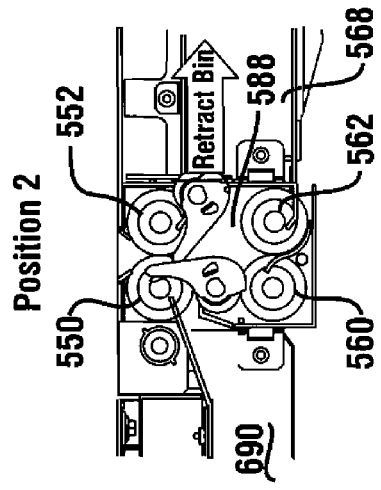
FIGS. 65 through 68 are right side views of a portion of the exemplary embodiment of FIG. 56 showing the positions of the guides of the gating system.
Figure 66:
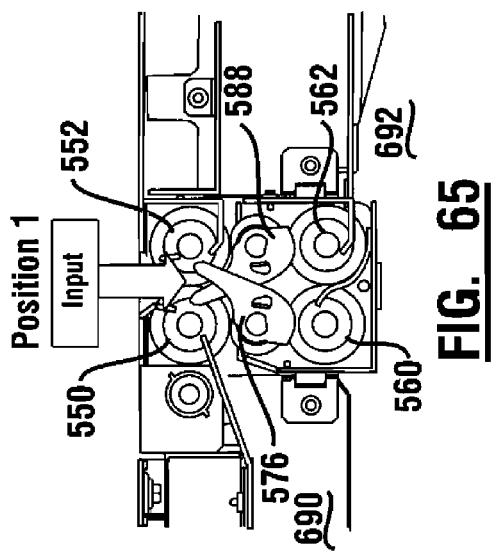

When the front gate arm 656 contacts the first portion 660 of the front cam surface 652 and the rear gate arm 658 contacts the first portion 664 of the rear cam surface 654, the cam 618 and guides are in the first position (FIG. 65). In the first position, the rear guides 588 are pivoted to and positioned in a forward position and the front guides 576 are pivoted to and positioned in a rearward position. In this position, the guides 576, 588 block the bill or other sheet from being transported from the input opening further downstream into the cassette 500 or retract bin 568. When the front gate arm 656 contacts the second portion 662 of the front cam surface 652 and the rear gate arm 658 contacts the first portion 664 of the rear cam surface 654, the cam 618 and guides are in the second position (FIG. 66). In the second position, the front guides 576 pivot to an upright position and the rear guides 588 are in the forward position. In this position, the front guides 576 block the bill or other sheet from entering front portion 690 of the cassette 500, but the rear guides 588 direct the bill between the upper rear rollers 552 and the rear idler rollers 586 and into the opening of the retract bin 568.

Figure 67:
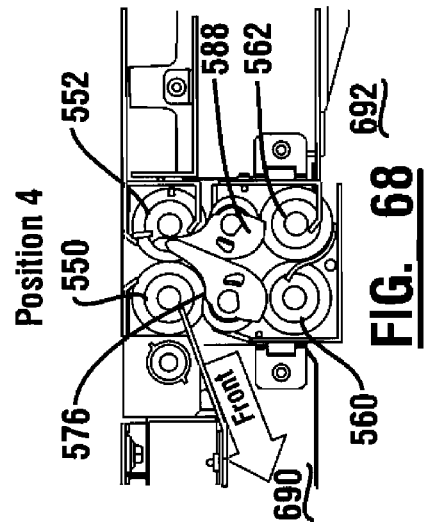
Figure 68:
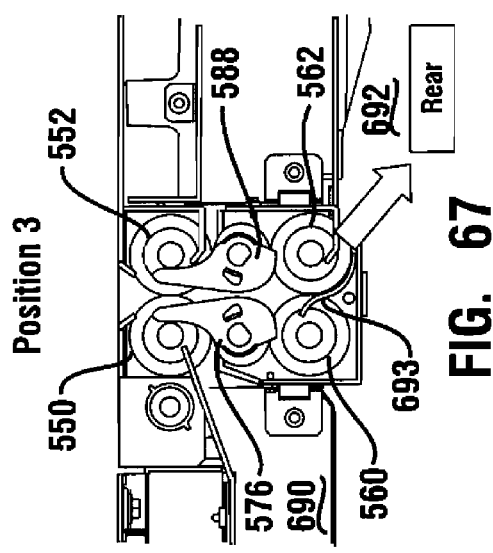

When the front gate arm 656 contacts the second portion 662 of the front cam surface 652 and the rear gate arm 658 contacts the second portion 666 of the rear cam surface 654, the cam 618 and guides are in the third position (FIG. 67). In the third position, the front and rear guides 576, 588 are in upright positions. In this position, the rear guides 588 block the bill from entering the opening of the retract bin 568 and the front guides 576 block the bill from entering the front portion 690 of the cassette. However, the front and rear guides 576, 588 direct the bill into the lower front and rear pinch rollers 560, 562. The lower front and rear pinch rollers 560, 562 direct the bill to engage a plate 693 with an s-shaped profile in cross section that slopes downwardly and rearwardly to direct the bill rearwardly and downwardly into rear portion 692 of the cassette 500. When the front gate arm 656 contacts the first portion 660 of the front cam surface 652 and the rear gate arm 658 contacts the second portion 666 of the rear cam surface 654, the cam 618 and guides are in the fourth position (FIG. 68). In the fourth position, the front guides 576 pivot to the rearward position and the rear guides 588 are in the upward position. In this position, the rear guides 588 block the bill from entering the retract compartment of the cassette 500, but the front guides 576 direct the bill between the upper front rollers 550 and the front idler rollers 574 and then forwardly and downwardly into the front portion 690 of the cassette 500. This exemplary configuration enables this exemplary drive arrangement 596 to use a single bidirectional motor 608 to both transport the bills and to control the gates thereby using less parts and reducing cost. However, this structure is exemplary and in other embodiments other structures may be used.

Referring to FIG. 69, in the example embodiment front and rear reflective sensors 694, 696 are positioned over front and rear windows or openings 698, 700 in the top portion of the cassette. Each of the openings is covered by a clear lens 702 (FIG. 58). The front and rear sensors 694, 696 are operatively connected to the controller 62 through appropriate circuitry and provide outputs thereto as represented in FIG. 62. The sensors 694, 696 are able to provide signals indicative of a distance to an item and thus indicate the height of the piles or stacks of bills or other sheets 502 in the portion of the cassette below the window. The optical sensors 694, 696 may be of any suitable type such as an infrared long range radiation sensor. Of course in other embodiments other types of sensors may be used such as other types of radiation sensors, sonic sensors or ultrasonic sensors, for example. The sensors 694, 696 allow for a non-contact approach to sensing the upper surface of the stored bills or other sheets and in some embodiments may eliminate the need for additional sensing mechanisms. As depicted in FIG. 69, the front sensor 694 emits an infrared light beam 704 that is reflected to the sensor. The reflected signal is indicative of the distance to a bill at the tope of a front bill stack 706 located in the front portion 690. The light beam 704 is reflected from the front bill stack 706 back to the front sensor 694. The example front sensor 694 and associated circuitry outputs a voltage based on the received light that corresponds to the distance from the front sensor 694 to the front bill stack 706. The closer the front bill pile stack 706 is to the front sensor 694, the higher the output voltage. At least one output corresponding to the values output from the front sensor 694 is received by the controller 62.

The rear sensor 696 emits an infrared light beam 708 which reaches the top of a rear bill pile stack 710 located in the rear portion 692. The light beam 708 is reflected from the top of rear bill stack 710 back to the rear sensor 696. The example rear sensor 696 and associated circuitry outputs a voltage based on the received light that corresponds to the distance from the rear sensor 696 to the top of the underlying rear bill stack 710. The closer the rear bill stack 710 is to the rear optical sensor 696, the higher the output voltage. At least one output corresponding to outputs from the rear sensor 696 is received by the controller 62. The controller 62 receives signals responsive to the sensors and operates in accordance with its programming to keep track of the heights of the front and rear bill stack areas 706, 710. In an exemplary embodiment, when the controller 62 determines that the rear bill stack area 710 has a height that is at least a set amount higher than the front bill stack area 706, the controller 62 operates to output control signals to the motor 608 to cause the cam 618 to be rotated to its fourth position in which the front and rear guides 576, 588 pivot to their positions shown in FIG. 68. In this position, the next bill 502 that is to be transported to the interior area of the cassette 500 will be directed toward the front bill stack area 706. In an example arrangement when the controller 62 determines that the front bill stack area 706 is higher than the rear bill stack area 710 by at least a programmed amount, the controller 62 outputs control signals to the motor 608 to cause the cam 618 to be rotated to its third position shown in FIG. 67. In this position, the next bill 502 that is to be transported to the interior area of the cassette will be directed toward the rear bill stack area 710. This method of distributing the bills to either side of the cassette minimizes bill jamming situations and optimizes capacity. The amount by which the height of the bill stack areas differ to change where bills are directed may be programmable so that curled or folded sheets do not cause unneeded redirection of bills entering the cassette. Further, in some embodiments the controller may be programmed so that the sensed stack height must be consistently an amount higher than the other area over multiple bill accepting transactions so that curled or folded sheets do not produce false indications of stack area height. Of course these approaches are exemplary.

As seen in FIG. 69, in the example arrangement the retract bin 568 is under the rear window opening 700. The bottom 712 of the retract bin 568 includes an opening 713 that is transparent to radiation output by the sensors and vertically aligned with the rear opening 700 on the top portion 504. The rear sensor 696 can then be used to monitor the status of sheets in the retract bin 568 as well as the height of the rear bill stack 710 below the retract bin 568. In particular, as part of the normal operation of the free fall cassette 500, currency bills are directed to the location in the interior area just under the retract bin 568 when the guides 576, 588 are in the third position. By design the height of the rear bill stack 710 in this location is guaranteed not to get higher than position 2 (P2), which is at the underside of the bottom 712 of the retract bin 568. Once a single bill enters the retract bin 568 the rear optical sensor 696 outputs the corresponding voltage which will correspond to the bill at position 3 (P3), which is on the bottom 712 of the retract bin 568. The controller 62 receives one or more signals that correspond to this condition. The controller then acts in accordance with its programming in response to this condition. In some embodiments the controller may operate to cause an indicator to be set so that a servicer on a future service call will be aware that currency is in this retract bin. Alternatively or in addition, the controller may operate to cause at least one message to be sent to a remote server from the machine to indicate that currency now occupies this bin. This reporting may be done to warn the machine operator that sheets now occupy this bin. In some systems, systems operators may want to send a servicer to remove bills from this pin promptly to avoid sheets placed in the bin during one user transaction from being co-mingled with bills from another user transaction. This bin might be used in some embodiments to hold suspect counterfeits. Alternatively, in some embodiments, the retract bin may be used to hold bills presented to a machine user that were not taken and were retracted. In other embodiments the retract bin may be used for holding other types of sheets that need to be segregated from other sheets in the container. Bills can fill this retract bin 568 up to the ceiling 714, which is indicated as position 4 (P4), where also by design they cannot get any closer to the rear optical sensor 696.

Figure 70:
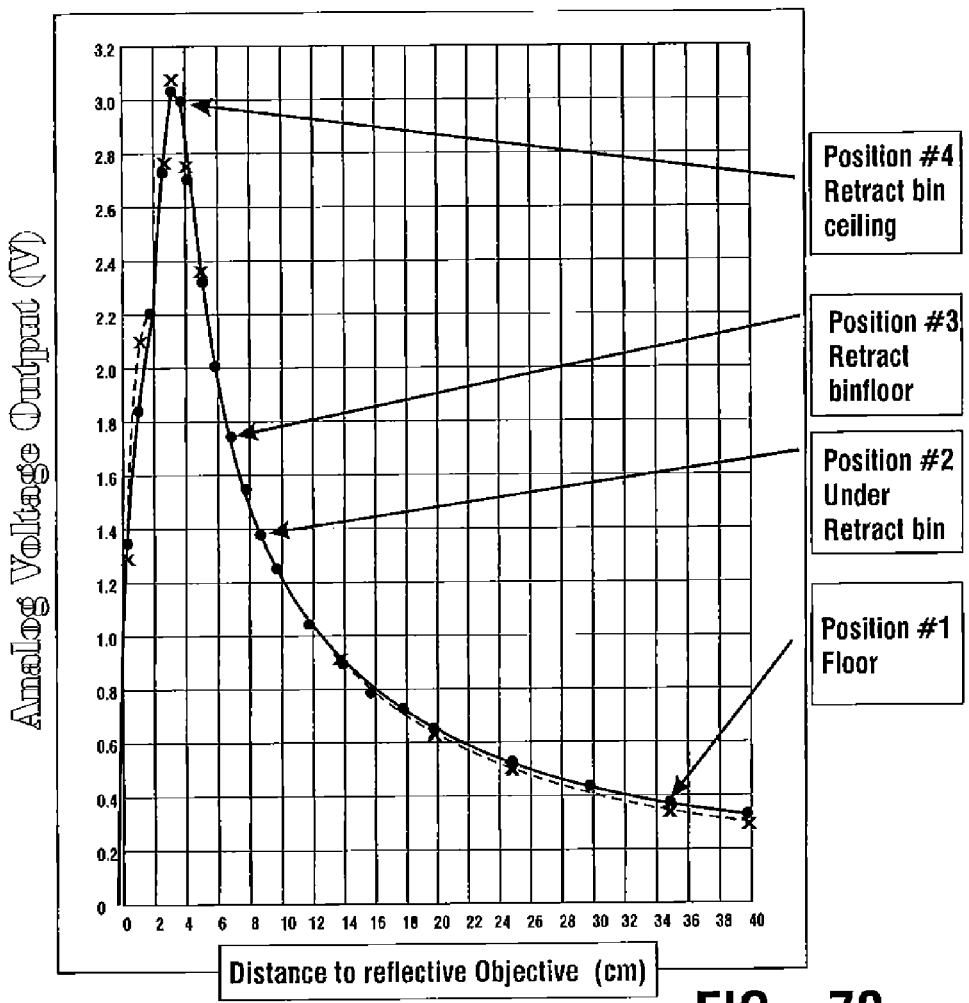
FIG. 70 is a voltage-distance graph of a rear optical sensor sensing various heights of a bill stack in FIG. 69.

The voltage-distance graph for an exemplary rear reflective sensor 696 and associated circuitry is indicated in FIG. 70. Using the sensor range sensing characteristics, three distinct states (retract bin is empty, bills are present in the retract bin, and retract bin is full) can be determined by the controller 62. When the rear sensor 696 outputs voltage that is equal to or below voltage corresponding to position 2, the controller is enabled to determine that the retract bin 568 is empty. The sensor in this range provides an indication of the height of the stack in the rear area of the cassette below the retract bin. When the sensor outputs voltage that is between position 3 and position 4, the controller 62 is enabled to determine bills 502 are present in the retract bin 568. When the rear optical sensor 696 outputs voltage that is equal to or above position 4, the controller 62 is enabled to determine that the retract bin 568 is full. This ceiling 714 of the retract bin 568 ensures that the right side of the voltage curve is being used rather than the inflection point where the voltage curve decreases as notes get even closer to the rear optical sensor 696. Of course, it should be understood that this sensing signal arrangement is exemplary and in other embodiments other arrangements may be used.

In an exemplary arrangement when the bills and other sheets 502 are being deposited into the interior area of cassette 500, each currency bill 502 moved or transported at high speeds by the pinch rollers and (unless being directed into the retract bin) is basically thrown into the interior area toward the front or rear areas. After the last pair of pinch rollers, each bill may be airborne and in some arrangements may fly in an unpredictable manner as it falls and settles on the bottom. The unpredictability may occur in some arrangements due to the countless variations of shapes that the bill may get folded by persons who handle it in the course of its life. The bills 502 may fill up the open space in an irregular manner shown in FIG. 71. When the pile or height of the bills reaches various levels, the heights may be sensed as full and reported so the cassette is changed by a servicer before it is substantially full. If the height of the sensed bills reaches an upper limit as indicated by the sensors, depositing of the bills into the cassette is halted by the controller and the cassette is declared full and a remote notification is given.

Figure 71:
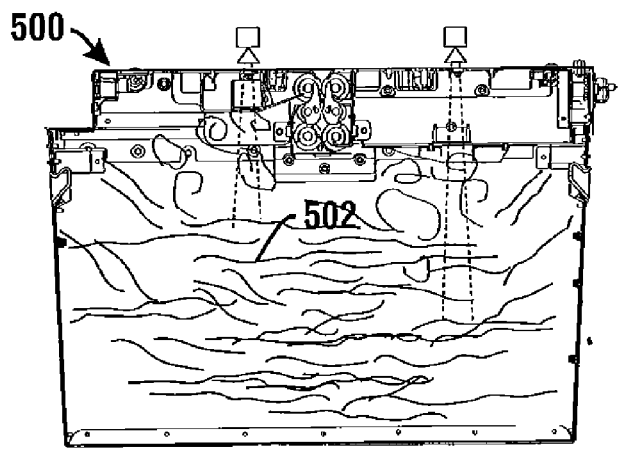
FIG. 71 is a right side section view of the free fall cassette of FIG. 56 that does not include the exemplary arrangement illustrated in FIGS. 72 and 73.

However, as represented in FIG. 71, in some bill accepting arrangements due the high speed and unpredictability of general circulation notes mentioned above, the bills may fill up the front and rear corners at the bottom of the cassette first such that the shape of the tops of the bill surfaces form a bowl shape. Then, subsequent bills may impact the steep sides of the bowl and start to curl up and form a pile at that location quickly reaching up to the ceiling. The optical sensors measuring the bill pile height may indicate that the cassette is full even though a large portion in the center of the cassette has few bills. In addition the curled bills take up excessive space relative to bills that are not curled. This may lead to more service calls to change the cassettes which in turn increases the time and cost of servicing the machine.

Figure 72:
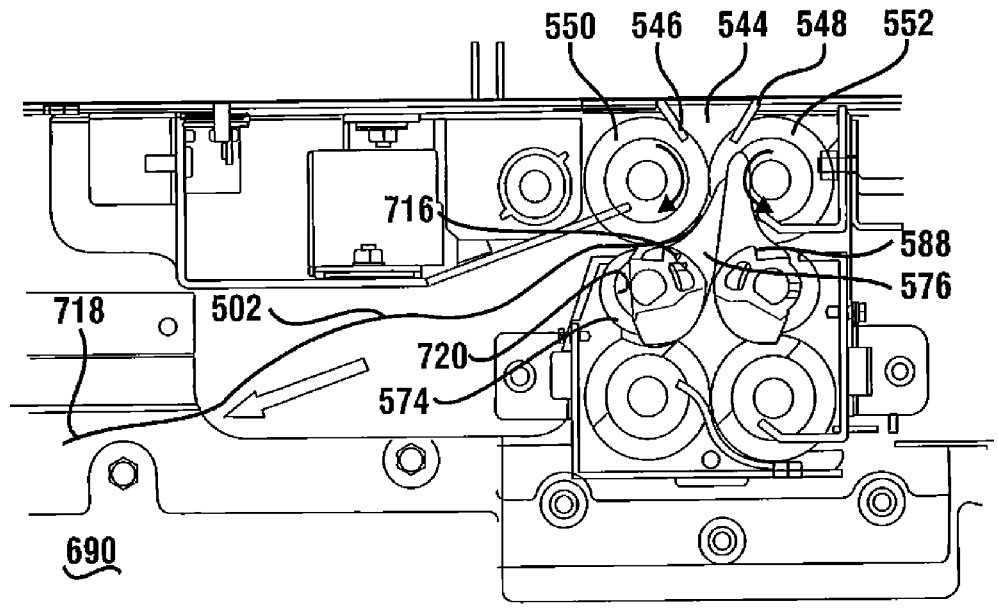
FIG. 72 is a right side sectional view of a portion of the free fall cassette of FIG. 56 illustrating the front portion of the cassette.

An exemplary arrangement will now be discussed that reduces this problem in embodiments where it arises and which may help maximize the storage capacity for holding bills or other sheets that tend to curl. For the bills 502 that are directed to the front portion 690 of the cassette 500 as shown in FIG. 72, the speed of the bill is reduced for a last portion of the bill as it is leaving engagement with the rollers 550, 574. For a U.S. bill, the last portion may be about the final 13 mm of the bill, but other lengths will work depending on the speed, sheet properties and sheet moving member geometry. In particular, the example arrangement includes a first sensor 716 such as a photo sensor or any suitable sensing device that is positioned at a location in which the first sensor 716 is able to sense when the desired length of the bill 502 remains in the pinch point between the front idler rollers 574 and upper front pinch rollers 550. Other arrangements may sense the length of the sheet that is beyond the pinch point. The exemplary first sensor 716 is operatively connected to the controller 62 as seen in FIG. 63. Other ways of detecting that the desired length of the bill 502 remains in the pinch point between the rollers 550, 574 rollers could be used as well. In operation, the bill travels out of the front idler rollers 574 and upper front pinch rollers 550 at a high speed which in an exemplary embodiment is about 1500 mm/sec. When the first sensor 716 detects that the desired remaining length of the bill 502 remains in the pinch point of the rollers 550, 574, change in signals from the first sensor 716 is detected through operation of the controller 62. The controller 62 operates in accordance with its programming and causes signals to be sent to the motor 608 which are operative to cause a decrease the speed of the motor 608. This causes the upper front and rear pinch rollers 550, 552 cause the bill 502 to be transported at a lower speed as it moves out of the front idler rollers 574 and upper front pinch rollers 550 and disengages therefrom. In an exemplary embodiment the speed is rapidly reduced to about 500 mm/sec. Hence, in this example the leading edge 718 of the bill gets pushed out at a high speed of 1500 mm/sec and then the last portion of the bill is moving out of engagement at a slower speed. As a result, the bill leaves the last pinch point and disengages slower but at the same shallow angle as it was when exiting the rollers 550, 574. This in turn causes less curling of bills and can create a flatter front bill stack 706 starting at the bottom wall 506 of the cassette 500.

Once the bill has disengaged the front idler rollers 574 and the upper front pinch rollers 550, the processor of the example arrangement operates in accordance with its programming to cause the main transport to be quickly ramped back up to the higher speed. This may be done by providing a second sensor 720 at a location that detects when the bill has disengaged the upper rollers. In particular, the second sensor 720 is in operative connection with the controller 62 and causes signals to be received by the controller 62 upon detecting that the bill 502 has disengaged the front idler rollers 574 and the upper front pinch rollers 550. The controller 62 in turn causes signals to the motor 608 that increase the speed of the motor 608 such that the front and rear pinch rollers 550, 552 cause the subsequent bill 502 to be transported at the higher speed out of the front idler rollers 574 and the upper front pinch rollers 550. This increase in speed prevents the subsequent bill that may be following a distance behind the first bill at about the higher speed of the transport from being jammed into the rollers and crumpled.

In an example embodiment this process may be repeated on all the bills 502 directed to the front portion 690 of the cassette 500 for the first amount of bills directed to the front storage area. In an exemplary embodiment, this may be done for about thirty percent of height available in the front portion 690 as sensed by the front sensor 694. At this volume in example arrangements, the front bill stack area 706 of the bills generally has a flat base of stacked bills so that subsequent bills 502 will stack more flatly on the pile. Thus, when the height of the bills as sensed by the front sensor 694 reaches a programmed set point the controller 62 operates in accordance with its programming to cause the motor 608 to rotate at a speed that causes the upper pinch rollers 550, 552 to transport the bill entirely through the device at the higher speed. Of course this approach is exemplary. Further in the example arrangement when the front optical sensor 694 senses that the front stack area reaches about 90% capacity with respect to the height of bills in the front portion 690 of the cassette 500, the controller 62 of an exemplary embodiment operates in accordance with its programming to cause the motor 608 to rotate at a speed that causes the upper pinch rollers 550, 552 to transport the bill at a somewhat lower speed than the maximum. In an exemplary embodiment this speed causes the bills to move at about 1140 mm/sec. This process keeps the top of the pile relatively flat in an exemplary embodiment and allows the deposit of the maximum number of bills to optimize the capacity of the front portion 690 of the cassette 500. Of course this approach is exemplary for the particular arrangement and bill type, and in other embodiments other approaches may be used.

In the exemplary embodiment, for the bills directed to the rear portion 692 of the interior area, a weighted ribbon assembly 722 (FIGS. 59 and 73-77) is provided to help distribute the bills more evenly. The exemplary weighted ribbon assembly is but one example arrangement of a structure or structures that serves to engage moving sheets that are being released from the transport and generally slow their speed without significant deformation so the sheets generally fall in a flat manner. The ribbon assembly also provides some random engagement with bills which helps to disburse the bills in the rear area below the ribbon.

Figure 73:
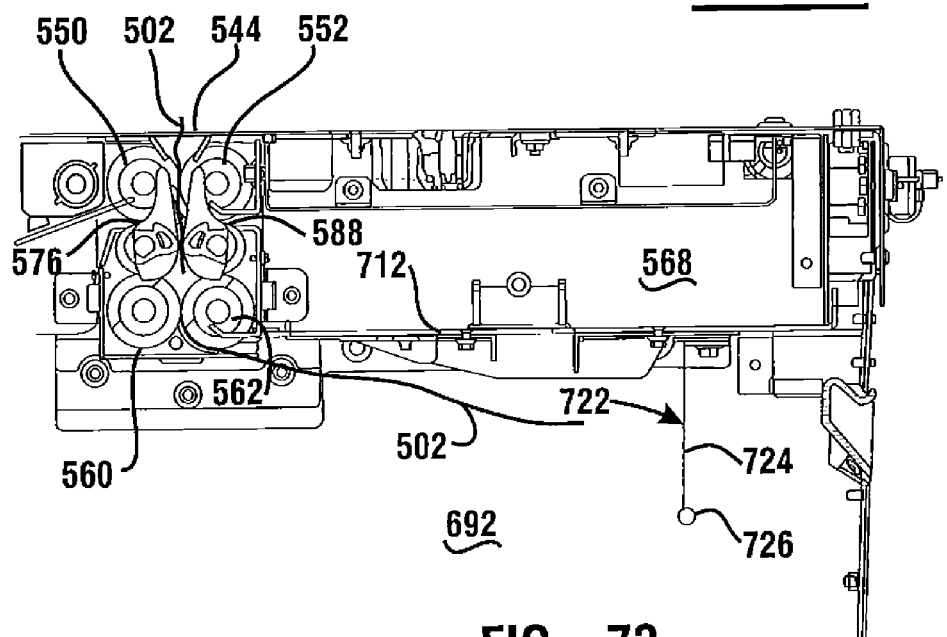
FIG. 73 is a right side sectional view of a portion of the free fall cassette of FIG. 56 illustrating the rear portion of the cassette.

In the exemplary arrangement, the weighted ribbon assembly comprises a half inch wide fabric ribbon 724 as best seen in FIG. 73. The ribbon 724 is operatively fastened at one end to the underside of the bottom 712 of the retract bin 568. The ribbon 724 extends downwardly into the interior of the rear portion 692. A small cylindrical weight 726 is secured to the distal or free hanging end of the ribbon 724. The weighted ribbon assembly 722 is located in the bill path downstream or generally downwardly and rearwardly from the lower pinch rollers 560, 562. In operation, the leading area of bills 502 moving to disengage off the lower pinch rollers 560, 562 strike the ribbon 724, which slows them down until they lie generally horizontally and drop generally vertically once the bills disengage from the rollers. The exemplary weighted ribbon assembly 722 is slightly off center relative to the bill center line. This offset position tends to put a slight spin on the bills 502 as they disengage from the ribbon 724 which may also help to distribute them more evenly. Also, the random swing of the weighted ribbon assembly 722 after a bill 502 impacts it helps distribute the bills 502 more evenly on the rear portion 692 of the cassette 500. The exemplary weighted ribbon assembly 722 is constructed and arranged on the cassette 500 so that about 70 percent of the bills actually impact the ribbon 724. Of course this arrangement is exemplary and other arrangements may be used.

Figure 74:
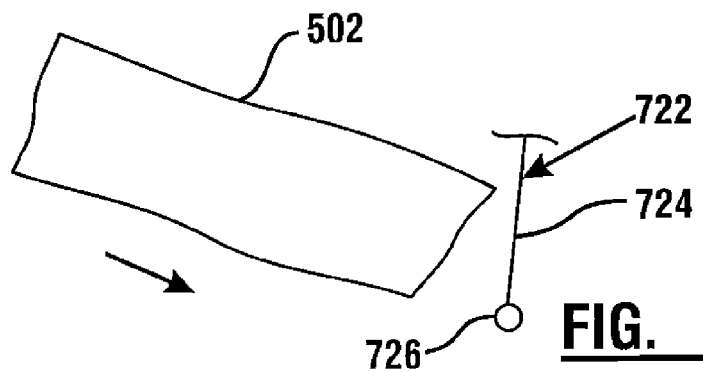
FIGS. 74-77 are schematic side views of a portion of FIG. 73 showing the various stages of a bill interacting with a weighted ribbon assembly.
Figure 75:
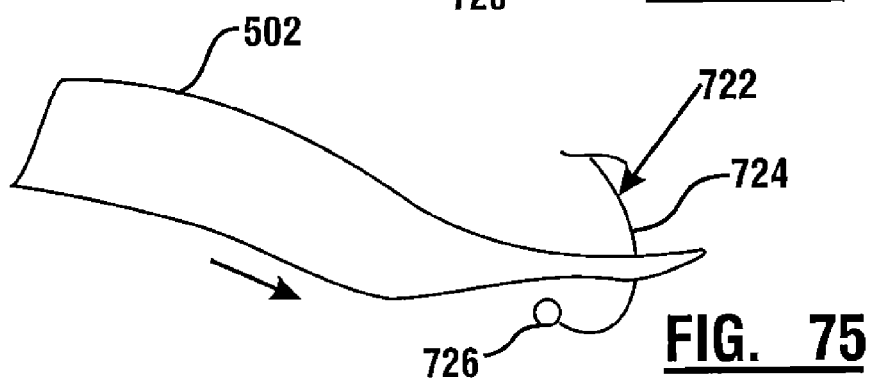
Figure 76:
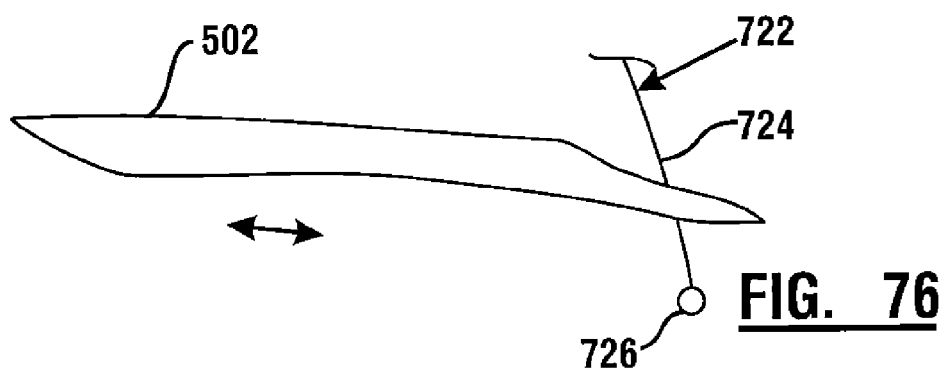
Figure 77:
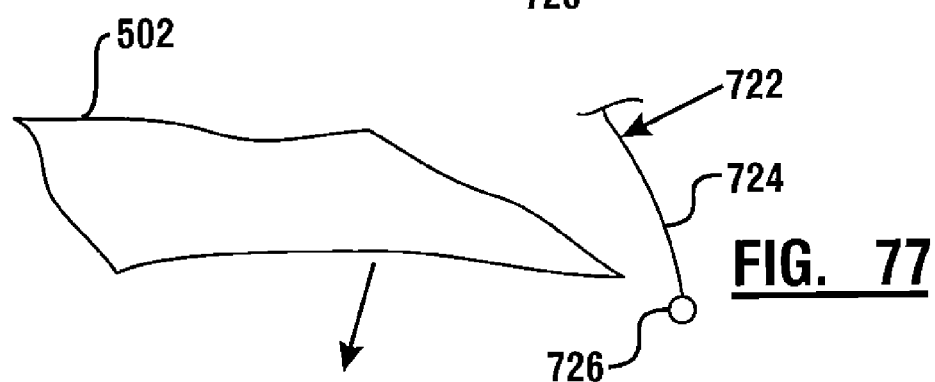

FIGS. 74-77 illustrate exemplary sequential stages in which a bill strikes the weight ribbon assembly 722. FIG. 74 shows the bill moving at a high speed horizontally just before striking the ribbon 724. FIG. 75 shows the bill impacting the ribbon 724 and slowing down at the free end of the bill moving horizontally. FIG. 76 shows the bill 502 when it stops moving horizontally at the free end after striking the ribbon 724. FIG. 77 shows the bill 502 lying horizontally and dropping vertically after disengaging from the rollers.

The exemplary weighted ribbon arrangement is usable in the exemplary cassette and provides an alternative approach to avoiding curling of bills that are inclined to deform in this manner due to impacts with bills and other surfaces bounding the cassette. For example, in this exemplary arrangement the bill speed as bills are output toward the rear of the cassette is generally maintained at about 1500 mm/sec. As a result, when bills are directed to the rear of the example cassette it is not necessary for the processor to control the motor speed so as to reduce the speed at the time of release from the rollers to a lower value so as to achieve the bills settling in a generally flat configuration within the interior area of the cassette. This approach may be particularly beneficial in arrangements where bills entering the transport mechanism of the cassette are moving at a generally uniform speed which corresponds to the higher speed of incoming sheet movement. As a result, the approach of using the weighted ribbon or a similar structure allows the bills to move at a continuous speed and avoids the possibility for jams and malfunctions due to changing speeds within the transport of the cassette. Further, in some arrangements it may be desirable to employ both approaches of changing speeds and also employing a member that engages the sheets in a releasable and movable fashion so as to achieve desired stacking. The approaches taken may depend on the nature of the particular sheets and the geometry of the particular cassette arrangement being employed. Further, it should be appreciated that the weighted ribbon is but one structure that can be used to achieve a desired effect of suitably slowing the bills without causing deformation thereto and releasing the bills in a manner that enables the bills to fall in a generally flat configuration. Other structures may include flexible webs of material, movable surface structures, jets of air pressure or other things that can slow and release the sheet in a desired manner.

In an exemplary embodiment, when the rear optical sensor 696 senses that the rear bill stack 710 reaches about 90% capacity with respect to the height of the rear portion 692 of the cassette 500, the controller 62 operates in accordance with its programming to cause the motor 608 to rotate at a somewhat slower speed that causes the lower pinch rollers 560, 562 to transport the bill at a lower speed. In the exemplary embodiment the speed of the rollers is reduced to about 1140 mm/sec. In the exemplary embodiment this process keeps the top of the pile relatively flat and thus allows the deposit of the maximum number of bills to optimize the capacity of the rear portion 692 of the cassette 500. Of course this approach is exemplary and may vary with sheet and transport geometry.

Figure 78:
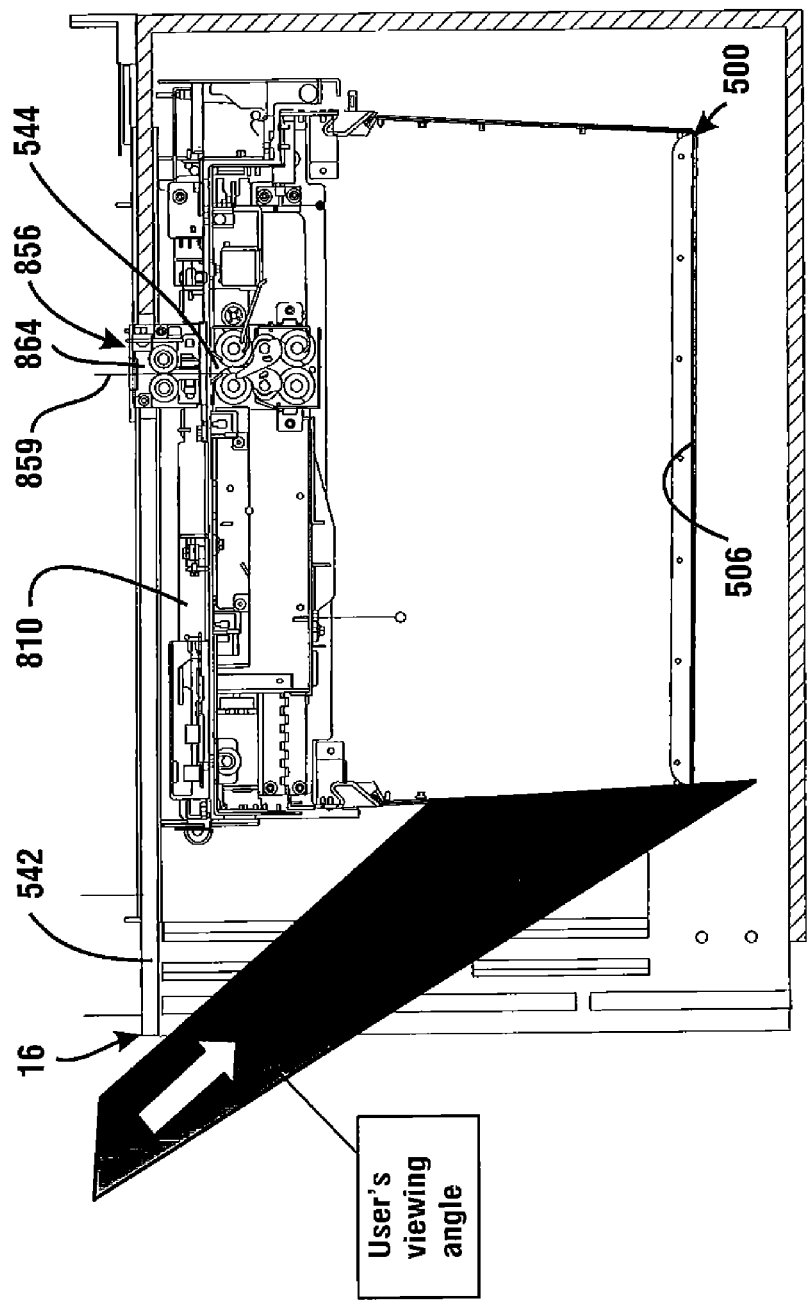
FIG. 78 is a left side sectional view of the embodiment of FIG. 56.

The exemplary free fall cassette 500 may be positioned within the interior area of the chest 16 of the rear load machine as shown in FIG. 78. Since the rear chest door 50 may be relatively large and thick, the free fall cassette may be positioned forwardly in the interior area of the chest so that there is sufficient clearance to allow the chest door 50 to close. When the chest door is open, the viewing angle of the cassette by the servicer or other user who is standing may be limited to only seeing the lower portions as illustrated in FIG. 78. This is because the top wall or ceiling 542 of the chest 16 of the exemplary arrangement may be low such as about 18 inches above the floor. This location may require that the servicer get on his or her knees when both inserting and removing the cassette 500. In addition, if a latching mechanism for the cassette were to employ a manually actuatable lever, the lever that releases a latching mechanism to release the cassette would be located at a position that would require the servicer to lower his or her head to peer inside the chest in order to locate and grab it, or kneel or otherwise move from a normal standing position to release the cassette from the operative position.

An exemplary arrangement will now be discussed that may be used to make the removal and installation of the cassette 500 or other similar devices easier in some exemplary arrangements. Referring to FIGS. 58 and 79, the cassette 500 includes left and right side rails 728, 730 that may be slidably inserted and engaged with left and right slide assemblies 732, 734 (FIGS. 80 and 81), which are in operatively supported connection with the chest 16. The left side rail 728 is operatively mounted to the exterior side of the left side wall 514 of the cassette 500 by any suitable fasteners 736 such as screws and nuts. Rollers or wheels 738, 740, 742, 744 are rotatably mounted to the left side rail 730 to facilitate axial movement of the left side rail 730 as it slides along the left slide assembly 732. The right side rail 730 is operatively mounted to an exterior side of the right side wall 512 by any suitable fasteners 746 such as screws and nuts. Rollers or wheels 748, 750, 752, 754 are rotatably mounted to the right side rail 730 to facilitate axial movement of the right side rail as it slides along the right slide assembly 734.

Figure 57:
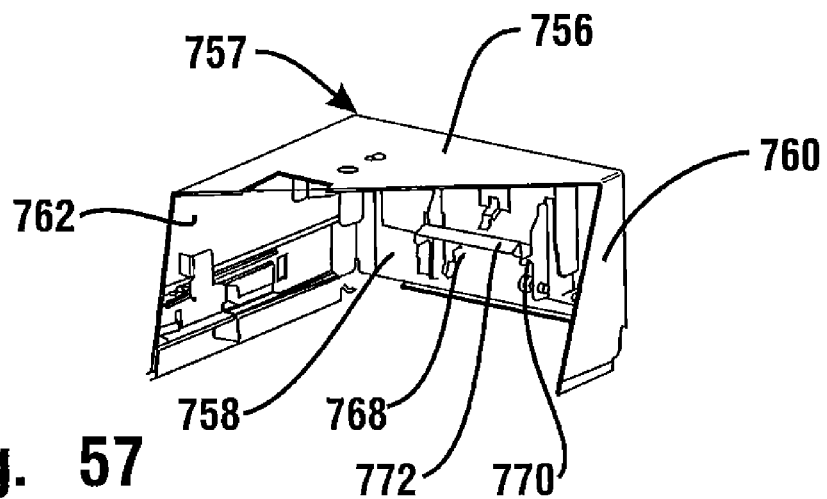
FIG. 57 is a rear and left side isometric view showing a portion of a frame and related elements of the embodiment of FIG. 56.

The exemplary left and right slide assemblies 732, 734 are in operatively mounted in connection with the chest housing via a frame 757. In particular, the exemplary frame 757 includes a top wall 756 (FIG. 57) and front, left and right walls 758, 760, 762 that extend downwardly from the top wall 756. The frame 757 is open at the bottom and rear. The frame 757 may be operatively mounted to the top wall or ceiling 542 of the chest 16. The exemplary frame 757 may be formed in one piece and made of metal or other suitable material. Optionally, the frame 757 may also be operatively mounted in engagement of the left side wall 764 of the chest 16 as shown. A generally inverted U-shaped support bracket 766 is operatively mounted to the rear end of the frame 757. As seen in FIG. 57, the frame 757 includes a hook member 768 that is operatively mounted to the inner side of the front wall 758. The hook member 768 includes an elongated channel 770 and a flange portion 772 that extends downwardly and rearwardly from the top of the channel 770. Of course it should be understood that these structures are exemplary.

Figure 82:
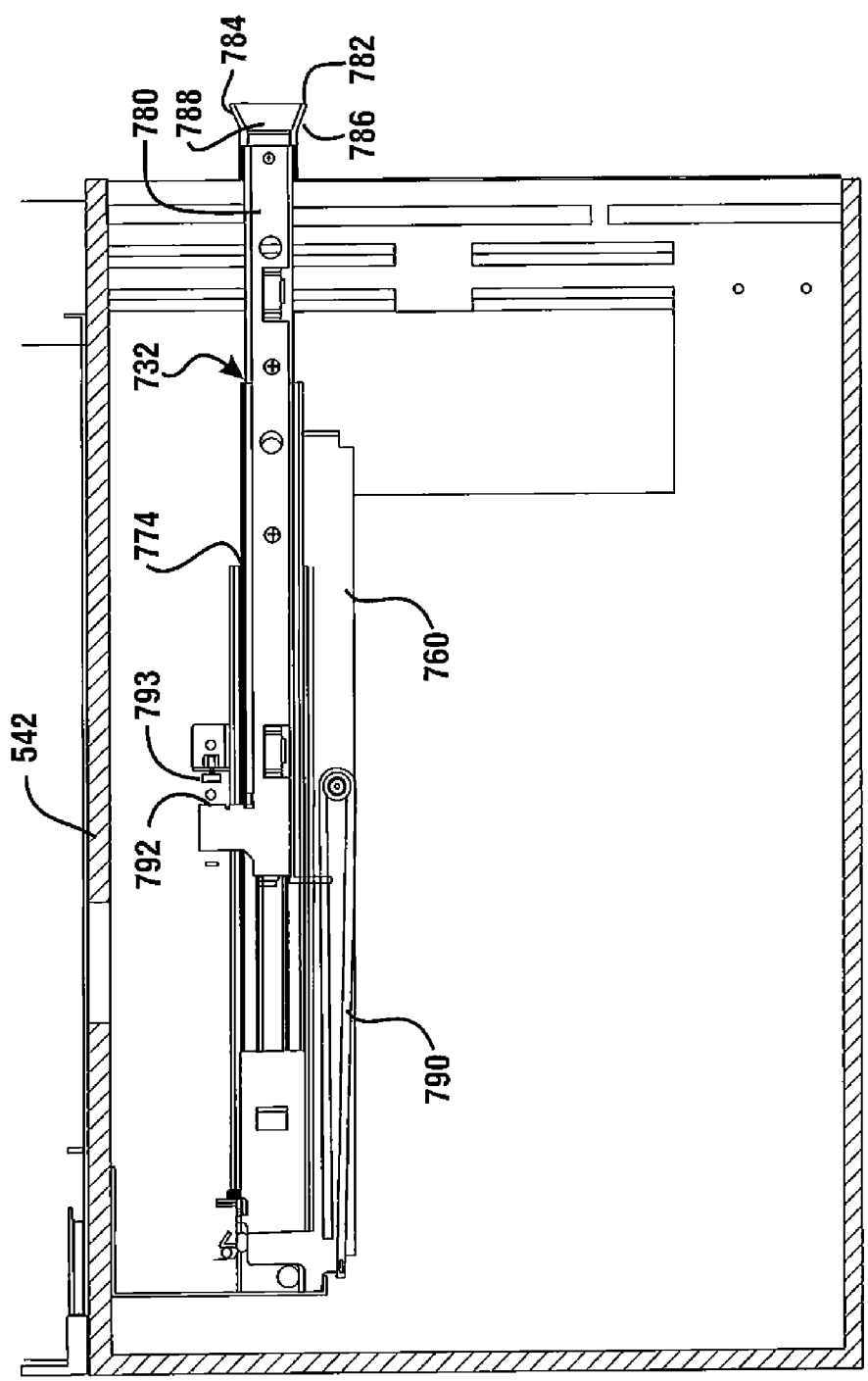
FIG. 82 is a right side sectional view of a portion of the embodiment of FIG. 56 showing the left slide assembly.

Referring to FIG. 82, the exemplary left slide assembly 732 is operatively mounted to the inner side of the left wall 760 of the frame 757. Specifically, the left slide assembly 732 includes an outer slide member 774 that is fixed to the frame 757 by suitable fasteners. For example, the fasteners may be front and rear tabs 776, 778 (FIG. 80) integrally formed in the left slide assembly that extend into slots formed in the frame 757. Such a fastening arrangement is further described in U.S. provisional application No. 61/465,240, the disclosure of which is incorporated herein by reference in its entirety. Alternatively other mounting arrangements may be used. The exemplary left slide assembly 732 includes an inner slide member 780 that is slidably received by the outer slide member 774. A funnel shaped rail guide 782 is operatively attached to the rear end of the inner slide member 780. The rail guide 782 is generally made of a low friction material such as plastic and includes top, bottom, and outer walls 784, 786, 788 that extend rearwardly and radially outwardly from the rear end of the inner slide member 780 to help guide the left side rail 728 of the cassette 500 into the inner slide member 780.

In an exemplary embodiment, a tension spring 790 is operatively attached to the inner slide member 780 and the left wall 760 of the frame 757 to bias or urge the inner slide member 780 rearwardly. A magnetic stop 792 is attached to the front end of the inner slide member 780. The magnetic stop 792 is also configured to apply a holding force to the slide members 774, 780 that resists or minimizes the bouncing of the slide members 774, 780 while the cassette 500 is being moved forwardly into the interior area of the chest 16. This holding force is at a level to resist the bumping and bouncing of the cassette 500 but can also be easily overcome when the service person pushes forwardly on the cassette as it slides along the left slide assembly 732 to dock the cassette within the interior area of the chest.

Figure 83:
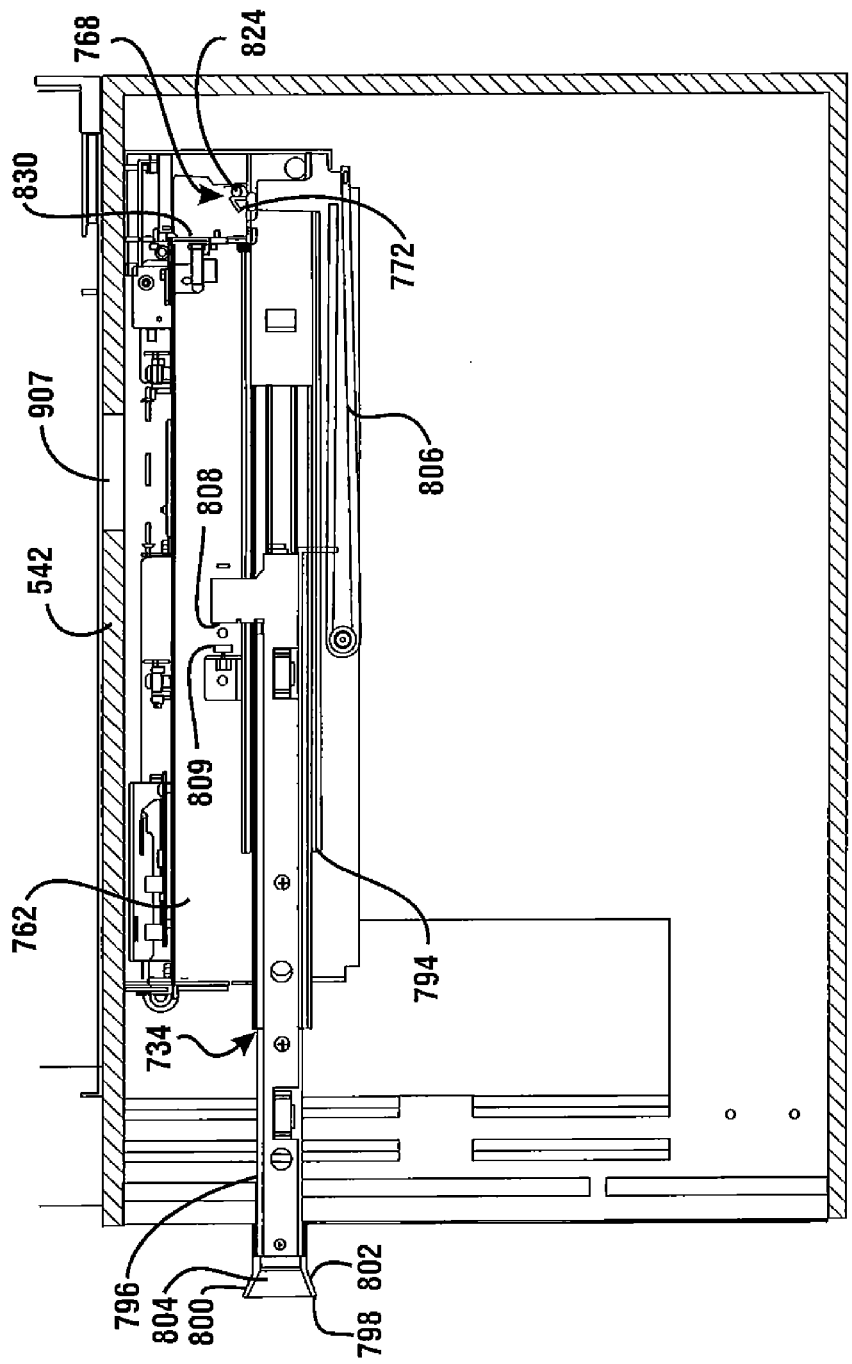
FIG. 83 is a left side sectional view of a portion of the embodiment of FIG. 56 showing the right slide assembly.

Referring to FIG. 83, the exemplary right slide assembly 734 is operatively mounted to the inner side of the right wall 762 of the frame 757. Specifically, the right slide assembly 734 includes an outer slide member 794 that is fixed to the frame 757 by suitable fasteners such as the tab and slot arrangement mentioned above or other arrangement. The right slide assembly 734 includes an inner slide member 796 that is slidably received by the outer slide member 794. A funnel shaped rail guide 798 is operative attached to the rear end of the inner slide member 796. The rail guide 798 is generally made of a low friction material such as plastic and includes top, bottom and outer walls 800, 802, 804 that extend rearwardly and radially outwardly to help guide the right side rail 730 of the cassette 500 into the inner slide member 796. A tension spring 806 is operatively attached to the inner slide member 796 and the right wall 762 of the frame 757 to bias or urge the inner slide member 796 rearwardly. A magnetic stop 808 is attached to the front end of the inner slide member 796. The magnetic stop 808 is also configured to apply a holding force to the slide members 794, 796 that resists or minimizes the bouncing of the slide members 794, 796 while the cassette 500 is being moved forwardly in the interior area of the chest 16. This holding force is at a level to resist the bumping and bouncing of the cassette 500 but can also be easily overcome when the servicer pushes forwardly on the cassette as it slides along the right slide assembly 734 to dock the cassette 500. When the cassette 500 is not inserted and docked into the chest 16, the force of the exemplary tension springs 790, 806 urges the inner slide members 780, 796 to extend rearwardly beyond the rear opening of the chest 16. In an exemplary arrangement, the slide members extend approximately 50 mm beyond the rear of the chest. This exemplary positioning as well as the rail guides 782, 798 allows a servicer to more readily slidably insert the cassette into the inner slide members 780, 796 without getting on his or her knees. This also causes a cassette that is disengaged from the latch to be biased by the springs rearward so it is visible to a servicer.

Figure 80:
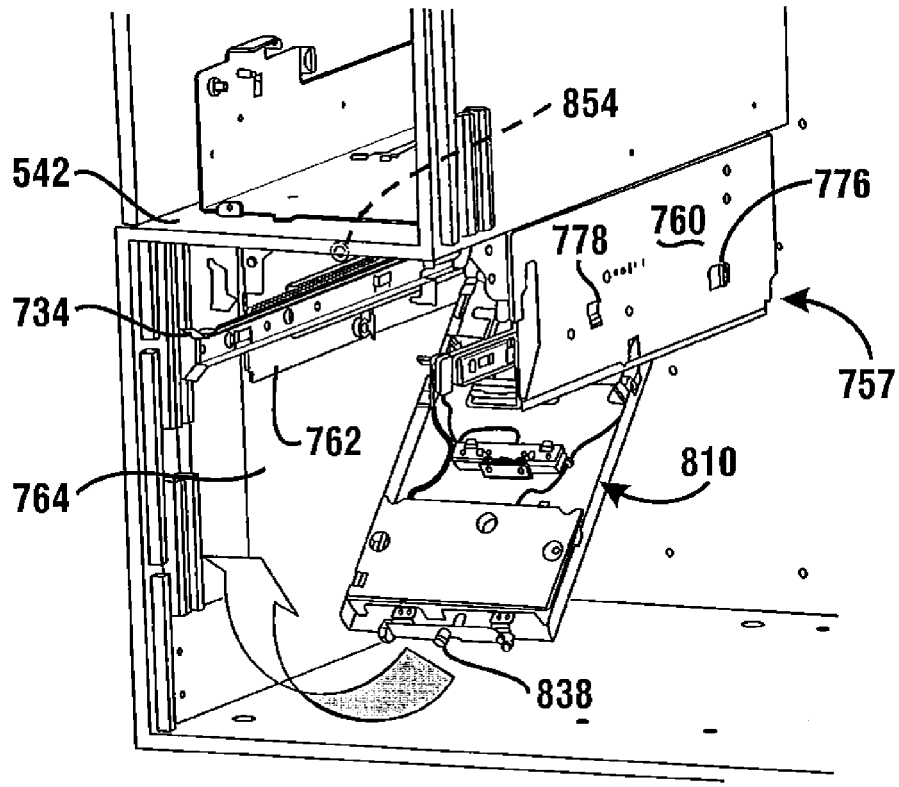
FIGS. 80 and 81 are rear and left side isometric views of a portion of the embodiment of FIG. 56 showing the mounting of the sensor plate assembly to the frame.
Figure 81:
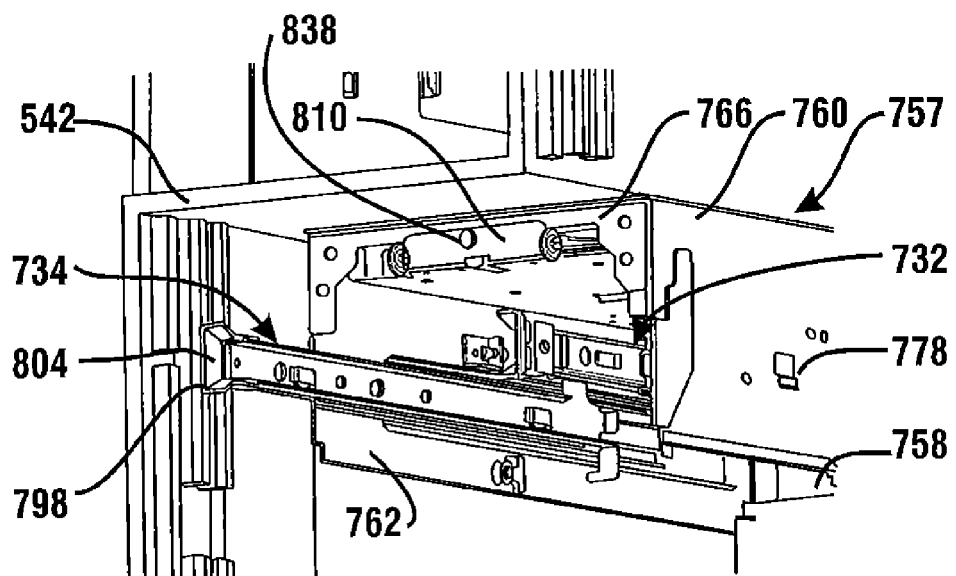

In an exemplary arrangement, a sensor plate assembly 810 may be removably mounted to the frame 757 just below the top wall 756 as seen in FIGS. 80 and 81. Referring to FIG. 84, the sensor plate assembly 810 includes a generally horizontal platen 812 that is rectangular in shape. The sensor plate assembly 810 also includes a front portion 814 that in the operative position extends downwardly from the front end of the platen 812. The front portion 814 includes a right motor compartment 816 that houses the stepper motor 608. The pinion gear 604 in operative connection with the stepper motor 608 extends rearwardly through rear side 813 of the front portion 814. A pair of docking pins 818 extend rearwardly from the rear side 813 of the front portion 814 and are operative to engage the docking pin slots 530 operatively connected to the cassette 500. A push-to-release latch 820 extends from the rear side 813 of the front portion 814 and is located between the docking pins 818. In the exemplary arrangement when the cassette is docked in the chest 16, the push-to-release latch 820 releasably engages a female coupling 912 (FIG. 86) operatively secured to the chest 16. The push-to-release latch 820 may be a spring and catch arrangement that is suitable to releasibly latch and release the cassette 500 by pushing the latch forwardly. A bumper 822 may be operatively fixed to the rear side 813 of the front portion 814 to absorb the force applied by the cassette 500 moving forward when it is docked.

Referring to FIG. 79 in the exemplary arrangement, a hanging shaft 824 is operatively mounted to left and right support plates 826, 828 via screws or other suitable fasteners. The support plates 826, 828 are fixed to front side 830 of the front portion 814 of the sensor plate assembly 810 and extend forwardly therefrom. The hanging shaft 824 extends axially in a direction that is generally transverse to the longitudinal axis of the sensor plate assembly 810 and is spaced forwardly from the front portion 814. A pair of left and right rollers 832, 834 are rotatably mounted at the rear end of the sensor plate assembly 810. Referring to FIG. 84, a rear support plate 836 is fixed to the rear end of the platen 812 and extends upwardly therefrom and also between the rollers 832, 834. The rear support plate 836 may be formed in one piece with platen or be formed as a separated piece. A spring loaded plunger 838 is operatively mounted to support plate 836. The spring loaded plunger 838 includes a head 840 that extends rearwardly from the rear side of the support plate 836, and a shaft 842 (FIG. 79) that extends forwardly from the head 840 and through the support plate 836. Applying a rearward force on the head 840 retracts or moves the shaft rearwardly. The shaft is releasibly engageable with an aperture in a mounting structure that when engaged will hold the sensor plate in the operative position as later described.

A docking slot 844 is formed in the exemplary platen 812 and lower portion of the support plate 836. The slot 844 extends downwardly from the lower portion of the support plate 836 and forwardly from the rear end of the platen 812. The docking slot 844 is sized to accept and capture a shoulder screw 846 (FIG. 85) which serves as a projecting member protruding from the top portion 504 of the cassette 500, when the cassette 500 is docked. The docking slot 844 provides sufficient clearance at the lower portion of the support plate 836 to allow the shoulder screw 846 to pass through as the cassette moves in the forward or rearward direction. As seen in FIG. 79, the exemplary sensor plate assembly 810 includes front and rear sensor modules 848, 850 mounted to the upper side of the platen 812 and electrically coupled to a wiring harness. As seen in FIG. 84, the front sensor module 848 includes the front reflective sensor 694 which is exposed by a front opening formed in the platen 812. The rear module 850 includes the rear reflective sensor 696 which is exposed by a rear opening formed in the platen 812. A bill opening 852 is formed in the platen 812 and located between the front and rear optical sensors 694, 696.

The exemplary sensor plate assembly 810 is mounted to the frame 757 with the chest door in the open position as follows. First, the hanging shaft 824 is inserted into the channel 770 of the hook member 768 by the servicer so as to be engaged therewith. Then, the sensor plate assembly 810 is swung upwardly (as depicted in FIG. 80) until the shaft 842 of the plunger 838 is downwardly adjacent the support bracket 766. Then, the head 840 of the plunger 838 is pulled rearwardly by the servicer until the shaft 842 moves away from the support bracket. The shaft 824 is then aligned with a retaining aperture formed in the support bracket 766. The servicer then releases the head 840 of plunger 838 such that the shaft 842 moves through the aperture 854 by the force of the spring in the plunger 838. As seen in FIG. 83, the hanging shaft 824 is spaced from the front side 830 of the front portion 814 with clearance that is sufficient to allow the flange 772 to extend through so that the shaft 824 may be seated in the channel 770.

As seen in FIG. 78 an exemplary chest transport mechanism 856 is mounted to the top wall 542 of the chest 16 and aligned above the opening 852 of the platen 812 and input opening 544 of the cassette 500 to move the bills (or other sheets) from the sheet accepting device or other bill transport mechanism into the chest 16. Often, because of the need to move the location of the bill accepting device for servicing, the position of such device relative to the top wall 542 of the chest 16 varies along the longitudinal direction. This may be due to variances in the locking position of slides or trays that support the bill accepting device and that allow it to be moved for servicing activities. For example, in some embodiments the location may vary in the range of about +/−8 mm with respect to the chest transport mechanism 856. That is, the location may vary such that the bill path of the bill accepting device is unaligned by about 8 mm in the forward direction from the chest transport mechanism 856 to about 8 mm in the rearward direction from the chest transport mechanism 856. In the absence of a structure to accommodate such variance, this might require an adjustment to be made or other steps taken to make this difference as small as possible. Such an adjustment might require significant time and cost to do.

Figure 87:
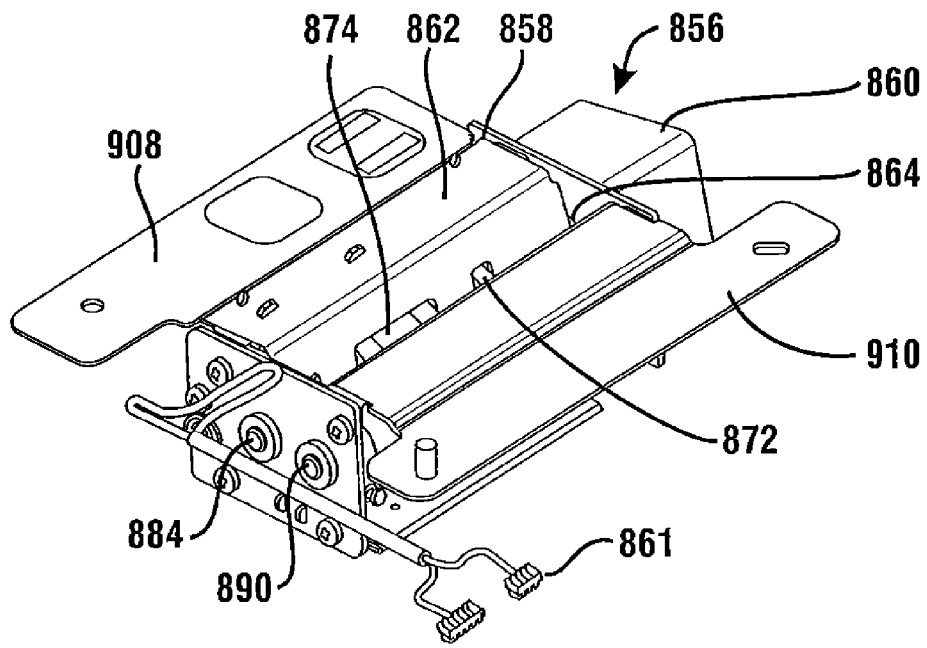
FIG. 87 is a top and right side isometric view of the chest transport mechanism of the embodiment of FIG. 56.
Figure 89:
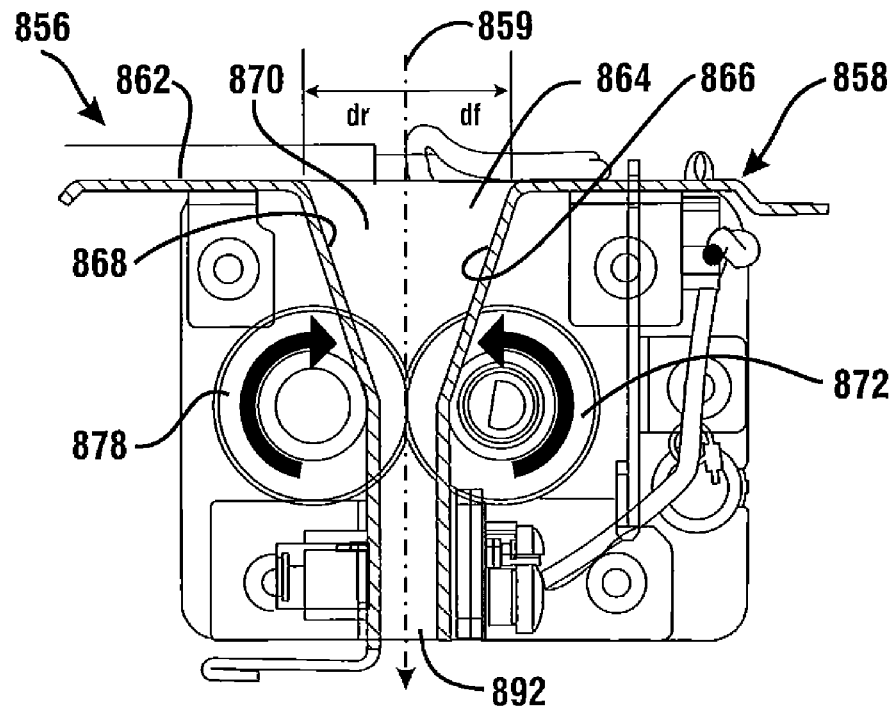
FIG. 89 is a left side sectional view of the chest transport mechanism of the embodiment of FIG. 56.

This exemplary chest transport mechanism 856 is configured to generally eliminate the need for such adjustment or other structures. Referring to FIG. 87, the exemplary chest transport mechanism 856 includes a metal frame 858. The frame includes a top portion and right and left mounting plates. A stepper motor 860 with motor and sensor cable 861 attached thereto is operatively mounted to the left side of the frame 858. The top portion 862 includes an input opening 864 that receives the bills from the bill accepting device or other sheet accepting device. The input opening 864 of this example embodiment extends beyond the periphery of the bill path of the bill accepting device to accommodate the range of locations of the bill accepting device with respect to the chest transport mechanism 856. In particular, as seen in FIG. 89, a front ramp portion 866 extends downwardly and rearwardly from the front upper edge of the input opening 864 and a rear ramp portion 868 extends downwardly and forwardly from the rear upper edge of the opening to define in cross section a generally funnel or v-shaped passage 870.

Left, center, and right pairs of front pinch rollers 872, 874, 876 and rear pinch rollers 878, 880, 882 are provided downstream of the input opening 864 for engaging the bills 502 to transport them to the cassette 500. The rollers 872, 874, 876, 878, 880, 882 extend through cut outs formed in the ramp portions 866, 868. The exemplary input opening 864 spans a distance of about 20 mm in the longitudinal direction. Specifically, the input opening 864 spans a distance $d_f$ of 10 mm in the forward direction from the center line 859 located between the front pinch rollers 872, 874, 876 and rear pinch rollers 878, 880, 882, and a distance $d_r$ of 10 mm in the rearward direction from the center line 859. This configuration allows the bills 502 to be still guided to the front and rear pinch rollers 872, 874, 876, 878, 880, 882 even when the alignment of the output of the bill accepting device or other sheet delivery device is off with respect to the input opening 864.

Figure 88:
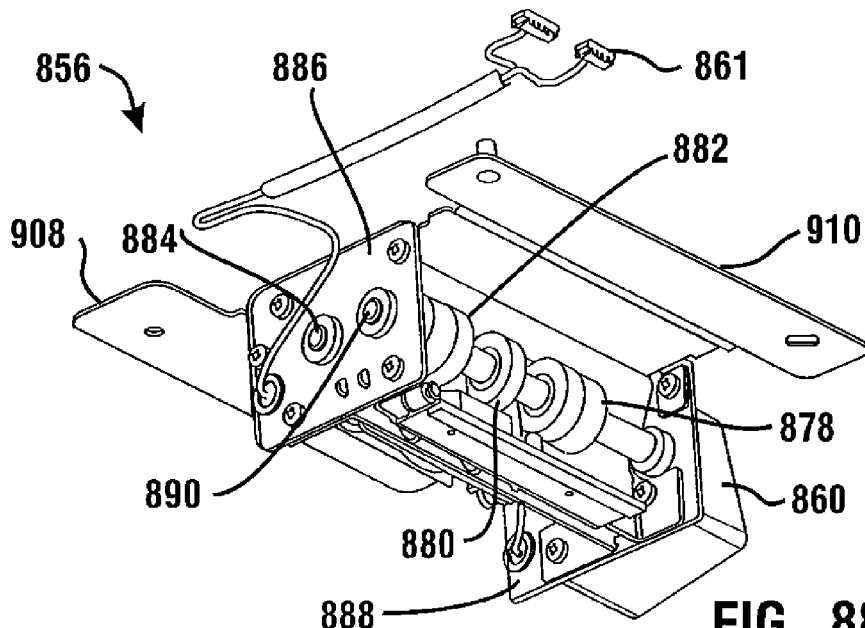
FIG. 88 is a bottom and right side isometric view of the chest transport mechanism of the embodiment of FIG. 56.
Figure 90:
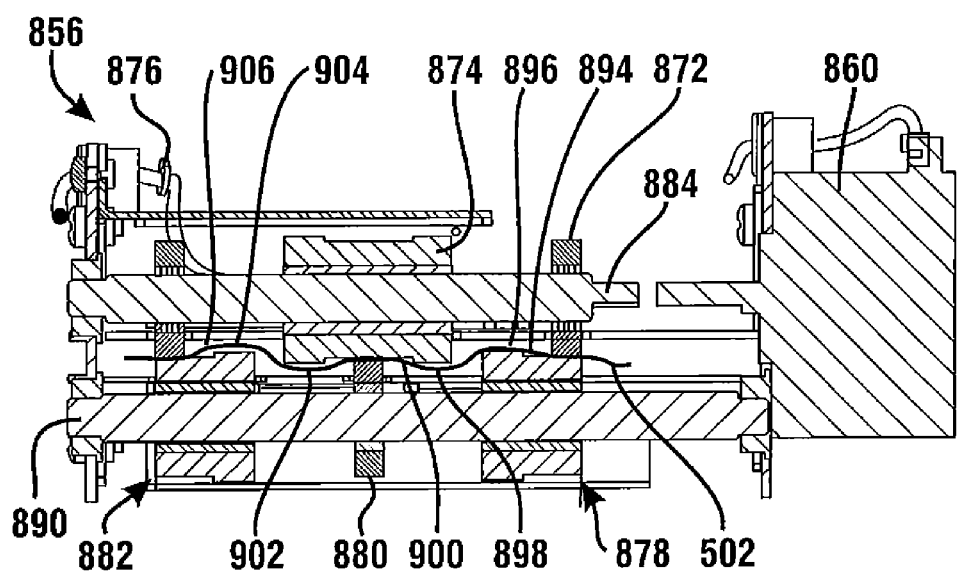
FIG. 90 is a top sectional view of the chest transport mechanism of the embodiment of FIG. 56 taken through the center of the rollers.

As seen in FIG. 90, a waffle configuration is imparted to intermediate sheets by the front and rear pinch rollers 872, 874, 876, 878, 880, 882 to assist the bills 502 moving through the chest transport mechanism 856. In particular, the waffle configuration induces a wavy configuration into a bill 502 such that the beam strength of the bill is increased in the direction that it is moving. This waffle configuration is accomplished as follows. Referring to FIG. 90, each pair of front and rear rollers of the chest transport mechanism 856 is spaced from each other in the transverse direction with respect to the longitudinal axis 536 of the cassette 500. A front axle 884 extends through each of the front pinch rollers 872, 874, 876 and is rotatably supported by the right and left mounting plates 886, 888 (FIG. 88). The front pinch rollers 872, 874, 876 are in operatively fixed engaged relation with the front axle 884 and rotate with the front axle 884. A rear axle 890 extends through each of the rear pinch rollers 878, 880, 882 and is also rotatably supported by the right and left mounting plates 886, 888. The rear pinch rollers 878, 880, 882 are in operatively fixed engaged relation with the rear axle 890 and rotate with the rear axle 890. The axles 884, 890 are rotated by the stepper motor 860. Other types of motor or suitable drives may alternatively be used to rotate the rollers. As viewed in FIG. 89, the rear pinch rollers 878, 880, 882 are rotated in the clockwise direction (arrow F) and the front rollers 872, 874, 876 are rotated in the counterclockwise direction (arrow G) to move or transport the bill 502 engaged between them downwardly through output passage 892.

Referring to FIG. 90, the rear roller 878 of the left pair of rollers (as viewed in cross section) is defined by left and right cylindrical portions 894, 896. The right portion 896 has an axial thickness that is less than that of the left portion 894. The right portion 896 also extends radially outward relative to the rotating axis of the roller 878 at a distance that is greater than that of the left portion 894. The front roller 872 faces the left portion 894 and has an axial thickness that is less than that of the left portion 894. The front roller 872 is also aligned with the left portion 894 such that the left axial ends of the rollers 872, 878 are flush with each other. The front roller 874 of the center pair of rollers is defined by left, center, and right cylindrical portions 898, 900, 902. The left and right portions 898, 902 has the same axial thickness and extend radially outward relative to the rotating axis of the roller 874 at the same distance. The center portion 900 has an axial thickness that is greater than that of the left and right portions but extends radially outward relative to the rotating axis of the roller 874 at a distance that is less than that of the left and right portions 898, 902. The rear roller 880 of the center pair of rollers faces the center portion 900 and is axially located in the center of the center portion 900. The right portion 896 of the rear roller 878 of the left pair of rollers extends forwardly such that it overlies the left portion 898 of the front roller 874 of the center pair of rollers.

The rear roller 882 of the right pair of rollers is defined by left and right cylindrical portions 904, 906. The left portion 904 has an axial thickness that is less than that of the right portion 906. The left portion 904 also extends radially outward relative to the rotating axis of the roller 882 at a distance that is greater than that of the right portion 906. The left portion 904 also extends forwardly such that it overlies the right portion 902 of the front roller 874 of the center pair of rollers. The front roller 876 of the right pair of rollers faces the right portion 906 and has an axial thickness that is less than that of the right portion 906. The front roller 876 is also aligned with the right portion 906 such that the right axial ends of the rollers 876, 882 are flushed with each other.

As seen in FIG. 90, when a bill or other sheet is engaged between the front and rear rollers of each pair, the bill 502 extends forwardly going from the left portion 894 to the right portion 896 of the rear roller 878 of the left pair of rollers due to the different diameters of the portions. The bill then extends rearwardly going from the right portion 896 of the rear roller 878 to the left portion 898 of the front roller 874 of the center pair of rollers since these portions overlie each other. The bill 502 then extends forwardly going from the left portion 898 to the central portion 900 of the front roller 874 and then rearwardly going from the central portion 900 to the right portion 902 of the front roller 874 due to the different diameters of these portions. The bill 502 then extends forwardly going from the right portion 902 of the front roller 874 to the left portion 904 of rear roller 882 of the right pair of rollers since these portions overlie each other. The bill extends rearwardly going from the left portion 904 to the right portion 906 of the rear roller 882 of right pair of rollers due to the different diameters of the portions. Thus, waves or convolutions are formed in bill 502 to increase its beam and bending strength. When installed in the automated banking machine, the chest transport mechanism 856 extends into an opening 907 (FIG. 83) in the top wall 542 of the chest 16 as seen in FIG. 78. The top portion of the chest transport includes front and rear flanges 908, 910 (FIG. 87) that are operatively mounted to the top surface of the top wall 542 to secure the chest transport mechanism 856 to the top wall 542 of the chest 16.

Figure 91:
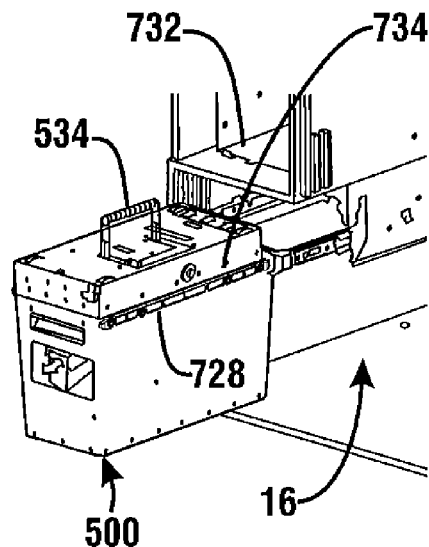
FIGS. 91-94 are rear and left side isometric views similar to that of FIG. 56 but showing the stages of the docking of the exemplary free fall cassette inside the chest.
Figure 92:
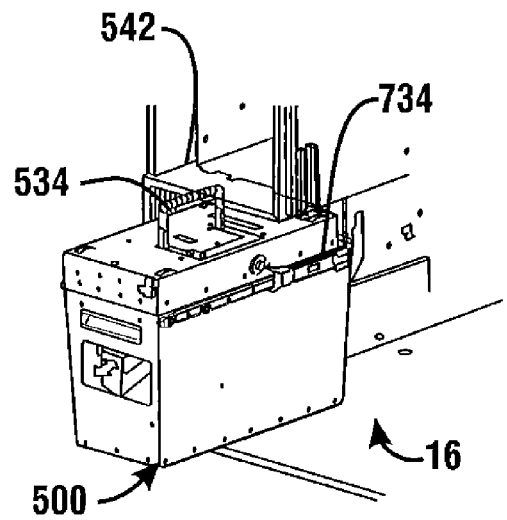
Figure 93:
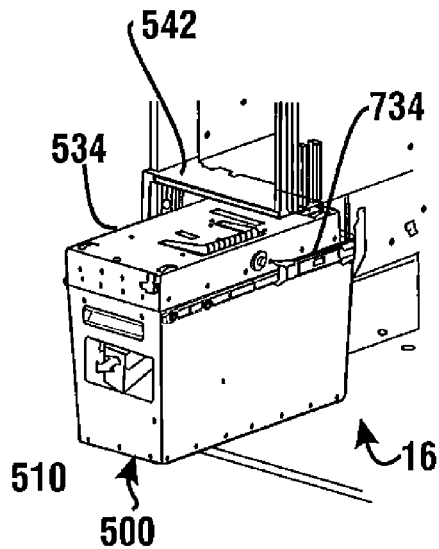
Figure 94:
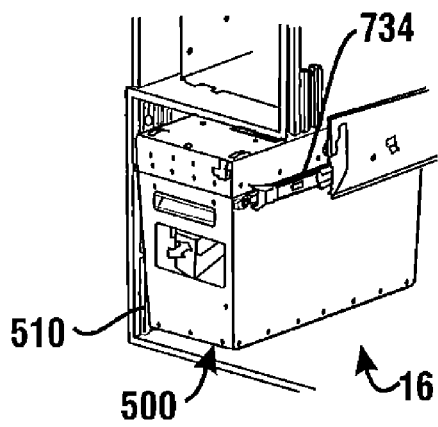

To install the exemplary cassette 500 into the chest 16, the chest door is first opened. A servicer lifts and grasps the carrying handle 534 and aligns and slidably inserts the left and right side rails 728, 730 into their corresponding inner slide members 780, 796 of the left and right slide assemblies 732, 734, as illustrated in FIG. 91. The cassette 500 may be moved forwardly until the handle 534, which is in the vertical carrying position, abuts or is adjacent the rear edge of the top wall 542 of the chest 16 as illustrated in FIG. 92. The handle 534 is then moved to its horizontal storage position as seen in FIG. 93. The rear wall 510 of the cassette 500 is then pushed forwardly either by a hand or a foot of the servicer against the force of the springs acting on the slides until generally the entire left and right side rails 728, 730 extend into their corresponding inner slide members 780, 796 of the left and right slide assemblies 732, 734 and contact the magnetic stops 792, 808 as illustrated in FIG. 94. The cassette 500 is continued to be pushed forwardly until the push-to-release latch 820 extends into the latch opening 532 of the cassette 500 and latches onto a female coupling 912 (FIG. 86) operatively secured to the cassette 500. This action places the cassette 500 in the docking position as illustrated in FIG. 56.

As the cassette 500 is inserted and moved, rollers 914 (FIG. 79) embedded in and that extend outward from the top portion 504 of the cassette 500 ride along the bottom surface of the platen 812, and the rollers 832, 834 of the sensor plate assembly 810 ride along the top surface of the top portion 504 to facilitate movement of the cassette 500. Also, allowing the sensor plate assembly 810 to ride along the top surface of the top portion 504 may maintain more precise vertical tolerances between the optical sensors 694, 696 and the cassette. The latch 820 secures the cassette in the Z (front and rear) direction (FIG. 84). In this docking position too, the pinion gear 604 of the motor 608 extends into and engages the input coupling 604 of the drive shaft 598, and the docking pins 818 are extended into the docking pin slots 530 of the cassette 500 to secure the cassette 500 in the X (right and left) and Y (up and down) directions (FIG. 84). The shoulder screw 846 and slot 844 engagement also results from movement of the cassette relative to the machine in the X direction. As illustrated in FIGS. 78 and 83, in the docking position, the sensor plate assembly 810 is positioned upon the top portion 504 of the cassette 500 such that the components of the sensor plate assembly 810 are aligned with their respective components of the top portion 504. In particular, the front and rear reflective sensors 694, 696 are positioned over their respective lens-covered openings 698, 700 and the opening 852 of the platen 812 spans the input opening 544 of the top portion 504 to exposed the input opening 544 to the chest transport mechanism. As seen in FIG. 78, the funnel shape input opening 544 of the top portion 504 spans a sufficient distance beyond the output passage 892 of the chest transport mechanism 856 to allow for variations in positioning locations of the output passage 892.

To remove the exemplary cassette 500, the chest door is first opened. The chest door may be opened after first unlocking a lock such as a combination lock or other suitable lock which generally operates to hold the chest door in a closed position and prevent access to the chest by unauthorized persons. Upon opening of the lock, the service person may operate a lever or other suitable mechanism to move a boltwork from a position holding the chest door in the closed position to a position in which the boltwork enables the chest door to be opened. Once the boltwork has been moved so that the door can be opened, a service person may move the chest door relative to the chest so that the opening to the chest is then opened. To remove the exemplary cassette, the rear wall 510 of the cassette 500 is pushed inwardly until the push-to-release latch 820 unlatches from the cassette 500. The force of the springs 790, 806 cause the inner slide members 780, 796 to slide rearwardly along the outer slide members 774, 794. Rearward movement of the inner slide members 780, 796 causes the cassette 500 to move rearwardly following the hand or foot of the servicer until the cassette 500 extends beyond the rear perimeter of the chest 16 as seen in FIG. 94. It should be noted that this cassette position also provides a visual indication to the servicer that the cassette 500 is not docked. The servicer then grasps the rear hand grip 518 and pulls the cassette 500 rearwardly until the side rails 728, 730 disengage from the inner slide members 780, 796. Left and right stops 793, 809 operatively mounted on the left and right walls 760, 762 of the frame 757 will engage their respective magnetic stops 792, 808 to prevent the inner slide members 796, 780 from sliding further rearwardly and disengaging from their respective outer slide members 794, 774. To return the machine to an operative position, a new cassette may be installed replacing the cassette that has been removed from the machine. This may be done in the manner previously described by engaging the cassette with the rails and moving it inwardly until the cassette is latched in position. Thereafter the service person may close the chest door and move the boltwork so that the boltwork again holds the chest door in a position closing the chest opening. The user may then reset the lock or otherwise place the chest door in a secured position. As can be appreciated, the exemplary embodiment provides for changing of the cassette without a requirement for connecting or disconnecting electrical connections for sensors or the like. This may generally reduce the risk of error or misconnections that can result in failures or improper machine operation. Further, in exemplary arrangements the magnetic sensing arrangement for positioning of the cam which controls how sheets are directed into the interior area of the cassette is sensed via magnetic sensors located externally of the cassette and which are automatically in the operative position when the cassette is placed in a condition for receiving sheets. This further facilitates reliable operation of the exemplary embodiment. Of course it should be understood that these arrangements and structures are exemplary and in other embodiments other approaches may be used.

Thus the exemplary embodiments achieve at least some of the above stated objectives, eliminate difficulties encountered in the use of prior devices, systems and methods, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art as being capable of performing the recited function, and shall not be deemed limited to the structures shown in the foregoing description or mere equivalents thereof. The provision of an abstract herewith likewise shall not be construed as limiting the claims to the features or functions described in the abstract.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus operative responsive to data read from data bearing records, comprising:
    an automated banking machine including:
        a card reader, wherein the card reader is operative to read card data from user cards, wherein the card data corresponds to financial accounts,
        a display, wherein the display is operative to provide outputs to machine users,
        at least one processor associated with the machine, wherein the at least one processor is in operative connection with the card reader of the display, and wherein the at least one processor is operative to cause financial transfers involving accounts corresponding to the card data,
        wherein the machine includes at least one sheet receiving opening, wherein the at least one sheet receiving opening is configured to receive sheets into the machine for machine users,
        at least one sheet analysis device, wherein the at least one sheet analysis device is operative to evaluate indicia on sheets received into the machine through the at least one sheet receiving opening,
        a cassette, wherein the cassette is configured to hold a plurality of sheets within an interior area thereof, wherein the cassette is removably positionable within the machine, wherein in an operative position in the machine the cassette is enabled to receive sheets processed by the at least one sheet analysis device,
        a drive, wherein the drive is mounted in operatively supported connection with the machine outside and separate from the cassette,
        a drive shaft, wherein the drive shaft is movably mounted on the cassette, wherein the drive shaft is removably operatively engageable with the drive, wherein in the operative position of the cassette, the drive shaft is in operative connection with the drive,
        at least one sheet guide, wherein the at least one sheet guide is movably mounted in the interior area of the cassette, wherein the at least one sheet guide is operative to selectively direct moving sheets in the interior area toward a plurality of different directions,
        at least one sheet moving member in the interior area, wherein the at least one sheet moving member is operative to engagingly move sheets in the interior area,
        at least one clutch, wherein the at least one clutch is in operative connection with the drive shaft, the at least one sheet guide, and the at least one sheet moving member, wherein rotation of the drive shaft in a first rotational direction is operative to cause movement of the at least one sheet moving member and not the at least one sheet guide, and rotation of the drive shaft in an opposed rotational direction is operative to cause movement of the at least one sheet guide but not the at least one sheet moving member.

2. The apparatus according to claim 1
wherein the cassette includes a coupling,
and wherein the machine includes a releasable latch,
and wherein the cassette is held in the operative position through engagement of the latch and coupling, and wherein the cassette is movable from the operative position responsive to movement of the coupling and the latch further together, whereby the coupling and the latch disengage.

3. The apparatus according to claim 2
wherein the cassette includes a pair of disposed rail portions,
wherein the machine includes a pair of disposed slides,
wherein in the operative position of the cassette, each cassette rail is engaged with a respective slide.

4. The apparatus according to claim 3
wherein at least one slide is in operative connection with a spring, wherein the cassette in operative position with the at least one slide, is biased by the spring in a direction away from the latch.

5. The apparatus according to claim 4
wherein the machine includes at least one pin external and separate from the cassette,
wherein the cassette includes at least one pin accepting slot,
wherein in the operative position of the cassette, the at least one pin extends in the at least one pin accepting slot.

6. The apparatus according to claim 5,
wherein the automated banking machine includes a pair of pins, and wherein the pins are disposed on opposed sides of the latch, wherein the cassette includes a pair of pin engaging slots, wherein the slots are disposed on opposed sides of the coupling.

7. The apparatus according to claim 4
wherein the cassette includes at least one projecting member, and wherein the machine includes at least one member accepting slot separate from and external from the cassette,
wherein in the operative position of the cassette, the at least one projecting member extends in the at least one member accepting slot.

8. The apparatus according to claim 7
wherein the machine includes at least one pin external and separate from the cassette,
wherein the cassette includes at least one pin accepting slot,
and wherein in the operative position of the cassette the at least one pin extends in the at least one pin accepting slot.

9. The apparatus according to claim 3
wherein the cassette includes a magnet, wherein the magnet is operative to produce a magnetic field, and wherein the magnet is in operative connection with the at least one sheet guide,
a sensor, wherein the sensor is mounted on the machine outside and separate from the cassette,
wherein in the operative position of the cassette the sensor is operable to detect at least one property of the magnetic field corresponding to at least one position of the at least one sheet guide.

10. The apparatus according to claim 9
wherein the cassette includes at least one cam, wherein the at least one cam is in operative connection with the drive shaft,
wherein the at least one cam is in operative connection with the at least one sheet guide, and wherein rotation of the at least one cam is operative to cause movement of the at least one sheet guide,
wherein the magnet is in operative connection with the at least one cam.

11. The apparatus according to claim 9
wherein the cassette includes at least one window, wherein the machine includes at least one further sensor, and wherein in the operative position of the cassette, the at least one further sensor is operatively aligned with the at least one window,
wherein in the operative position of the cassette, the at least one further sensor is operative to determine a location of a top of a sheet pile in a portion of the interior area generally aligned with the window.

12. The apparatus according to claim 11
wherein the drive is operative to move the at least one sheet guide to cause moving sheets in the interior area to be directed at least one of toward and away from the portion of the interior area generally aligned with the at least one further sensor.

13. The apparatus according to claim 12
wherein the cassette includes a plurality of disposed windows,
wherein the machine includes a plurality of further sensors, each sensor aligned with a respective one of the windows when the cassette is in the operative position,
wherein the drive is operative to move the at least one sheet guide to direct moving sheets in the interior area to be directed toward a plurality of disposed portions within the interior area responsive at least in part to the plurality of further sensors.

14. The apparatus according to claim 13
wherein the cassette interior area includes at least one bin, and wherein the at least one sheet guide is selectively movable to direct moving sheets in the interior area into the at least one bin and outside the at least one bin.

15. The apparatus according to claim 11
wherein the at least one drive is operative to substantially slow sheet speed of moving sheets in the interior area prior to the sheets disengaging from the at least one sheet moving member.

16. The apparatus according to claim 11
wherein the interior area of the cassette includes at least one flexible member, wherein the at least one flexible member is operative to engage sheets and slow sheet speed prior to sheets disengaging from the at least one sheet moving member.

17. The apparatus according to claim 1 wherein the at least one sheet analysis device includes at least one of a check reader and a bill validator.

18. Apparatus comprising:
an automated banking machine cassette, wherein the cassette is removably positionable in a cash dispensing automated banking machine that operates responsive at least in part to data read from user cards,
wherein the cassette is configured to hold a plurality of sheets received by the machine during user operation within an interior area of the cassette,
a drive shaft rotatably movably mounted on the cassette, wherein the drive shaft is releasibly engageable with a drive in the machine, and wherein the drive shaft is in operative connection with the drive when the cassette is in the operative position within the machine,
wherein the cassette includes in the interior area at least one movable sheet guide, and wherein the at least one sheet guide is operative to move to direct moving sheets toward a plurality of different directions,
wherein the interior area includes at least one sheet moving member, wherein the at least one sheet moving member includes at least one of a belt and roller, and wherein the at least one sheet moving member is operative to engage and move sheets in engagement therewith in the interior area,
wherein the drive shaft is in operative connection with the at least one sheet guide and the at least one sheet moving member, wherein rotation of the drive shaft in a first rotational direction causes movement of the at least one sheet moving member but not the at least one sheet guide, and wherein movement of the drive shaft in an opposed rotational direction causes movement of the at least one sheet guide but not the at least one sheet moving member.

19. The apparatus according to claim 18
wherein the drive shaft is in operative connection with at least one magnet, wherein the at least one magnet is operative to produce a magnetic field sensable by at least one sensor positioned outside and separate from the cassette in the machine, and wherein the sensor is usable to determine at least one position of the at least one sheet guide.

20. The apparatus according to claim 19
wherein the cassette includes a plurality of windows, wherein each of the windows enable respective further sensors outside the cassette in the machine to sense a level of sheets in a plurality of respective portions within the interior area corresponding to the respective windows, and wherein the at least one sheet guide is movable to selectively direct sheets moving in the interior area towards each of the respective portions.

21. The apparatus according to claim 20 and further comprising:
- an automated banking machine that operates responsive at least in part to data read from user cards, wherein the cassette is removably positioned in the machine,
- a card reader, wherein the card reader is operative to read data from user cards corresponding to financial accounts,
- at least one of a check reader and a bill validator operative to analyze sheets input by users to the machine, wherein sheets moved through at least one of the check reader and the bill validator are received in the cassette when the cassette is in the operative position,
- at least one processor associated with the machine, wherein the at least one processor is in operative connection with the card reader and wherein the at least one processor is operative to cause a determination to be made that card data read from a user card corresponds to a financial account authorized to conduct transactions with the machine, and to cause a financial transfer at least one or to and from the account responsive at least in part to the determination.

* * * * *